US012195210B2

United States Patent
Ryu et al.

(10) Patent No.: US 12,195,210 B2
(45) Date of Patent: Jan. 14, 2025

(54) AERIAL SERVICE

(71) Applicant: Ofinno, LLC, Reston, VA (US)

(72) Inventors: Jinsook Ryu, Oakton, VA (US);
Esmael Hejazi Dinan, McLean, VA (US); Kyungmin Park, Vienna, VA (US); Peyman Talebi Fard, Vienna, VA (US); Taehun Kim, Fairfax, VA (US); Weihua Qiao, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/210,584

(22) Filed: Jun. 15, 2023

(65) Prior Publication Data
US 2023/0337089 A1 Oct. 19, 2023

Related U.S. Application Data

(63) Continuation of application No. PCT/US2021/061983, filed on Dec. 6, 2021.

(60) Provisional application No. 63/126,285, filed on Dec. 16, 2020.

(51) Int. Cl.
| | |
|---|---|
| *H04W 8/24* | (2009.01) |
| *B64U 10/00* | (2023.01) |
| *H04W 36/00* | (2009.01) |
| *H04W 36/14* | (2009.01) |
| *B64U 101/20* | (2023.01) |

(52) U.S. Cl.
CPC .............. *B64U 10/00* (2023.01); *H04W 8/24* (2013.01); *H04W 36/0038* (2013.01); *H04W 36/1443* (2023.05); *B64U 2101/20* (2023.01)

(58) Field of Classification Search
CPC ... H04W 36/14; H04W 8/24; H04W 36/0038; H04W 4/40; H04W 12/08; H04W 36/12; H04W 12/06; B64U 10/00; B64U 2101/20; H04L 67/141
See application file for complete search history.

(56) References Cited

U.S. PATENT DOCUMENTS

| 11,212,710 B1 * | 12/2021 | Mahimkar | ............ H04W 48/12 |
| 11,979,782 B2 * | 5/2024 | Jin | ........................ H04W 76/10 |
| 2019/0159157 A1 * | 5/2019 | Gupta | ................ H04W 60/005 |

(Continued)

FOREIGN PATENT DOCUMENTS

| EP | 3742805 A1 | 11/2020 |
| WO | 2019/093857 A1 | 5/2019 |

OTHER PUBLICATIONS

3GPP TS 23.401 V16.8.0 (Sep. 2020); Technical Specification; 3rd Generation Partnership Project; Technical Specification Group Services and System Aspects; General Packet Radio Service (GPRS) enhancements for Evolved Universal Terrestrial Radio Access Network; (E-UTRAN) access; (Release 16).

(Continued)

*Primary Examiner* — Congvan Tran
(74) *Attorney, Agent, or Firm* — Xin Gao; Kavon Nasabzadeh; Jacob L. Mangan

(57) ABSTRACT

A mobility management entity (MME) receives, from a first base station, a request for a handover of a wireless device to a second base station. Based on the handover request, the MME sends, to an access and mobility management function (AMF), an indication of an authentication and/or authorization (AA) status for an aerial service of the wireless device.

20 Claims, 26 Drawing Sheets

(56) References Cited

U.S. PATENT DOCUMENTS

| | | | | |
|---|---|---|---|---|
| 2020/0245127 | A1* | 7/2020 | Zong | H04W 76/12 |
| 2020/0383010 | A1* | 12/2020 | Zhu | H04W 24/10 |
| 2021/0076318 | A1* | 3/2021 | Zong | H04W 8/12 |
| 2021/0105685 | A1* | 4/2021 | Li | H04W 36/14 |
| 2021/0258766 | A1* | 8/2021 | Watanabe | H04W 48/16 |
| 2021/0368411 | A1* | 11/2021 | Jin | H04W 36/144 |
| 2022/0053401 | A1* | 2/2022 | Foti | H04W 36/32 |
| 2022/0060948 | A1* | 2/2022 | Harsha | H04W 36/0044 |
| 2022/0159527 | A1* | 5/2022 | Lee | H04W 8/24 |

OTHER PUBLICATIONS

3GPP TS 23.501 V16.6.0 (Sep. 2020); Technical Specification; 3rd Generation Partnership Project; Technical Specification Group Services and System Aspects; System architecture for the 5G System (5GS); Stage 2; (Release 16).

3GPP TS 23.502 V16.6.0 (Sep. 2020); Technical Specification; 3rd Generation Partnership Project; Technical Specification Group Services and System Aspects; Procedures for the 5G System (5GS); Stage 2; (Release 16).

3GPP TS 24.301 V17.0.0 (Sep. 2020); Technical Specification; 3rd Generation Partnership Project; Technical Specification Group Core Network and Terminals; Non-Access-Stratum (NAS) protocol for Evolved Packet System (EPS); Stage 3; (Release 17).

3GPP TS 24.501 V17.0.0 (Sep. 2020); Technical Specification; 3rd Generation Partnership Project; Technical Specification Group Core Network and Terminals; Non-Access-Stratum (NAS) protocol for 5G System (5GS); Stage 3; (Release 17).

3GPP TS 29.274 V16.5.0 (Sep. 2020); Technical Specification; 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3; (Release 16).

3GPP TS 29.518 V16.5.0 (Sep. 2020); Technical Specification; 3rd Generation Partnership Project; Technical Specification Group Core Network and Terminals; 5G System; Access and Mobility Management Services; Stage 3; (Release 16).

3GPP TR 23.754 V0.3.0 (Sep. 2020); Technical Report; 3rd Generation Partnership Project; Technical Specification Group Services and System Aspects; Study on supporting Unmanned Aerial Systems (UAS) connectivity, Identification and tracking; (Release 17).

3GPP TR 23.754 V1.1.0 (Oct. 2020); Technical Report; 3rd Generation Partnership Project; Technical Specification Group Services and System Aspects; Study on supporting Unmanned Aerial Systems (UAS) connectivity, Identification and tracking; (Release 17).

3GPP TR 23.754 V0.1.1 (Jan. 2020); Technical Report; 3rd Generation Partnership Project; Technical Specification Group Services and System Aspects; Study on supporting Unmanned Aerial Systems (UAS) connectivity, Identification and tracking; (Release 17).

S2-2006531; SA WG2 Meeting #140E; Aug. 19-Sep. 1, 2020, Electronic, Elbonia; Source: Qualcomm Incorporated, Futurewei, Lenovo, Motorola Mobility, Interdigital, Huawei, Oppo; Title: KI#1, KI#2, KI#3, KI#7, Sol. 5: Update to eliminate editor's notes, clarify additional aspects, and merge in other solutions; Document for: Approval; Agenda Item: 8.7; Work Item / Release: [FS_ID_UAS] / [Rel-17].

S2-2006542; SA WG2 Meeting #140E; Aug. 19-Sep. 1, 2020, Electronic, Elbonia; Source: Qualcomm Incorporated, Interdigital; Title: FS_ID_UAS: Way forward for Various Open Issues; Document for: Approval; Agenda Item: 8.7; Work Item / Release: [FS_ID_UAS] / [Rel-17].

S2-2007168; SA WG2 Meeting #141E; Oct. 12-Oct. 23, 2020, Elbonia; Source: Nokia, Nokia Shanghai Bell; Title: Conclusion on KI#2; Document for: Approval; Agenda Item: 8.7; Work Item / Release: FS_ID_UAS_SA2 / Rel-17.

S2-2008710; 3GPP TSG-WG SA2 Meeting #142E; Nov. 16-Nov. 23, 2020, Elbonia; Source: Nokia, Nokia Shanghai Bell; Title: Sol #5: Updates EPS Procedure for Authentication/Authorization; Document for: Approval; Agenda Item: 8.7; Work Item / Release: FS_ID_UAS-SA2 / Rel-17.

International Search Report of the International Searching Authority, mailed Jun. 20, 2022, in International Application No. PCT/US2021/061983.

S3-202607; 3GPP TSG-SA3 Meeting #100e; Aug. 17-28, 2020; Source: Lenovo, Motorola Mobility; Title: Solution on UAS Authentication, Authorization and Security Aspects; Document for: Approval; Agenda Item: 2.7.

3GPP TR 23.754 V0.2.0 (Jan. 2020); Technical Report; 3rd Generation Partnership Project; Technical Specification Group Services and System Aspects; Study on supporting Unmanned Aerial Systems (UAS) connectivity, Identification and tracking; (Release 17).

S2-183378; 3GPP TSG-SA WG2 Meeting #127; Sanya, China; Apr. 16-20, 2018; Title: Handover type for eLTE connected both 5GC and EPC; Source to WG: LG Electronics; Source to TSG: SA2; Work item code: 5GS_Ph1; Category: F; Release: Rel-15.

3GPP TS 36.300 V15.11.0 (Sep. 2020); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (release 15).

R3-181664; 3GPP TSG-RAN WG3 #99bis; Sanya, China; Apr. 16-20, 2018; Agenda item: 16.1; Source: ZTE; Title: S1/X2 Signaling Support of UAV Subscription information; Document for: Discussion and Decision.

{Resubmission of 20-1178US_2023-08-21_IDS.pdf, NPL Cite No. 18, "NPL18.pdf" as filed Aug. 21, 2023—LG Electronics: Handover . . . XP051437717—D5 as cited in PCT/US2021/061983 ISR} LG Electronics: "Handover type for el TE connected both 5GC and EPC", 3GPP Draft; S2-183378, vol. SA WG2, No. Sanya, China; Apr. 10, 2018, XP051437717.

* cited by examiner

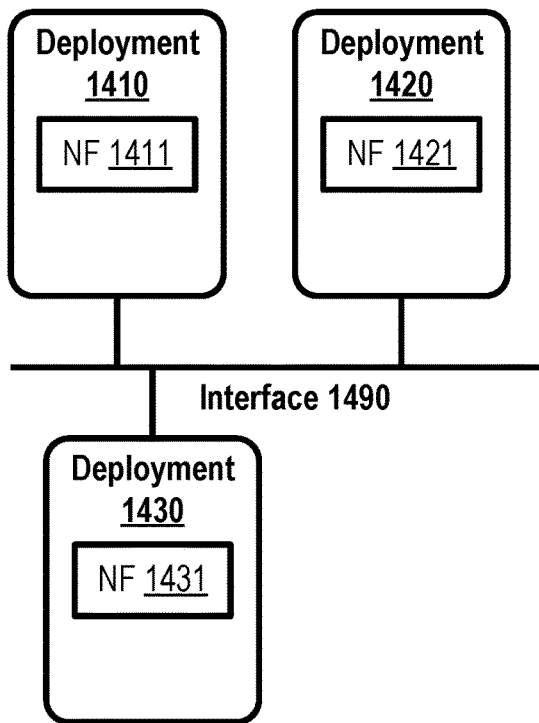
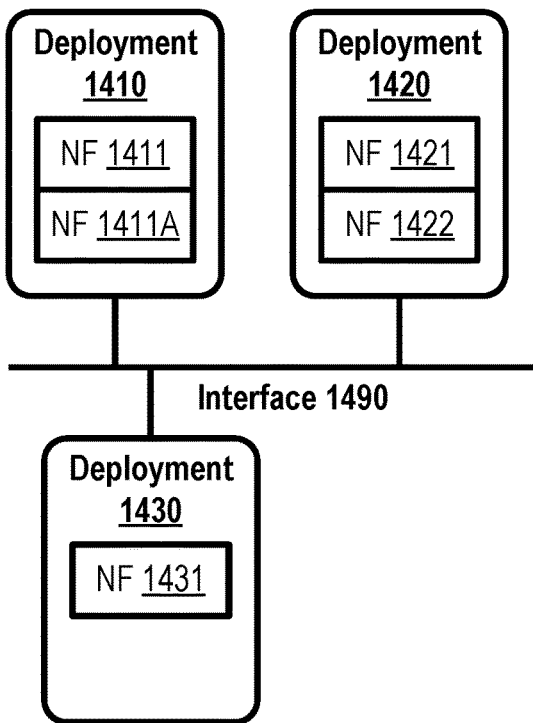
FIG. 14A
FIG. 14B
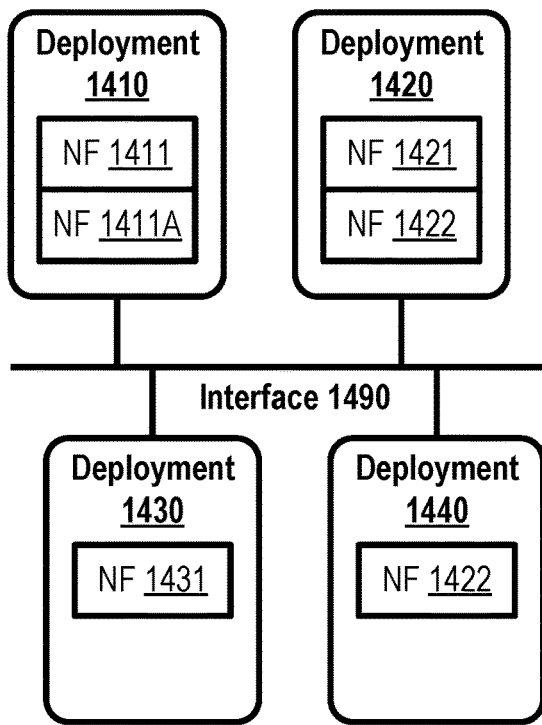
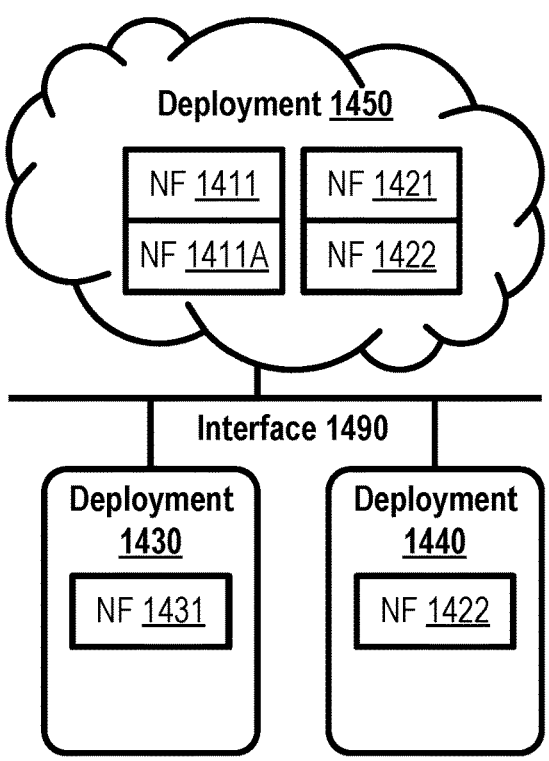
FIG. 14C
FIG. 14D

AERIAL SERVICE

CROSS-REFERENCE TO RELATED APPLICATIONS

This application is a continuation of International Application No. PCT/US2021/061983, filed Dec. 6, 2021, which claims the benefit of U.S. Provisional Application No. 63/126,285, filed Dec. 16, 2020, all of which are hereby incorporated by reference in their entireties.

BRIEF DESCRIPTION OF THE DRAWINGS

Examples of several of the various embodiments of the present disclosure are described herein with reference to the drawings.

FIG. 14A, FIG. 14B, FIG. 14C, and FIG. 14D illustrate various examples of physical core network deployments, each having one or more network functions or portions thereof.

DETAILED DESCRIPTION

Figure 1A:
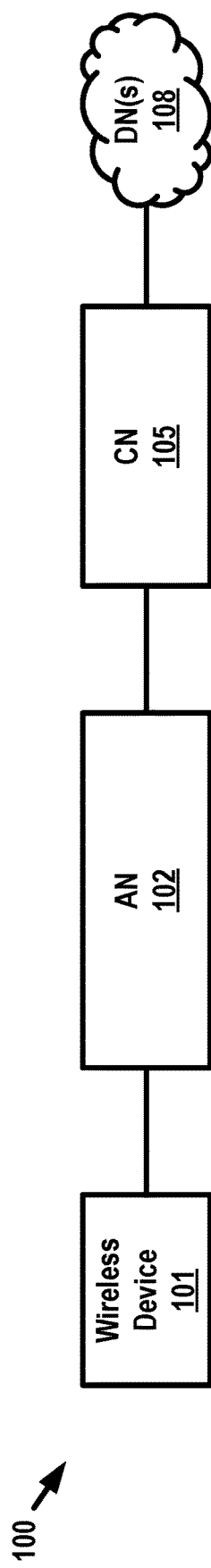
FIG. 1A and FIG. 1B illustrate example communication networks including an access network and a core network.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have one or more specific capabilities. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases refer to a single instance of a particular element, but should not be interpreted to exclude other instances of that element. For example, a bicycle with two wheels may be described as having "a wheel". Any term that ends with the suffix "(s)" is to be interpreted as "at least one" and/or "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described.

The phrases "based on", "in response to", "depending on", "employing", "using", and similar phrases indicate the presence and/or influence of a particular factor and/or condition on an event and/or action, but do not exclude unenumerated factors and/or conditions from also being present and/or influencing the event and/or action. For example, if action X is performed "based on" condition Y, this is to be interpreted as the action being performed "based at least on" condition Y. For example, if the performance of action X is performed when conditions Y and Z are both satisfied, then the performing of action X may be described as being "based on Y".

The term "configured" may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, a parameter may comprise one or more information objects, and an information object may comprise one or more other objects. For example, if parameter J comprises parameter K, and parameter K comprises parameter L, and parameter L comprises parameter M, then J comprises L, and J comprises M. A parameter may be referred to as a field or information element. In an example embodiment, when one or more messages comprise a plurality of parameters, it implies that a parameter in the plurality of parameters is in at least one of the one or more messages, but does not have to be in each of the one or more messages.

This disclosure may refer to possible combinations of enumerated elements. For the sake of brevity and legibility, the present disclosure does not explicitly recite each and every permutation that may be obtained by choosing from a set of optional features. The present disclosure is to be interpreted as explicitly disclosing all such permutations. For example, the seven possible combinations of enumerated elements A, B, C consist of: (1) "A"; (2) "B"; (3) "C"; (4) "A and B"; (5) "A and C"; (6) "B and C"; and (7) "A, B, and C". For the sake of brevity and legibility, these seven possible combinations may be described using any of the following interchangeable formulations: "at least one of A, B, and C"; "at least one of A, B, or C"; "one or more of A, B, and C"; "one or more of A, B, or C"; "A, B, and/or C". It will be understood that impossible combinations are excluded. For example, "X and/or not-X" should be interpreted as "X or not-X". It will be further understood that these formulations may describe alternative phrasings of overlapping and/or synonymous concepts, for example, "identifier, identification, and/or ID number".

This disclosure may refer to sets and/or subsets. As an example, set X may be a set of elements comprising one or more elements. If every element of X is also an element of Y, then X may be referred to as a subset of Y. In this disclosure, only non-empty sets and subsets are considered. For example, if Y consists of the elements Y1, Y2, and Y3, then the possible subsets of Y are {Y1, Y2, Y3}, {Y1, Y2}, {Y1, Y3}, {Y2, Y3}, {Y1}, {Y2}, and {Y3}.

FIG. 1A illustrates an example of a communication network 100 in which embodiments of the present disclosure may be implemented. The communication network 100 may comprise, for example, a public land mobile network (PLMN) run by a network operator. As illustrated in FIG. 1A, the communication network 100 includes a wireless device 101, an access network (AN) 102, a core network (CN) 105, and one or more data network (DNs) 108.

The wireless device 101 may communicate with DNs 108 via AN 102 and CN 105. In the present disclosure, the term wireless device may refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, unmanned and/or uncrewed aerial vehicle, urban air mobility, and/or any combination thereof. The term wireless device encompasses other terminology, including user equipment (UE), user terminal (UT), access terminal (AT), mobile station, handset, wireless transmit and receive unit (WTRU), and/or wireless communication device.

The AN 102 may connect wireless device 101 to CN 105 in any suitable manner. The communication direction from the AN 102 to the wireless device 101 is known as the downlink and the communication direction from the wireless device 101 to AN 102 is known as the uplink. Downlink transmissions may be separated from uplink transmissions using frequency division duplexing (FDD), time-division duplexing (TDD), and/or some combination of the two duplexing techniques. The AN 102 may connect to wireless device 101 through radio communications over an air interface. An access network that at least partially operates over the air interface may be referred to as a radio access network (RAN). The CN 105 may set up one or more end-to-end connection between wireless device 101 and the one or more DNs 108. The CN 105 may authenticate wireless device 101 and provide charging functionality.

In the present disclosure, the term base station may refer to and encompass any element of AN 102 that facilitates communication between wireless device 101 and AN 102. Access networks and base stations have many different names and implementations. The base station may be a terrestrial base station fixed to the earth. The base station may be a mobile base station with a moving coverage area. The base station may be in space, for example, on board a satellite. For example, WiFi and other standards may use the term access point. As another example, the Third-Generation Partnership Project (3GPP) has produced specifications for three generations of mobile networks, each of which uses different terminology. Third Generation (3G) and/or Universal Mobile Telecommunications System (UMTS) standards may use the term Node B. 4G, Long Term Evolution (LTE), and/or Evolved Universal Terrestrial Radio Access (E-UTRA) standards may use the term Evolved Node B (eNB). 5G and/or New Radio (NR) standards may describe AN 102 as a next-generation radio access network (NG-RAN) and may refer to base stations as Next Generation eNB (ng-eNB) and/or Generation Node B (gNB). Future standards (for example, 6G, 7G, 8G) may use new terminology to refer to the elements which implement the methods described in the present disclosure (e.g., wireless devices, base stations, ANs, CNs, and/or components thereof). A base station may be implemented as a repeater or relay node used to extend the coverage area of a donor node. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The AN 102 may include one or more base stations, each having one or more coverage areas. The geographical size and/or extent of a coverage area may be defined in terms of a range at which a receiver of AN 102 can successfully receive transmissions from a transmitter (e.g., wireless device 101) operating within the coverage area (and/or vice-versa). The coverage areas may be referred to as sectors or cells (although in some contexts, the term cell refers to the carrier frequency used in a particular coverage area, rather than the coverage area itself). Base stations with large coverage areas may be referred to as macrocell base stations. Other base stations cover smaller areas, for example, to provide coverage in areas with weak macrocell coverage, or to provide additional coverage in areas with high traffic (sometimes referred to as hotspots). Examples of small cell base stations include, in order of decreasing coverage area, microcell base stations, picocell base stations, and femtocell base stations or home base stations. Together, the coverage areas of the base stations may provide radio coverage to wireless device 101 over a wide geographic area to support wireless device mobility.

A base station may include one or more sets of antennas for communicating with the wireless device 101 over the air interface. Each set of antennas may be separately controlled by the base station. Each set of antennas may have a corresponding coverage area. As an example, a base station may include three sets of antennas to respectively control three coverage areas on three different sides of the base station. The entirety of the base station (and its corresponding antennas) may be deployed at a single location. Alternatively, a controller at a central location may control one or more sets of antennas at one or more distributed locations. The controller may be, for example, a baseband processing unit that is part of a centralized or cloud RAN architecture. The baseband processing unit may be either centralized in a pool of baseband processing units or virtualized. A set of antennas at a distributed location may be referred to as a remote radio head (RRH).

Figure 1B:
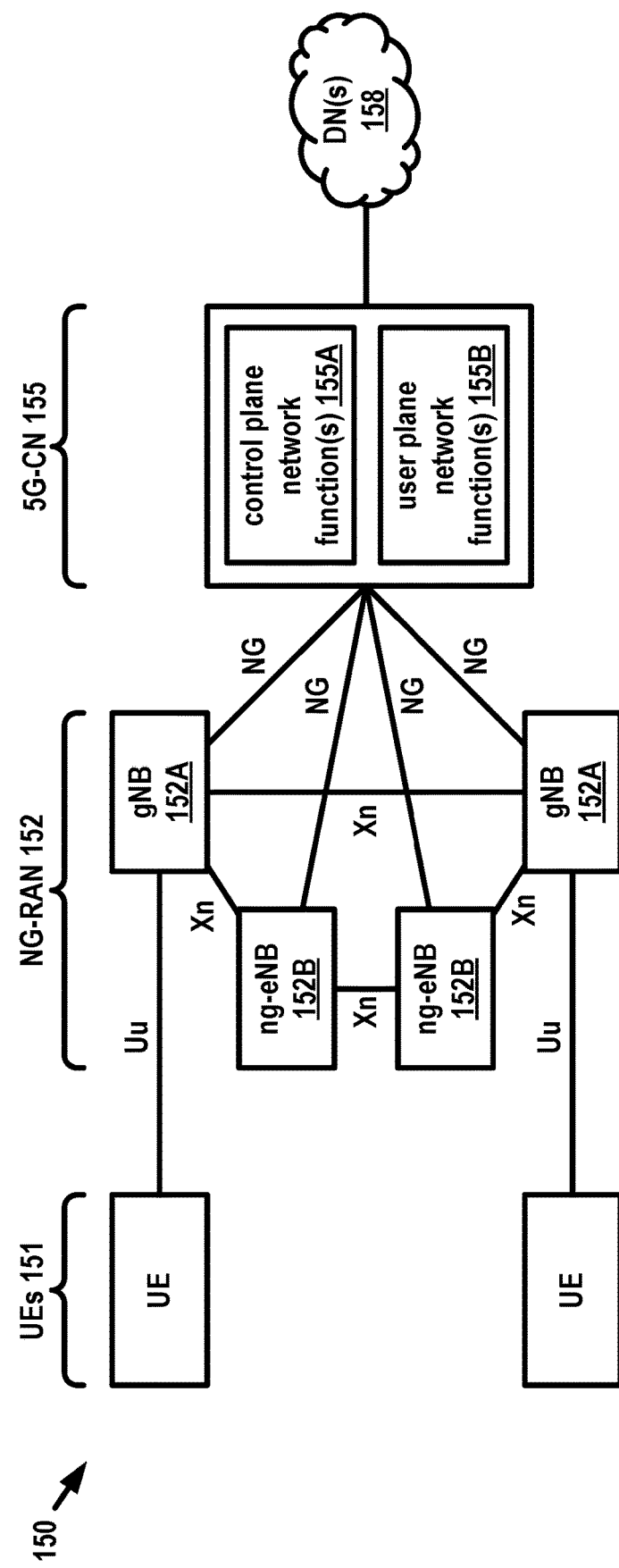

FIG. 1B illustrates another example communication network 150 in which embodiments of the present disclosure may be implemented. The communication network 150 may comprise, for example, a PLMN run by a network operator. As illustrated in FIG. 1B, communication network 150 includes UEs 151, a next generation radio access network (NG-RAN) 152, a 5G core network (5G-CN) 155, and one or more DNs 158. The NG-RAN 152 includes one or more base stations, illustrated as generation node Bs (gNBs) 152A and next generation evolved Node Bs (ng eNBs) 152B. The 5G-CN 155 includes one or more network functions (NFs), including control plane functions 155A and user plane functions 155B. The one or more DNs 158 may comprise public DNs (e.g., the Internet), private DNs, and/or intra-operator DNs. Relative to corresponding components illustrated in FIG. 1A, these components may represent specific implementations and/or terminology.

The base stations of the NG-RAN 152 may be connected to the UEs 151 via Uu interfaces. The base stations of the NG-RAN 152 may be connected to each other via Xn interfaces. The base stations of the NG-RAN 152 may be connected to 5G CN 155 via NG interfaces. The Uu interface may include an air interface. The NG and Xn interfaces may include an air interface, or may consist of direct physical connections and/or indirect connections over an underlying transport network (e.g., an internet protocol (IP) transport network).

Each of the Uu, Xn, and NG interfaces may be associated with a protocol stack. The protocol stacks may include a user plane (UP) and a control plane (CP). Generally, user plane data may include data pertaining to users of the UEs 151, for example, internet content downloaded via a web browser application, sensor data uploaded via a tracking application, or email data communicated to or from an email server. Control plane data, by contrast, may comprise signaling and messages that facilitate packaging and routing of user plane data so that it can be exchanged with the DN(s). The NG interface, for example, may be divided into an NG user plane interface (NG-U) and an NG control plane interface (NG-C). The NG-U interface may provide delivery of user plane data between the base stations and the one or more user plane network functions 155B. The NG-C interface may be used for control signaling between the base stations and the one or more control plane network functions 155A. The NG-C interface may provide, for example, NG interface management, UE context management, UE mobility management, transport of NAS messages, paging, PDU session management, and configuration transfer and/or warning message transmission. In some cases, the NG-C interface may support transmission of user data (for example, a small data transmission for an IoT device).

One or more of the base stations of the NG-RAN 152 may be split into a central unit (CU) and one or more distributed units (DUs). A CU may be coupled to one or more DUs via an F1 interface. The CU may handle one or more upper layers in the protocol stack and the DU may handle one or more lower layers in the protocol stack. For example, the CU may handle RRC, PDCP, and SDAP, and the DU may handle RLC, MAC, and PHY. The one or more DUs may be in geographically diverse locations relative to the CU and/or each other. Accordingly, the CU/DU split architecture may permit increased coverage and/or better coordination.

The gNBs 152A and ng-eNBs 152B may provide different user plane and control plane protocol termination towards the UEs 151. For example, the gNB 154A may provide new radio (NR) protocol terminations over a Uu interface associated with a first protocol stack. The ng-eNBs 152B may provide Evolved UMTS Terrestrial Radio Access (E-UTRA) protocol terminations over a Uu interface associated with a second protocol stack.

The 5G-CN 155 may authenticate UEs 151, set up end-to-end connections between UEs 151 and the one or more DNs 158, and provide charging functionality. The 5G-CN 155 may be based on a service-based architecture, in which the NFs making up the 5G-CN 155 offer services to each other and to other elements of the communication network 150 via interfaces. The 5G-CN 155 may include any number of other NFs and any number of instances of each NF.

FIG. 2A, FIG. 2B, FIG. 2C, and FIG. 2D illustrate various examples of a framework for a service-based architecture within a core network. In a service-based architecture, a service may be sought by a service consumer and provided by a service producer. Prior to obtaining a particular service, an NF may determine where such as service can be obtained. To discover a service, the NF may communicate with a network repository function (NRF). As an example, an NF that provides one or more services may register with a network repository function (NRF). The NRF may store data relating to the one or more services that the NF is prepared to provide to other NFs in the service-based architecture. A consumer NF may query the NRF to discover a producer NF (for example, by obtaining from the NRF a list of NF instances that provide a particular service).

Figure 2A:
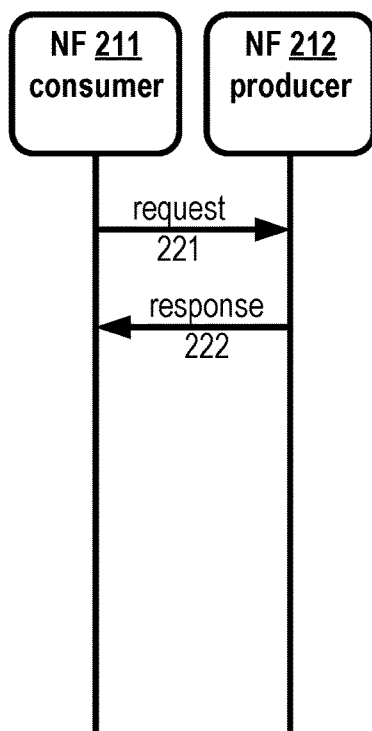
FIG. 2A, FIG. 2B, FIG. 2C, and FIG. 2D illustrate various examples of a framework for a service-based architecture within a core network.

In the example of FIG. 2A, an NF 211 (a consumer NF in this example) may send a request 221 to an NF 212 (a producer NF). The request 221 may be a request for a particular service and may be sent based on a discovery that NF 212 is a producer of that service. The request 221 may comprise data relating to NF 211 and/or the requested service. The NF 212 may receive request 221, perform one or more actions associated with the requested service (e.g., retrieving data), and provide a response 221. The one or more actions performed by the NF 212 may be based on request data included in the request 221, data stored by NF 212, and/or data retrieved by NF 212. The response 222 may notify NF 211 that the one or more actions have been completed. The response 222 may comprise response data relating to NF 212, the one or more actions, and/or the requested service.

Figure 2B:
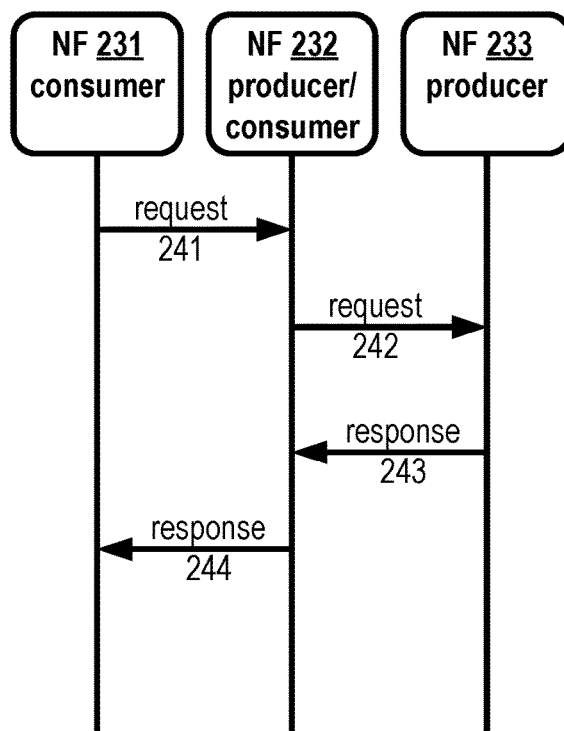

In the example of FIG. 2B, an NF 231 sends a request 241 to an NF 232. In this example, part of the service produced by NF 232 is to send a request 242 to an NF 233. The NF 233 may perform one or more actions and provide a response 243 to NF 232. Based on response 243, NF 232 may send a response 244 to NF 231. It will be understood from FIG. 2B that a single NF may perform the role of producer of services, consumer of services, or both. A particular NF service may include any number of nested NF services produced by one or more other NFs.

Figure 2C:
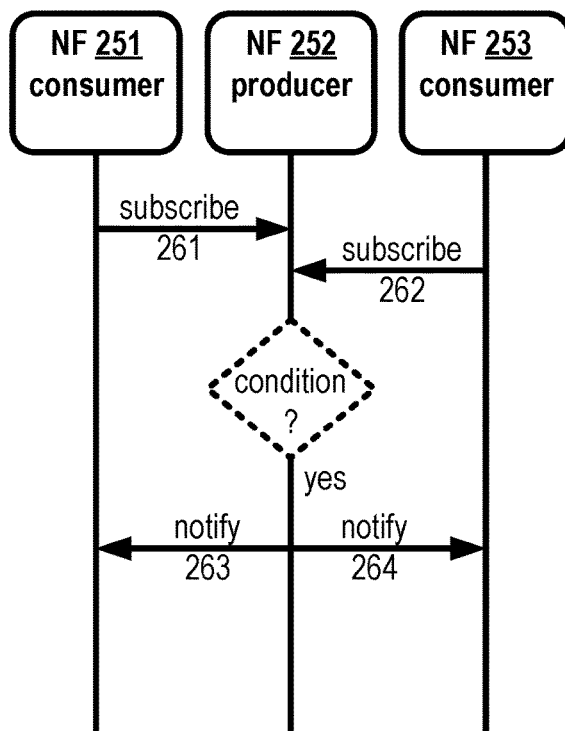

FIG. 2C illustrates examples of subscribe-notify interactions between a consumer NF and a producer NF. In FIG. 2C, an NF 251 sends a subscription 261 to an NF 252. An NF 253 sends a subscription 262 to the NF 252. Two NFs are shown in FIG. 2C for illustrative purposes (to demonstrate that the NF 252 may provide multiple subscription services to different NFs), but it will be understood that a subscribe-notify interaction only requires one subscriber. The NFs 251, 253 may be independent from one another. For example, the NFs 251, 253 may independently discover NF 252 and/or independently determine to subscribe to the service offered by NF 252. In response to receipt of a subscription, the NF 252 may provide a notification to the subscribing NF. For example, NF 252 may send a notification 263 to NF 251 based on subscription 261 and may send a notification 264 to NF 253 based on subscription 262.

As shown in the example illustration of FIG. 2C, the sending of the notifications 263, 264 may be based on a determination that a condition has occurred. For example, the notifications 263, 264 may be based on a determination that a particular event has occurred, a determination that a particular condition is outstanding, and/or a determination that a duration of time associated with the subscription has elapsed (for example, a period associated with a subscription for periodic notifications). As shown in the example illustration of FIG. 2C, NF 252 may send notifications 263, 264 to NFs 251, 253 simultaneously and/or in response to the same condition. However, it will be understood that the NF 252 may provide notifications at different times and/or in response to different notification conditions. In an example, the NF 251 may request a notification when a certain parameter, as measured by the NF 252, exceeds a first threshold, and the NF 252 may request a notification when the parameter exceeds a second threshold different from the first threshold. In an example, a parameter of interest and/or a corresponding threshold may be indicated in the subscriptions 261, 262.

Figure 2D:
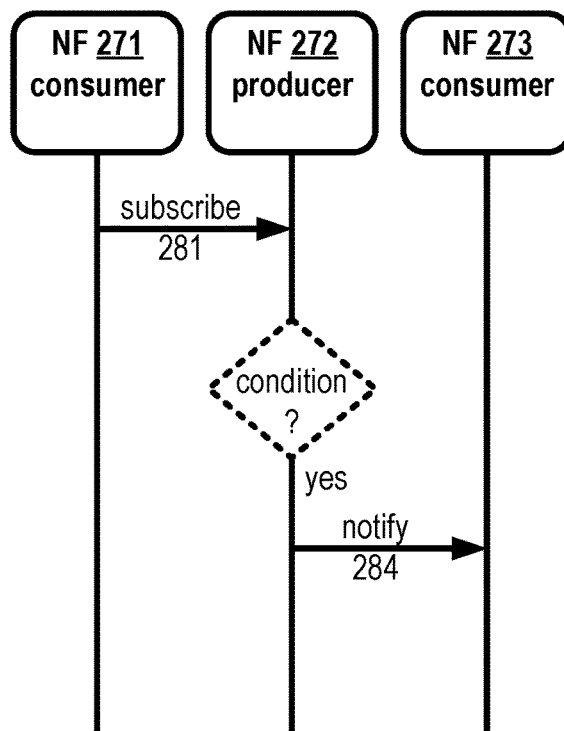

FIG. 2D illustrates another example of a subscribe-notify interaction. In FIG. 2D, an NF 271 sends a subscription 281 to an NF 272. In response to receipt of subscription 281 and/or a determination that a notification condition has occurred, NF 272 may send a notification 284. The notification 284 may be sent to an NF 273. Unlike the example in FIG. 2C (in which a notification is sent to the subscribing NF), FIG. 2D demonstrates that a subscription and its corresponding notification may be associated with different NFs. For example, NF 271 may subscribe to the service provided by NF 272 on behalf of NF 273.

Figure 3:
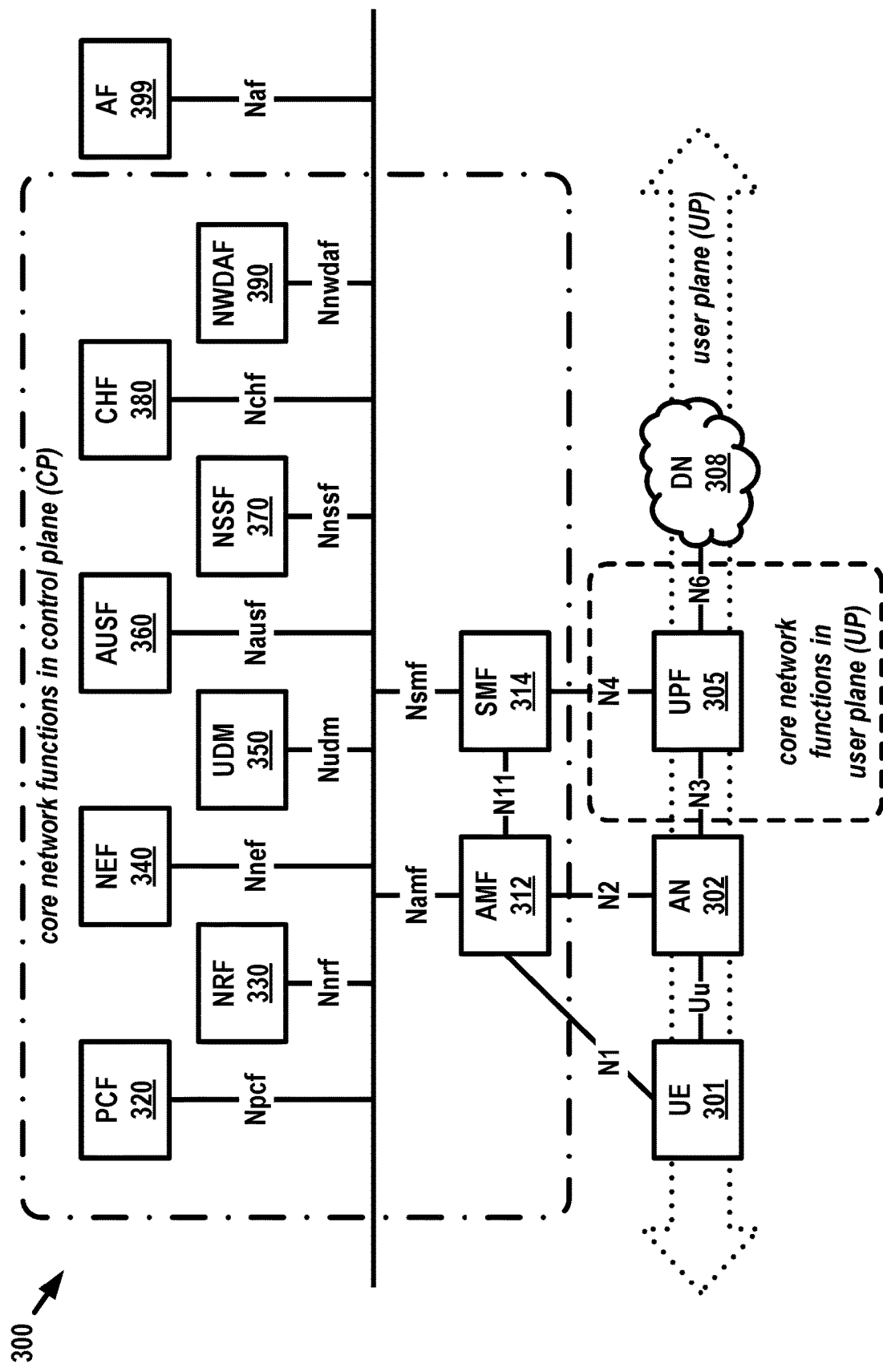
FIG. 3 illustrates an example communication network including core network functions.

FIG. 3 illustrates another example communication network 300 in which embodiments of the present disclosure may be implemented. Communication network 300 includes a user equipment (UE) 301, an access network (AN) 302, and a data network (DN) 308. The remaining elements depicted in FIG. 3 may be included in and/or associated with a core network. Each element of the core network may be referred to as a network function (NF).

The NFs depicted in FIG. 3 include a user plane function (UPF) 305, an access and mobility management function (AMF) 312, a session management function (SMF) 314, a policy control function (PCF) 320, a network repository function (NRF) 330, a network exposure function (NEF) 340, a unified data management (UDM) 350, an authentication server function (AUSF) 360, a network slice selection function (NSSF) 370, a charging function (CHF) 380, a network data analytics function (NWDAF) 390, and an application function (AF) 399. The UPF 305 may be a user-plane core network function, whereas the NFs 312, 314, and 320-390 may be control-plane core network functions. Although not shown in the example of FIG. 3, the core network may include additional instances of any of the NFs depicted and/or one or more different NF types that provide different services. Other examples of NF type include a gateway mobile location center (GMLC), a location management function (LMF), an operations, administration, and maintenance function (OAM), a public warning system (PWS), a short message service function (SMSF), a unified data repository (UDR), and an unstructured data storage function (UDSF).

Each element depicted in FIG. 3 has an interface with at least one other element. The interface may be a logical connection rather than, for example, a direct physical connection. Any interface may be identified using a reference point representation and/or a service-based representation. In a reference point representation, the letter 'N' is followed by a numeral, indicating an interface between two specific elements. For example, as shown in FIG. 3, AN 302 and UPF 305 interface via 'N3', whereas UPF 305 and DN 308 interface via 'N6'. By contrast, in a service-based representation, the letter 'N' is followed by letters. The letters identify an NF that provides services to the core network. For example, PCF 320 may provide services via interface 'Npcf'. The PCF 320 may provide services to any NF in the core network via 'Npcf'. Accordingly, a service-based representation may correspond to a bundle of reference point representations. For example, the Npcf interface between PCF 320 and the core network generally may correspond to an N7 interface between PCF 320 and SMF 314, an N30 interface between PCF 320 and NEF 340, etc.

The UPF 305 may serve as a gateway for user plane traffic between AN 302 and DN 308. The UE 301 may connect to UPF 305 via a Uu interface and an N3 interface (also described as NG-U interface). The UPF 305 may connect to DN 308 via an N6 interface. The UPF 305 may connect to one or more other UPFs (not shown) via an N9 interface. The UE 301 may be configured to receive services through a protocol data unit (PDU) session, which is a logical connection between UE 301 and DN 308. The UPF 305 (or a plurality of UPFs if desired) may be selected by SMF 314 to handle a particular PDU session between UE 301 and DN 308. The SMF 314 may control the functions of UPF 305 with respect to the PDU session. The SMF 314 may connect to UPF 305 via an N4 interface. The UPF 305 may handle any number of PDU sessions associated with any number of UEs (via any number of ANs). For purposes of handling the one or more PDU sessions, UPF 305 may be controlled by any number of SMFs via any number of corresponding N4 interfaces.

The AMF 312 depicted in FIG. 3 may control UE access to the core network. The UE 301 may register with the network via AMF 312. It may be necessary for UE 301 to register prior to establishing a PDU session. The AMF 312 may manage a registration area of UE 301, enabling the network to track the physical location of UE 301 within the network. For a UE in connected mode, AMF 312 may manage UE mobility, for example, handovers from one AN or portion thereof to another. For a UE in idle mode, AMF 312 may perform registration updates and/or page the UE to transition the UE to connected mode.

The AMF 312 may receive, from UE 301, non-access stratum (NAS) messages transmitted in accordance with NAS protocol. NAS messages relate to communications between UE 301 and the core network. Although NAS messages may be relayed to AMF 312 via AN 302, they may be described as communications via the N1 interface. NAS messages may facilitate UE registration and mobility management, for example, by authenticating, identifying, configuring, and/or managing a connection of UE 301. NAS messages may support session management procedures for maintaining user plane connectivity and quality of service (QoS) of a session between UE 301 and DN 309. If the NAS message involves session management, AMF 312 may send the NAS message to SMF 314. NAS messages may be used to transport messages between UE 301 and other components of the core network (e.g., core network components other than AMF 312 and SMF 314). The AMF 312 may act on a particular NAS message itself, or alternatively, forward the NAS message to an appropriate core network function (e.g., SMF 314, etc.)

The SMF 314 depicted in FIG. 3 may establish, modify, and/or release a PDU session based on messaging received UE 301. The SMF 314 may allocate, manage, and/or assign an IP address to UE 301, for example, upon establishment of a PDU session. There may be multiple SMFs in the network, each of which may be associated with a respective group of wireless devices, base stations, and/or UPFs. A UE with multiple PDU sessions may be associated with a different SMF for each PDU session. As noted above, SMF 314 may select one or more UPFs to handle a PDU session and may control the handling of the PDU session by the selected UPF by providing rules for packet handling (PDR, FAR, QER, etc.). Rules relating to QoS and/or charging for a particular PDU session may be obtained from PCF 320 and provided to UPF 305.

The PCF 320 may provide, to other NFs, services relating to policy rules. The PCF 320 may use subscription data and information about network conditions to determine policy rules and then provide the policy rules to a particular NF which may be responsible for enforcement of those rules. Policy rules may relate to policy control for access and mobility, and may be enforced by the AMF. Policy rules may relate to session management, and may be enforced by the SMF 314. Policy rules may be, for example, network-specific, wireless device-specific, session-specific, or data flow-specific.

The NRF 330 may provide service discovery. The NRF 330 may belong to a particular PLMN. The NRF 330 may maintain NF profiles relating to other NFs in the communication network 300. The NF profile may include, for example, an address, PLMN, and/or type of the NF, a slice identifier, a list of the one or more services provided by the NF, and the authorization required to access the services.

The NEF 340 depicted in FIG. 3 may provide an interface to external domains, permitting external domains to selectively access the control plane of the communication network 300. The external domain may comprise, for example, third-party network functions, application functions, etc. The NEF 340 may act as a proxy between external elements and network functions such as AMF 312, SMF 314, PCF 320, UDM 350, etc. As an example, NEF 340 may determine a location or reachability status of UE 301 based on reports from AMF 312, and provide status information to an external element. As an example, an external element may provide, via NEF 340, information that facilitates the setting of parameters for establishment of a PDU session. The NEF 340 may determine which data and capabilities of the control plane are exposed to the external domain. The NEF 340 may provide secure exposure that authenticates and/or authorizes an external entity to which data or capabilities of the communication network 300 are exposed. The NEF 340 may selectively control the exposure such that the internal architecture of the core network is hidden from the external domain.

The UDM 350 may provide data storage for other NFs. The UDM 350 may permit a consolidated view of network information that may be used to ensure that the most relevant information can be made available to different NFs from a single resource. The UDM 350 may store and/or retrieve information from a unified data repository (UDR). For example, UDM 350 may obtain user subscription data relating to UE 301 from the UDR.

The AUSF 360 may support mutual authentication of UE 301 by the core network and authentication of the core network by UE 301. The AUSF 360 may perform key agreement procedures and provide keying material that can be used to improve security.

The NSSF 370 may select one or more network slices to be used by the UE 301. The NSSF 370 may select a slice based on slice selection information. For example, the NSSF 370 may receive Single Network Slice Selection Assistance Information (S-NSSAI) and map the S-NSSAI to a network slice instance identifier (NSI).

The CHF 380 may control billing-related tasks associated with UE 301. For example, UPF 305 may report traffic usage associated with UE 301 to SMF 314. The SMF 314 may collect usage data from UPF 305 and one or more other UPFs. The usage data may indicate how much data is exchanged, what DN the data is exchanged with, a network slice associated with the data, or any other information that may influence billing. The SMF 314 may share the collected usage data with the CHF. The CHF may use the collected usage data to perform billing-related tasks associated with UE 301. The CHF may, depending on the billing status of UE 301, instruct SMF 314 to limit or influence access of UE 301 and/or to provide billing-related notifications to UE 301.

The NWDAF 390 may collect and analyze data from other network functions and offer data analysis services to other network functions. As an example, NWDAF 390 may collect data relating to a load level for a particular network slice instance from UPF 305, AMF 312, and/or SMF 314. Based on the collected data, NWDAF 390 may provide load level data to the PCF 320 and/or NSSF 370, and/or notify the PC 220 and/or NSSF 370 if load level for a slice reaches and/or exceeds a load level threshold.

The AF 399 may be outside the core network, but may interact with the core network to provide information relating to the QoS requirements or traffic routing preferences associated with a particular application. The AF 399 may access the core network based on the exposure constraints imposed by the NEF 340. However, an operator of the core network may consider the AF 399 to be a trusted domain that can access the network directly.

Figure 4A:
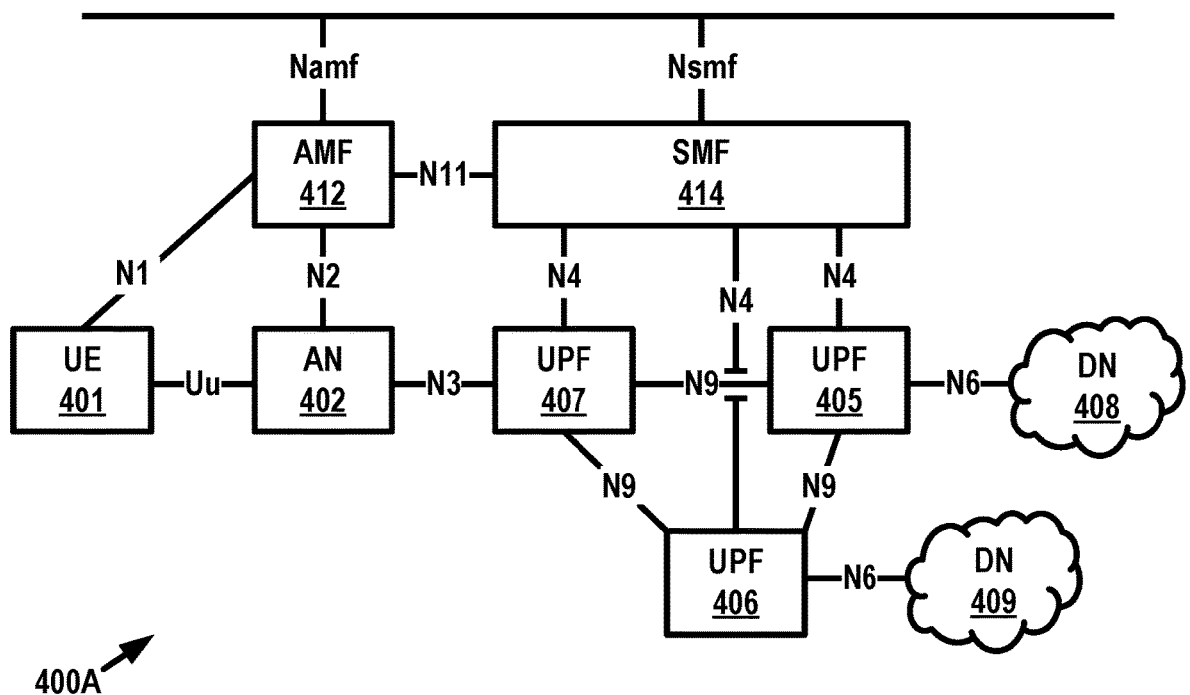
FIG. 4A and FIG. 4B illustrate example of core network architecture with multiple user plane functions and untrusted access.
Figure 4B:
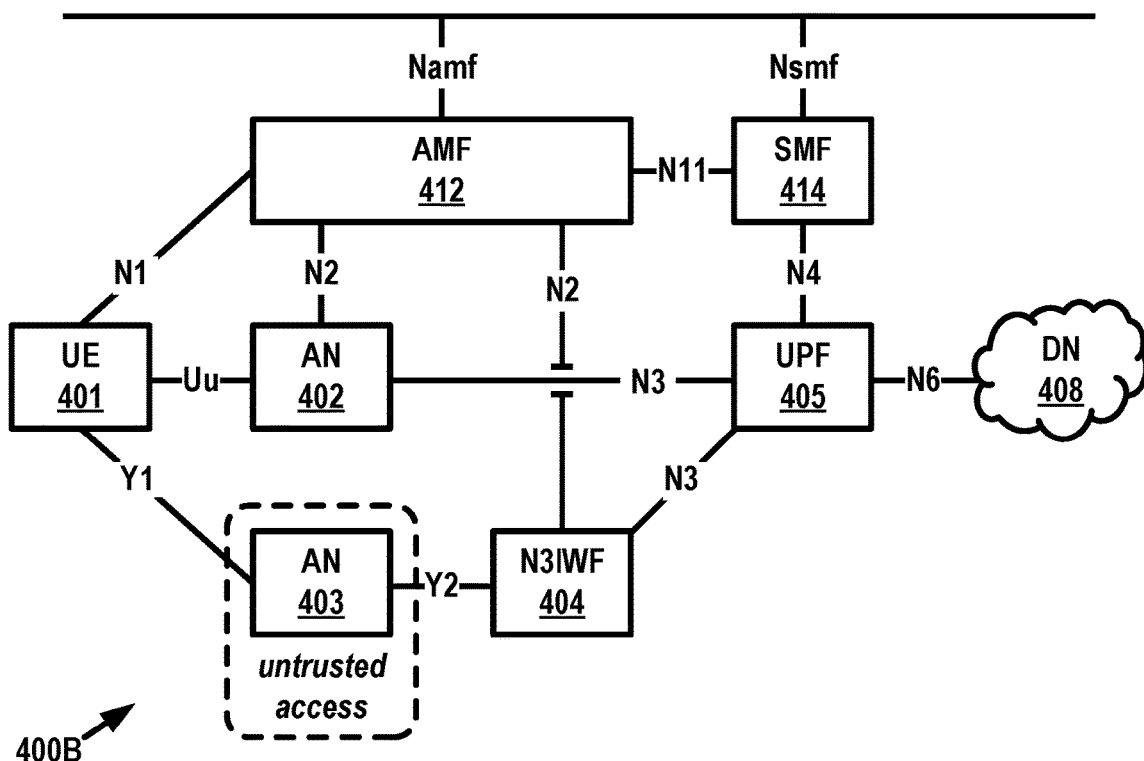
Figure 5:
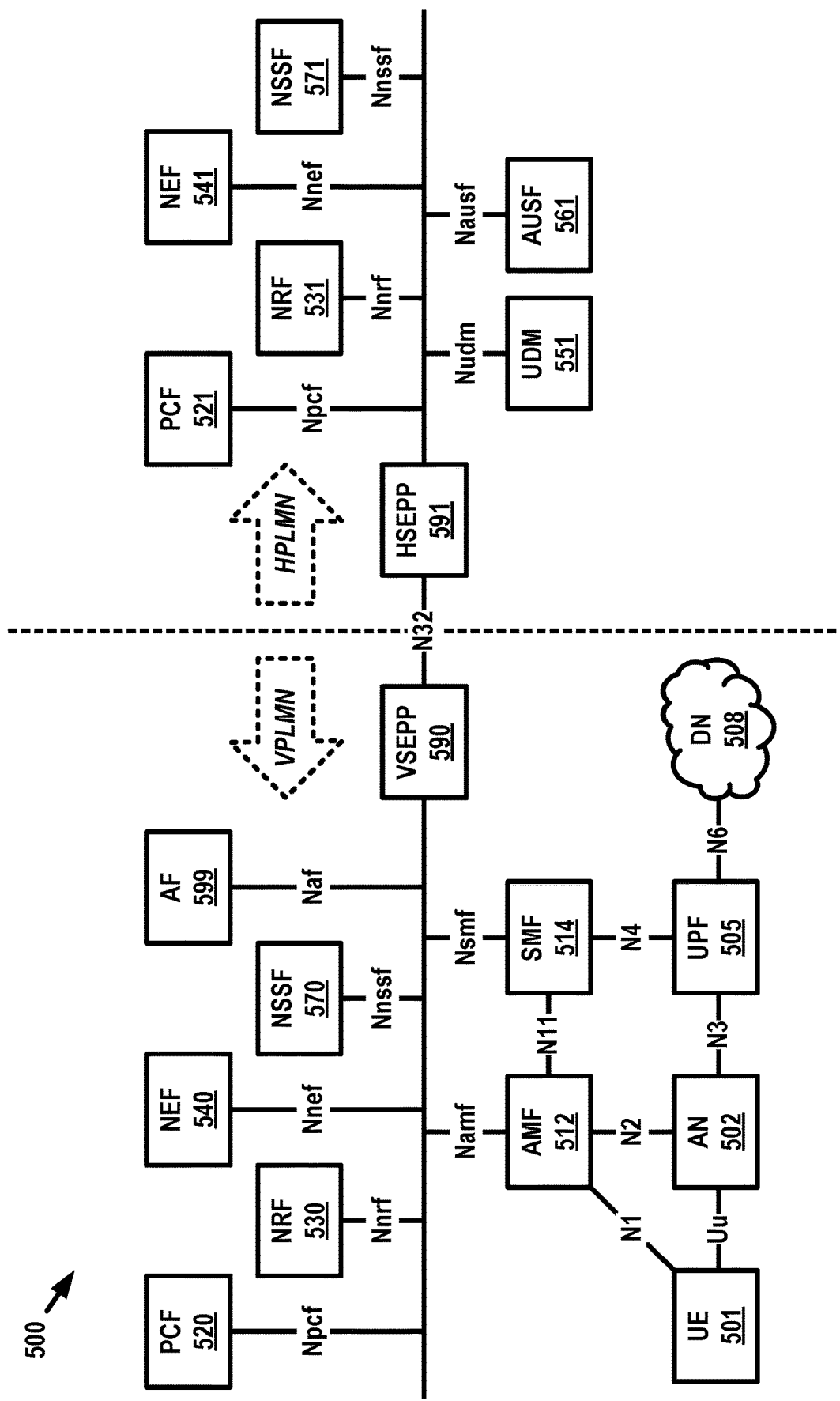
FIG. 5 illustrates an example of a core network architecture for a roaming scenario.

FIGS. 4A, 4B, and 5 illustrate other examples of core network architectures that are analogous in some respects to the core network architecture 300 depicted in FIG. 3. For conciseness, some of the core network elements depicted in FIG. 3 are omitted. Many of the elements depicted in FIGS. 4A, 4B, and 5 are analogous in some respects to elements depicted in FIG. 3. For conciseness, some of the details relating to their functions or operation are omitted.

FIG. 4A illustrates an example of a core network architecture 400A comprising an arrangement of multiple UPFs. Core network architecture 400A includes a UE 401, an AN 402, an AMF 412, and an SMF 414. Unlike previous examples of core network architectures described above, FIG. 4A depicts multiple UPFs, including a UPF 405, a UPF 406, and a UPF 407, and multiple DNs, including a DN 408 and a DN 409. Each of the multiple UPFs 405, 406, 407 may communicate with the SMF 414 via an N4 interface. The DNs 408, 409 communicate with the UPFs 405, 406, respectively, via N6 interfaces. As shown in FIG. 4A, the multiple UPFs 405, 406, 407 may communicate with one another via N9 interfaces.

The UPFs 405, 406, 407 may perform traffic detection, in which the UPFs identify and/or classify packets. Packet identification may be performed based on packet detection rules (PDR) provided by the SMF 414. A PDR may include packet detection information comprising one or more of: a source interface, a UE IP address, core network (CN) tunnel information (e.g., a CN address of an N3/N9 tunnel corresponding to a PDU session), a network instance identifier, a quality of service flow identifier (QFI), a filter set (for example, an IP packet filter set or an ethernet packet filter set), and/or an application identifier.

In addition to indicating how a particular packet is to be detected, a PDR may further indicate rules for handling the packet upon detection thereof. The rules may include, for example, forwarding action rules (FARs), multi-access rules (MARs), usage reporting rules (URRs), QoS enforcement rules (QERs), etc. For example, the PDR may comprise one or more FAR identifiers, MAR identifiers, URR identifiers, and/or QER identifiers. These identifiers may indicate the rules that are prescribed for the handling of a particular detected packet.

The UPF 405 may perform traffic forwarding in accordance with a FAR. For example, the FAR may indicate that a packet associated with a particular PDR is to be forwarded, duplicated, dropped, and/or buffered. The FAR may indicate a destination interface, for example, "access" for downlink or "core" for uplink. If a packet is to be buffered, the FAR may indicate a buffering action rule (BAR). As an example, UPF 405 may perform data buffering of a certain number downlink packets if a PDU session is deactivated.

The UPF 405 may perform QoS enforcement in accordance with a QER. For example, the QER may indicate a guaranteed bitrate that is authorized and/or a maximum bitrate to be enforced for a packet associated with a particular PDR. The QER may indicate that a particular guaranteed and/or maximum bitrate may be for uplink packets and/or downlink packets. The UPF 405 may mark packets belonging to a particular QoS flow with a corresponding QFI. The marking may enable a recipient of the packet to determine a QoS of the packet.

The UPF 405 may provide usage reports to the SMF 414 in accordance with a URR. The URR may indicate one or more triggering conditions for generation and reporting of the usage report, for example, immediate reporting, periodic reporting, a threshold for incoming uplink traffic, or any other suitable triggering condition. The URR may indicate a method for measuring usage of network resources, for example, data volume, duration, and/or event.

As noted above, the DNs 408, 409 may comprise public DNs (e.g., the Internet), private DNs (e.g., private, internal corporate-owned DNs), and/or intra-operator DNs. Each DN may provide an operator service and/or a third-party service. The service provided by a DN may be the Internet, an IP multimedia subsystem (IMS), an augmented or virtual reality network, an edge computing or mobile edge computing (MEC) network, etc. Each DN may be identified using a data network name (DNN). The UE 401 may be configured to establish a first logical connection with DN 408 (a first PDU session), a second logical connection with DN 409 (a second PDU session), or both simultaneously (first and second PDU sessions).

Each PDU session may be associated with at least one UPF configured to operate as a PDU session anchor (PSA, or "anchor"). The anchor may be a UPF that provides an N6 interface with a DN.

In the example of FIG. 4A, UPF 405 may be the anchor for the first PDU session between UE 401 and DN 408, whereas the UPF 406 may be the anchor for the second PDU session between UE 401 and DN 409. The core network may use the anchor to provide service continuity of a particular PDU session (for example, IP address continuity) as UE 401 moves from one access network to another. For example, suppose that UE 401 establishes a PDU session using a data path to the DN 408 using an access network other than AN 402. The data path may include UPF 405 acting as anchor. Suppose further that the UE 401 later moves into the coverage area of the AN 402. In such a scenario, SMF 414 may select a new UPF (UPF 407) to bridge the gap between the newly-entered access network (AN 402) and the anchor UPF (UPF 405). The continuity of the PDU session may be preserved as any number of UPFs are added or removed from the data path. When a UPF is added to a data path, as shown in FIG. 4A, it may be described as an intermediate UPF and/or a cascaded UPF.

As noted above, UPF 406 may be the anchor for the second PDU session between UE 401 and DN 409. Although the anchor for the first and second PDU sessions are associated with different UPFs in FIG. 4A, it will be understood that this is merely an example. It will also be understood that multiple PDU sessions with a single DN may correspond to any number of anchors. When there are multiple UPFs, a UPF at the branching point (UPF 407 in FIG. 4) may operate as an uplink classifier (UL-CL). The UL-CL may divert uplink user plane traffic to different UPFs.

The SMF 414 may allocate, manage, and/or assign an IP address to UE 401, for example, upon establishment of a PDU session. The SMF 414 may maintain an internal pool of IP addresses to be assigned. The SMF 414 may, if necessary, assign an IP address provided by a dynamic host configuration protocol (DHCP) server or an authentication, authorization, and accounting (AAA) server. IP address management may be performed in accordance with a session and service continuity (SSC) mode. In SSC mode 1, an IP address of UE 401 may be maintained (and the same anchor UPF may be used) as the wireless device moves within the network. In SSC mode 2, the IP address of UE 401 changes as UE 401 moves within the network (e.g., the old IP address and UPF may be abandoned and a new IP address and anchor UPF may be established). In SSC mode 3, it may be possible to maintain an old IP address (similar to SSC mode 1) temporarily while establishing a new IP address (similar to SSC mode 2), thus combining features of SSC modes 1 and 2. Applications that are sensitive to IP address changes may operate in accordance with SSC mode 1.

UPF selection may be controlled by SMF 414. For example, upon establishment and/or modification of a PDU session between UE 401 and DN 408, SMF 414 may select UPF 405 as the anchor for the PDU session and/or UPF 407 as an intermediate UPF. Criteria for UPF selection include path efficiency and/or speed between AN 402 and DN 408. The reliability, load status, location, slice support and/or other capabilities of candidate UPFs may also be considered.

FIG. 4B illustrates an example of a core network architecture 400B that accommodates untrusted access. Similar to FIG. 4A, UE 401 as depicted in FIG. 4B connects to DN 408 via AN 402 and UPF 405. The AN 402 and UPF 405 constitute trusted (e.g., 3GPP) access to the DN 408. By contrast, UE 401 may also access DN 408 using an untrusted access network, AN 403, and a non-3GPP interworking function (N3IWF) 404.

The AN 403 may be, for example, a wireless land area network (WLAN) operating in accordance with the IEEE 802.11 standard. The UE 401 may connect to AN 403, via an interface Y1, in whatever manner is prescribed for AN 403. The connection to AN 403 may or may not involve authentication. The UE 401 may obtain an IP address from AN 403. The UE 401 may determine to connect to core network 400B and select untrusted access for that purpose. The AN 403 may communicate with N3IWF 404 via a Y2 interface. After selecting untrusted access, the UE 401 may provide N3IWF 404 with sufficient information to select an AMF. The selected AMF may be, for example, the same AMF that is used by UE 401 for 3GPP access (AMF 412 in the present example). The N3IWF 404 may communicate with AMF 412 via an N2 interface. The UPF 405 may be selected and N3IWF 404 may communicate with UPF 405 via an N3 interface. The UPF 405 may be a PDU session anchor (PSA) and may remain the anchor for the PDU session even as UE 401 shifts between trusted access and untrusted access.

FIG. 5 illustrates an example of a core network architecture 500 in which a UE 501 is in a roaming scenario. In a roaming scenario, UE 501 is a subscriber of a first PLMN (a home PLMN, or HPLMN) but attaches to a second PLMN (a visited PLMN, or VPLMN). Core network architecture 500 includes UE 501, an AN 502, a UPF 505, and a DN 508. The AN 502 and UPF 505 may be associated with a VPLMN. The VPLMN may manage the AN 502 and UPF 505 using core network elements associated with the VPLMN, including an AMF 512, an SMF 514, a PCF 520, an NRF 530, an NEF 540, and an NSSF 570. An AF 599 may be adjacent the core network of the VPLMN.

The UE 501 may not be a subscriber of the VPLMN. The AMF 512 may authorize UE 501 to access the network based on, for example, roaming restrictions that apply to UE 501. In order to obtain network services provided by the VPLMN, it may be necessary for the core network of the VPLMN to interact with core network elements of a HPLMN of UE 501, in particular, a PCF 521, an NRF 531, an NEF 541, a UDM 551, and/or an AUSF 561. The VPLMN and HPLMN may communicate using an N32 interface connecting respective security edge protection proxies (SEPPs). In FIG. 5, the respective SEPPs are depicted as a VSEPP 590 and an HSEPP 591.

The VSEPP 590 and the HSEPP 591 communicate via an N32 interface for defined purposes while concealing information about each PLMN from the other. The SEPPs may apply roaming policies based on communications via the N32 interface. The PCF 520 and PCF 521 may communicate via the SEPPs to exchange policy-related signaling. The NRF 530 and NRF 531 may communicate via the SEPPs to enable service discovery of NFs in the respective PLMNs. The VPLMN and HPLMN may independently maintain NEF 540 and NEF 541. The NSSF 570 and NSSF 571 may communicate via the SEPPs to coordinate slice selection for UE 501. The HPLMN may handle all authentication and subscription related signaling. For example, when the UE 501 registers or requests service via the VPLMN, the VPLMN may authenticate UE 501 and/or obtain subscription data of UE 501 by accessing, via the SEPPs, the UDM 551 and AUSF 561 of the HPLMN.

The core network architecture 500 depicted in FIG. 5 may be referred to as a local breakout configuration, in which UE 501 accesses DN 508 using one or more UPFs of the VPLMN (i.e., UPF 505). However, other configurations are possible. For example, in a home-routed configuration (not shown in FIG. 5), UE 501 may access a DN using one or more UPFs of the HPLMN. In the home-routed configuration, an N9 interface may run parallel to the N32 interface, crossing the frontier between the VPLMN and the HPLMN to carry user plane data. One or more SMFs of the respective PLMNs may communicate via the N32 interface to coordinate session management for UE 501. The SMFs may control their respective UPFs on either side of the frontier.

Figure 6:
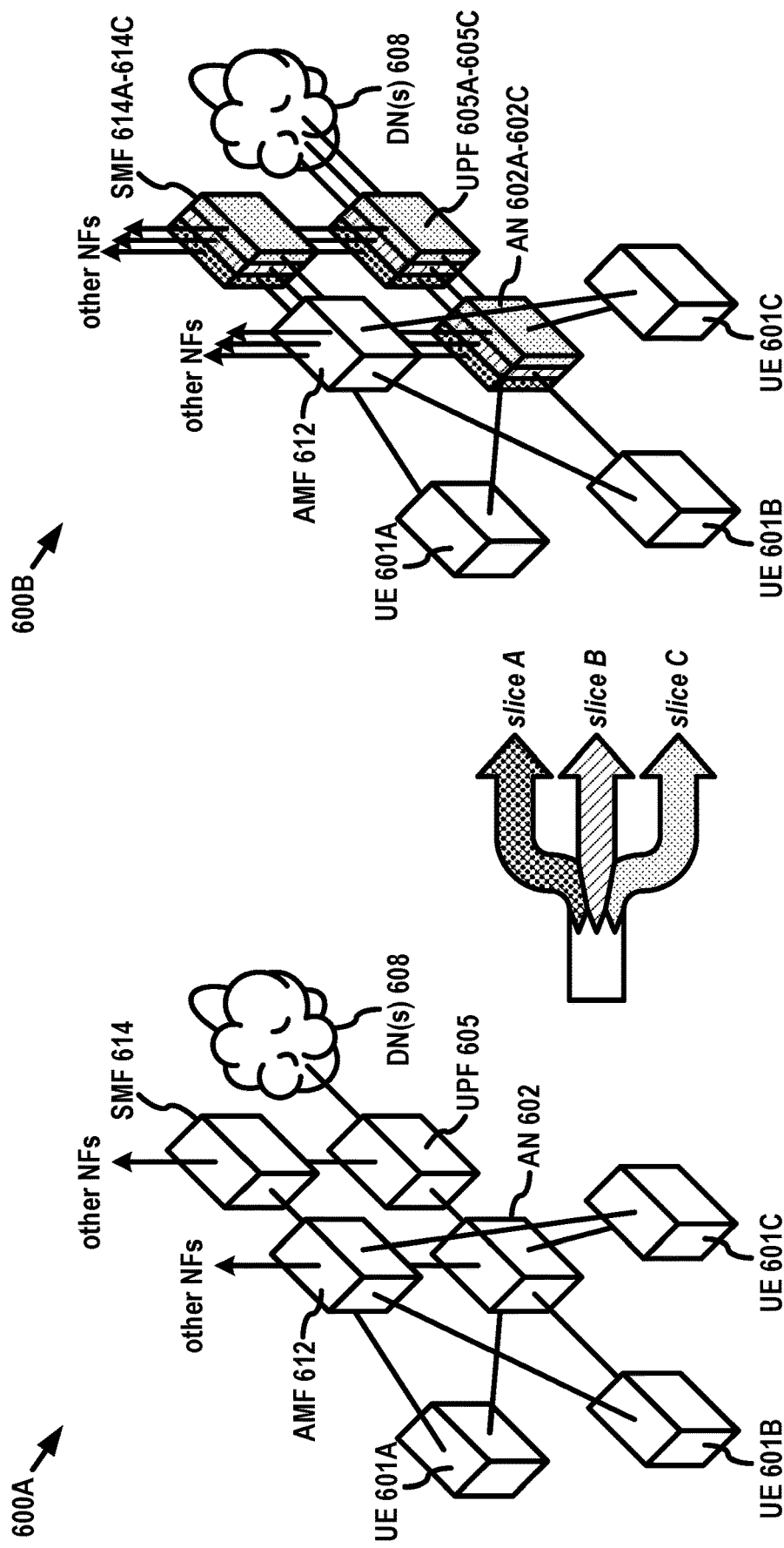
FIG. 6 illustrates an example of network slicing.

FIG. 6 illustrates an example of network slicing. Network slicing may refer to division of shared infrastructure (e.g., physical infrastructure) into distinct logical networks. These distinct logical networks may be independently controlled, isolated from one another, and/or associated with dedicated resources.

Network architecture 600A illustrates an un-sliced physical network corresponding to a single logical network. The network architecture 600A comprises a user plane wherein UEs 601A, 601B, 601C (collectively, UEs 601) have a physical and logical connection to a DN 608 via an AN 602 and a UPF 605. The network architecture 600A comprises a control plane wherein an AMF 612 and a SMF 614 control various aspects of the user plane.

The network architecture 600A may have a specific set of characteristics (e.g., relating to maximum bit rate, reliability, latency, bandwidth usage, power consumption, etc.). This set of characteristics may be affected by the nature of the network elements themselves (e.g., processing power, availability of free memory, proximity to other network elements, etc.) or the management thereof (e.g., optimized to maximize bit rate or reliability, reduce latency or power bandwidth usage, etc.). The characteristics of network architecture 600A may change over time, for example, by upgrading equipment or by modifying procedures to target a particular characteristic. However, at any given time, network architecture 600A will have a single set of characteristics that may or may not be optimized for a particular use case. For example, UEs 601A, 601B, 601C may have different requirements, but network architecture 600A can only be optimized for one of the three.

Network architecture 600B is an example of a sliced physical network divided into multiple logical networks. In FIG. 6, the physical network is divided into three logical networks, referred to as slice A, slice B, and slice C. For example, UE 601A may be served by AN 602A, UPF 605A, AMF 612, and SMF 614A. UE 601B may be served by AN 602B, UPF 605B, AMF 612, and SMF 614B. UE 601C may be served by AN 602C, UPF 605C, AMF 612, and SMF 614C. Although the respective UEs 601 communicate with different network elements from a logical perspective, these network elements may be deployed by a network operator using the same physical network elements.

Each network slice may be tailored to network services having different sets of characteristics. For example, slice A may correspond to enhanced mobile broadband (eMBB) service. Mobile broadband may refer to internet access by mobile users, commonly associated with smartphones. Slice B may correspond to ultra-reliable low-latency communication (URLLC), which focuses on reliability and speed. Relative to eMBB, URLLC may improve the feasibility of use cases such as autonomous driving and telesurgery. Slice C may correspond to massive machine type communication (mMTC), which focuses on low-power services delivered to a large number of users. For example, slice C may be optimized for a dense network of battery-powered sensors that provide small amounts of data at regular intervals. Many mMTC use cases would be prohibitively expensive if they operated using an eMBB or URLLC network.

If the service requirements for one of the UEs 601 changes, then the network slice serving that UE can be updated to provide better service. Moreover, the set of network characteristics corresponding to eMBB, URLLC, and mMTC may be varied, such that differentiated species of eMBB, URLLC, and mMTC are provided. Alternatively, network operators may provide entirely new services in response to, for example, customer demand.

In FIG. 6, each of the UEs 601 has its own network slice. However, it will be understood that a single slice may serve any number of UEs and a single UE may operate using any number of slices. Moreover, in the example network architecture 600B, the AN 602, UPF 605 and SMF 614 are separated into three separate slices, whereas the AMF 612 is unsliced. However, it will be understood that a network operator may deploy any architecture that selectively utilizes any mix of sliced and unsliced network elements, with different network elements divided into different numbers of slices. Although FIG. 6 only depicts three core network functions, it will be understood that other core network functions may be sliced as well. A PLMN that supports multiple network slices may maintain a separate network repository function (NFR) for each slice, enabling other NFs to discover network services associated with that slice.

Network slice selection may be controlled by an AMF, or alternatively, by a separate network slice selection function (NSSF). For example, a network operator may define and implement distinct network slice instances (NSIs). Each NSI may be associated with single network slice selection assistance information (S-NSSAI). The S-NSSAI may include a particular slice/service type (SST) indicator (indicating eMBB, URLLC, mMTC, etc.). as an example, a particular tracking area may be associated with one or more configured S-NSSAIs. UEs may identify one or more requested and/or subscribed S-NSSAIs (e.g., during registration). The network may indicate to the UE one or more allowed and/or rejected S-NSSAIs.

The S-NSSAI may further include a slice differentiator (SD) to distinguish between different tenants of a particular slice and/or service type. For example, a tenant may be a customer (e.g., vehicle manufacture, service provider, etc.) of a network operator that obtains (for example, purchases) guaranteed network resources and/or specific policies for handling its subscribers. The network operator may configure different slices and/or slice types, and use the SD to determine which tenant is associated with a particular slice.

Figure 7C:
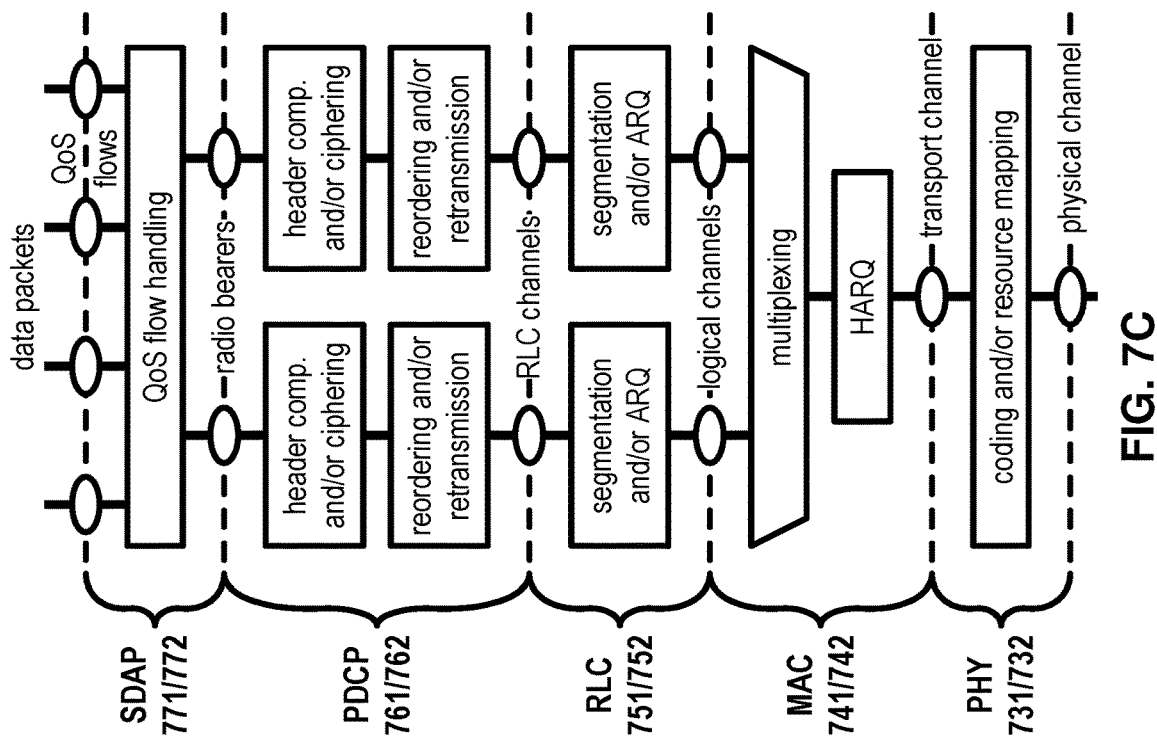
FIG. 7A, FIG. 7B, and FIG. 7C illustrate a user plane protocol stack, a control plane protocol stack, and services provided between protocol layers of the user plane protocol stack.
Figure 7A:
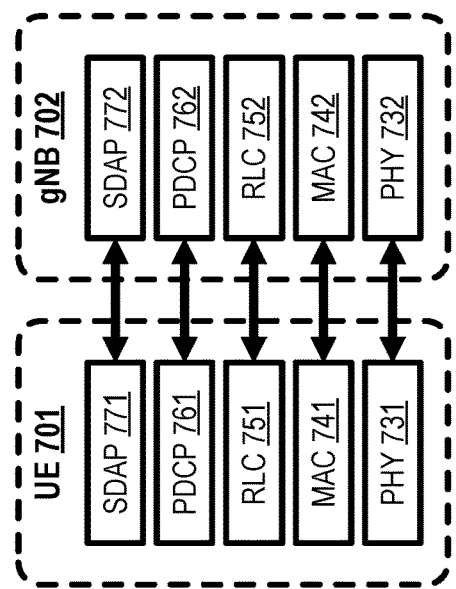
Figure 7B:
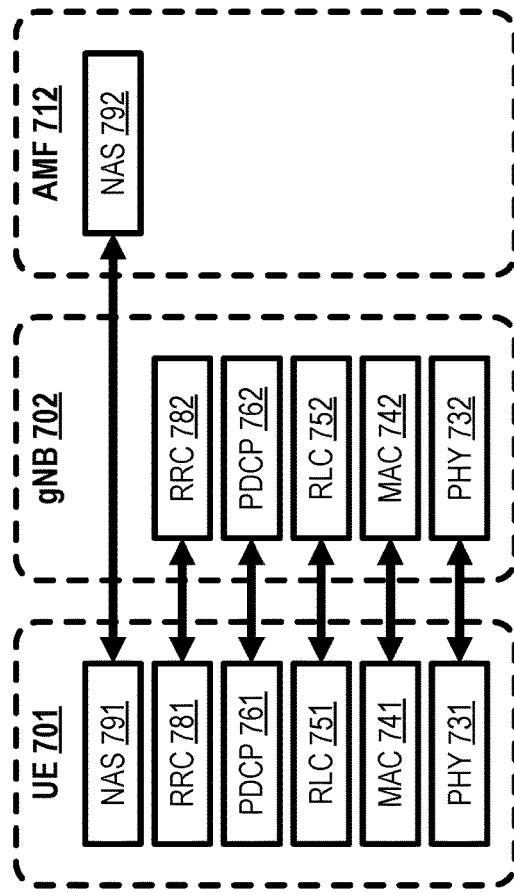

FIG. 7A, FIG. 7B, and FIG. 7C illustrate a user plane (UP) protocol stack, a control plane (CP) protocol stack, and services provided between protocol layers of the UP protocol stack.

The layers may be associated with an open system interconnection (OSI) model of computer networking functionality. In the OSI model, layer 1 may correspond to the bottom layer, with higher layers on top of the bottom layer. Layer 1 may correspond to a physical layer, which is concerned with the physical infrastructure used for transfer of signals (for example, cables, fiber optics, and/or radio frequency transceivers). In New Radio (NR), layer 1 may comprise a physical layer (PHY). Layer 2 may correspond to a data link layer. Layer 2 may be concerned with packaging of data (into, e.g., data frames) for transfer, between nodes of the network, using the physical infrastructure of layer 1. In NR, layer 2 may comprise a media access control layer (MAC), a radio link control layer (RLC), a packet data convergence layer (PDCP), and a service data application protocol layer (SDAP).

Layer 3 may correspond to a network layer. Layer 3 may be concerned with routing of the data which has been packaged in layer 2. Layer 3 may handle prioritization of data and traffic avoidance. In NR, layer 3 may comprise a radio resource control layer (RRC) and a non-access stratum layer (NAS). Layers 4 through 7 may correspond to a transport layer, a session layer, a presentation layer, and an application layer. The application layer interacts with an end user to provide data associated with an application. In an example, an end user implementing the application may generate data associated with the application and initiate sending of that information to a targeted data network (e.g., the Internet, an application server, etc.). Starting at the application layer, each layer in the OSI model may manipulate and/or repackage the information and deliver it to a lower layer. At the lowest layer, the manipulated and/or repackaged information may be exchanged via physical infrastructure (for example, electrically, optically, and/or electromagnetically). As it approaches the targeted data network, the information will be unpackaged and provided to higher and higher layers, until it once again reaches the application layer in a form that is usable by the targeted data network (e.g., the same form in which it was provided by the end user). To respond to the end user, the data network may perform this procedure in reverse.

FIG. 7A illustrates a user plane protocol stack. The user plane protocol stack may be a new radio (NR) protocol stack for a Uu interface between a UE 701 and a gNB 702. In layer 1 of the UP protocol stack, the UE 701 may implement PHY 731 and the gNB 702 may implement PHY 732. In layer 2 of the UP protocol stack, the UE 701 may implement MAC 741, RLC 751, PDCP 761, and SDAP 771. The gNB 702 may implement MAC 742, RLC 752, PDCP 762, and SDAP 772.

FIG. 7B illustrates a control plane protocol stack. The control plane protocol stack may be an NR protocol stack for the Uu interface between the UE 701 and the gNB 702 and/or an N1 interface between the UE 701 and an AMF 712. In layer 1 of the CP protocol stack, the UE 701 may implement PHY 731 and the gNB 702 may implement PHY 732. In layer 2 of the CP protocol stack, the UE 701 may implement MAC 741, RLC 751, PDCP 761, RRC 781, and NAS 791. The gNB 702 may implement MAC 742, RLC 752, PDCP 762, and RRC 782. The AMF 712 may implement NAS 792.

The NAS may be concerned with the non-access stratum, in particular, communication between the UE 701 and the core network (e.g., the AMF 712). Lower layers may be concerned with the access stratum, for example, communication between the UE 701 and the gNB 702. Messages sent between the UE 701 and the core network may be referred to as NAS messages. In an example, a NAS message may be relayed by the gNB 702, but the content of the NAS message (e.g., information elements of the NAS message) may not be visible to the gNB 702.

FIG. 7C illustrates an example of services provided between protocol layers of the NR user plane protocol stack illustrated in FIG. 7A. The UE 701 may receive services through a PDU session, which may be a logical connection between the UE 701 and a data network (DN). The UE 701 and the DN may exchange data packets associated with the PDU session. The PDU session may comprise one or more quality of service (QoS) flows. SDAP 771 and SDAP 772 may perform mapping and/or demapping between the one or more QoS flows of the PDU session and one or more radio bearers (e.g., data radio bearers). The mapping between the QoS flows and the data radio bearers may be determined in the SDAP 772 by the gNB 702, and the UE 701 may be notified of the mapping (e.g., based on control signaling and/or reflective mapping). For reflective mapping, the SDAP 772 of the gNB 220 may mark downlink packets with a QoS flow indicator (QFI) and deliver the downlink packets to the UE 701. The UE 701 may determine the mapping based on the QFI of the downlink packets.

PDCP 761 and PDCP 762 may perform header compression and/or decompression. Header compression may reduce the amount of data transmitted over the physical layer. The PDCP 761 and PDCP 762 may perform ciphering and/or deciphering. Ciphering may reduce unauthorized decoding of data transmitted over the physical layer (e.g., intercepted on an air interface), and protect data integrity (e.g., to ensure control messages originate from intended sources). The PDCP 761 and PDCP 762 may perform retransmissions of undelivered packets, in-sequence delivery and reordering of packets, duplication of packets, and/or identification and removal of duplicate packets. In a dual connectivity scenario, PDCP 761 and PDCP 762 may perform mapping between a split radio bearer and RLC channels.

RLC 751 and RLC 752 may perform segmentation, retransmission through Automatic Repeat Request (ARQ). The RLC 751 and RLC 752 may perform removal of duplicate data units received from MAC 741 and MAC 742, respectively. The RLCs 213 and 223 may provide RLC channels as a service to PDCPs 214 and 224, respectively.

MAC 741 and MAC 742 may perform multiplexing and/or demultiplexing of logical channels. MAC 741 and MAC 742 may map logical channels to transport channels. In an example, UE 701 may, in MAC 741, multiplex data units of one or more logical channels into a transport block. The UE 701 may transmit the transport block to the gNB 702 using PHY 731. The gNB 702 may receive the transport block using PHY 732 and demultiplex data units of the transport blocks back into logical channels. MAC 741 and MAC 742 may perform error correction through Hybrid Automatic Repeat Request (HARM), logical channel prioritization, and/or padding.

PHY 731 and PHY 732 may perform mapping of transport channels to physical channels. PHY 731 and PHY 732 may perform digital and analog signal processing functions (e.g., coding/decoding and modulation/demodulation) for sending and receiving information (e.g., transmission via an air interface). PHY 731 and PHY 732 may perform multi-antenna mapping.

Figure 8:
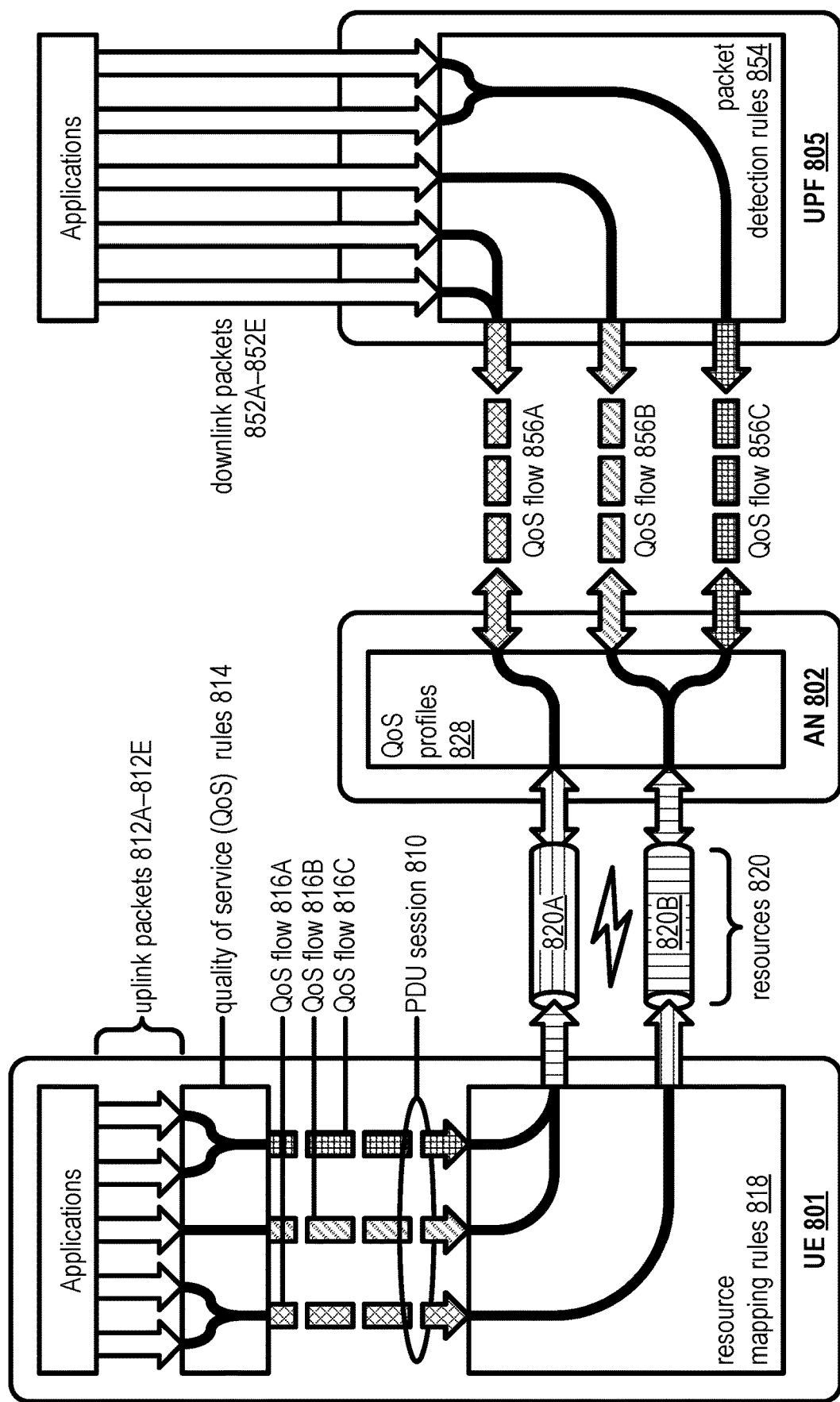
FIG. 8 illustrates an example of a quality of service model for data exchange.

FIG. 8 illustrates an example of a quality of service (QoS) model for differentiated data exchange. In the QoS model of FIG. 8, there are a UE 801, a AN 802, and a UPF 805. The QoS model facilitates prioritization of certain packet or protocol data units (PDUs), also referred to as packets. For example, higher-priority packets may be exchanged faster and/or more reliably than lower-priority packets. The network may devote more resources to exchange of high-QoS packets.

In the example of FIG. 8, a PDU session 810 is established between UE 801 and UPF 805. The PDU session 810 may be a logical connection enabling the UE 801 to exchange data with a particular data network (for example, the Internet). The UE 801 may request establishment of the PDU session 810. At the time that the PDU session 810 is established, the UE 801 may, for example, identify the targeted data network based on its data network name (DNN). The PDU session 810 may be managed, for example, by a session management function (SMF, not shown). In order to facilitate exchange of data associated with the PDU session 810, between the UE 801 and the data network, the SMF may select the UPF 805 (and optionally, one or more other UPFs, not shown).

One or more applications associated with UE 801 may generate uplink packets 812A-812E associated with the PDU session 810. In order to work within the QoS model, UE 801 may apply QoS rules 814 to uplink packets 812A-812E. The QoS rules 814 may be associated with PDU session 810 and may be determined and/or provided to the UE 801 when PDU session 810 is established and/or modified. Based on QoS rules 814, UE 801 may classify uplink packets 812A-812E, map each of the uplink packets 812A-812E to a QoS flow, and/or mark uplink packets 812A-812E with a QoS flow indicator (QFI). As a packet travels through the network, and potentially mixes with other packets from other UEs having potentially different priorities, the QFI indicates how the packet should be handled in accordance with the QoS model. In the present illustration, uplink packets 812A, 812B are mapped to QoS flow 816A, uplink packet 812C is mapped to QoS flow 816B, and the remaining packets are mapped to QoS flow 816C.

The QoS flows may be the finest granularity of QoS differentiation in a PDU session. In the figure, three QoS flows 816A-816C are illustrated. However, it will be understood that there may be any number of QoS flows. Some QoS flows may be associated with a guaranteed bit rate (GBR QoS flows) and others may have bit rates that are not guaranteed (non-GBR QoS flows). QoS flows may also be subject to per-UE and per-session aggregate bit rates. One of the QoS flows may be a default QoS flow. The QoS flows may have different priorities. For example, QoS flow 816A may have a higher priority than QoS flow 816B, which may have a higher priority than QoS flow 816C. Different priorities may be reflected by different QoS flow characteristics. For example, QoS flows may be associated with flow bit rates. A particular QoS flow may be associated with a guaranteed flow bit rate (GFBR) and/or a maximum flow bit rate (MFBR). QoS flows may be associated with specific packet delay budgets (PDBs), packet error rates (PERs), and/or maximum packet loss rates. QoS flows may also be subject to per-UE and per-session aggregate bit rates.

In order to work within the QoS model, UE 801 may apply resource mapping rules 818 to the QoS flows 816A-816C. The air interface between UE 801 and AN 802 may be associated with resources 820. In the present illustration, QoS flow 816A is mapped to resource 820A, whereas QoS flows 816B, 816C are mapped to resource 820B. The resource mapping rules 818 may be provided by the AN 802. In order to meet QoS requirements, the resource mapping rules 818 may designate more resources for relatively high-priority QoS flows. With more resources, a high-priority QoS flow such as QoS flow 816A may be more likely to obtain the high flow bit rate, low packet delay budget, or other characteristic associated with QoS rules 814. The resources 820 may comprise, for example, radio bearers. The radio bearers (e.g., data radio bearers) may be established between the UE 801 and the AN 802. The radio bearers in 5G, between the UE 801 and the AN 802, may be distinct from bearers in LTE, for example, Evolved Packet System (EPS) bearers between a UE and a packet data network gateway (PGW), S1 bearers between an eNB and a serving gateway (SGW), and/or an S5/S8 bearer between an SGW and a PGW.

Once a packet associated with a particular QoS flow is received at AN 802 via resource 820A or resource 820B, AN 802 may separate packets into respective QoS flows 856A-856C based on QoS profiles 828. The QoS profiles 828 may be received from an SMF. Each QoS profile may correspond to a QFI, for example, the QFI marked on the uplink packets 812A-812E. Each QoS profile may include QoS parameters such as 5G QoS identifier (5QI) and an allocation and retention priority (ARP). The QoS profile for non-GBR QoS flows may further include additional QoS parameters such as a reflective QoS attribute (RQA). The QoS profile for GBR QoS flows may further include additional QoS parameters such as a guaranteed flow bit rate (GFBR), a maximum flow bit rate (MFBR), and/or a maximum packet loss rate. The 5QI may be a standardized 5QI which have one-to-one mapping to a standardized combination of 5G QoS characteristics per well-known services. The 5QI may be a dynamically assigned 5QI which the standardized 5QI values are not defined. The 5QI may represent 5G QoS characteristics. The 5QI may comprise a resource type, a default priority level, a packet delay budget (PDB), a packet error rate (PER), a maximum data burst volume, and/or an averaging window. The resource type may indicate a non-GBR QoS flow, a GBR QoS flow or a delay-critical GBR QoS flow. The averaging window may represent a duration over which the GFBR and/or MFBR is calculated. ARP may be a priority level comprising pre-emption capability and a pre-emption vulnerability. Based on the ARP, the AN 802 may apply admission control for the QoS flows in a case of resource limitations.

The AN 802 may select one or more N3 tunnels 850 for transmission of the QoS flows 856A-856C. After the packets are divided into QoS flows 856A-856C, the packet may be sent to UPF 805 (e.g., towards a DN) via the selected one or more N3 tunnels 850. The UPF 805 may verify that the QFIs of the uplink packets 812A-812E are aligned with the QoS rules 814 provided to the UE 801. The UPF 805 may measure and/or count packets and/or provide packet metrics to, for example, a PCF.

The figure also illustrates a process for downlink. In particular, one or more applications may generate downlink packets 852A-852E. The UPF 805 may receive downlink packets 852A-852E from one or more DNs and/or one or more other UPFs. As per the QoS model, UPF 805 may apply packet detection rules (PDRs) 854 to downlink packets 852A-852E. Based on PDRs 854, UPF 805 may map packets 852A-852E into QoS flows. In the present illustration, downlink packets 852A, 852B are mapped to QoS flow 856A, downlink packet 852C is mapped to QoS flow 856B, and the remaining packets are mapped to QoS flow 856C.

The QoS flows 856A-856C may be sent to AN 802. The AN 802 may apply resource mapping rules to the QoS flows 856A-856C. In the present illustration, QoS flow 856A is mapped to resource 820A, whereas QoS flows 856B, 856C are mapped to resource 820B. In order to meet QoS requirements, the resource mapping rules may designate more resources to high-priority QoS flows.

FIGS. 9A-9D illustrate example states and state transitions of a wireless device (e.g., a UE). At any given time, the wireless device may have a radio resource control (RRC) state, a registration management (RM) state, and a connection management (CM) state.

Figure 9A:
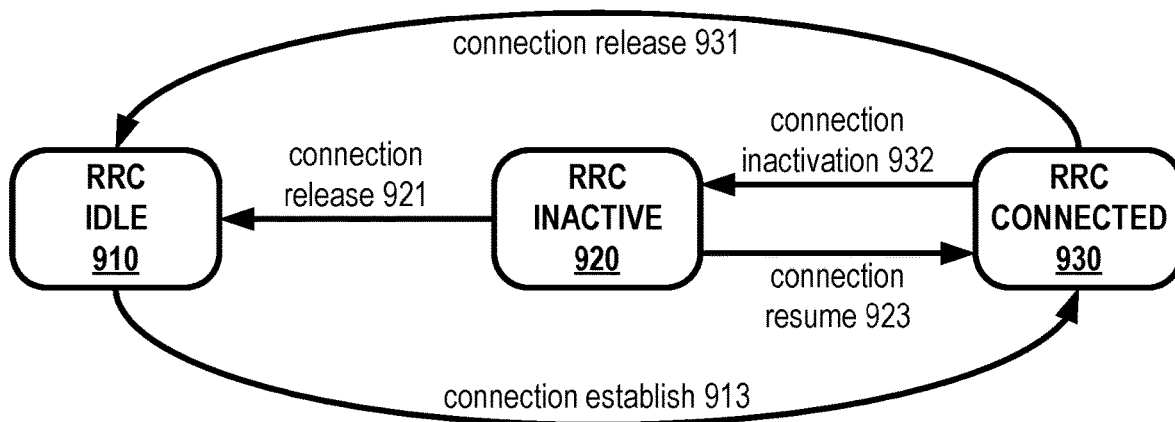
FIG. 9A, FIG. 9B, FIG. 9C, and FIG. 9D illustrate example states and state transitions of a wireless device.

FIG. 9A is an example diagram showing RRC state transitions of a wireless device (e.g., a UE). The UE may be in one of three RRC states: RRC idle 910, (e.g., RRC_IDLE), RRC inactive 920 (e.g., RRC_INACTIVE), or RRC connected 930 (e.g., RRC_CONNECTED). The UE may implement different RAN-related control-plane procedures depending on its RRC state. Other elements of the network, for example, a base station, may track the RRC state of one or more UEs and implement RAN-related control-plane procedures appropriate to the RRC state of each.

In RRC connected 930, it may be possible for the UE to exchange data with the network (for example, the base station). The parameters necessary for exchange of data may be established and known to both the UE and the network. The parameters may be referred to and/or included in an RRC context of the UE (sometimes referred to as a UE context). These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. The base station with which the UE is connected may store the RRC context of the UE.

While in RRC connected 930, mobility of the UE may be managed by the access network, whereas the UE itself may manage mobility while in RRC idle 910 and/or RRC inactive 920. While in RRC connected 930, the UE may manage mobility by measuring signal levels (e.g., reference signal levels) from a serving cell and neighboring cells and reporting these measurements to the base station currently serving the UE. The network may initiate handover based on the reported measurements. The RRC state may transition from RRC connected 930 to RRC idle 910 through a connection release procedure 930 or to RRC inactive 920 through a connection inactivation procedure 932.

In RRC idle 910, an RRC context may not be established for the UE. In RRC idle 910, the UE may not have an RRC connection with a base station. While in RRC idle 910, the UE may be in a sleep state for a majority of the time (e.g., to conserve battery power). The UE may wake up periodically (e.g., once in every discontinuous reception cycle) to monitor for paging messages from the access network. Mobility of the UE may be managed by the UE through a procedure known as cell reselection. The RRC state may transition from RRC idle 910 to RRC connected 930 through a connection establishment procedure 913, which may involve a random access procedure, as discussed in greater detail below.

In RRC inactive 920, the RRC context previously established is maintained in the UE and the base station. This may allow for a fast transition to RRC connected 930 with reduced signaling overhead as compared to the transition from RRC idle 910 to RRC connected 930. The RRC state may transition to RRC connected 930 through a connection resume procedure 923. The RRC state may transition to RRC idle 910 though a connection release procedure 921 that may be the same as or similar to connection release procedure 931.

An RRC state may be associated with a mobility management mechanism. In RRC idle 910 and RRC inactive 920, mobility may be managed by the UE through cell reselection. The purpose of mobility management in RRC idle 910 and/or RRC inactive 920 is to allow the network to be able to notify the UE of an event via a paging message without having to broadcast the paging message over the entire mobile communications network. The mobility management mechanism used in RRC idle 910 and/or RRC inactive 920 may allow the network to track the UE on a cell-group level so that the paging message may be broadcast over the cells of the cell group that the UE currently resides within instead of the entire communication network. Tracking may be based on different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 920 state, the UE may be assigned a RAN notification area. A RAN notification area may comprise one or more cell identities, a list of RAIs, and/or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 920.

Figure 9B:
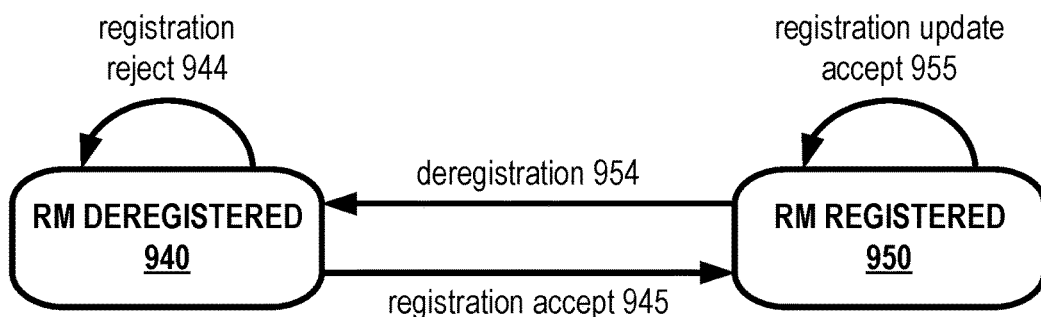

FIG. 9B is an example diagram showing registration management (RM) state transitions of a wireless device (e.g., a UE). The states are RM deregistered 940, (e.g., RM-DEREGISTERED) and RM registered 950 (e.g., RM-REGISTERED).

In RM deregistered 940, the UE is not registered with the network, and the UE is not reachable by the network. In order to be reachable by the network, the UE must perform an initial registration. As an example, the UE may register with an AMF of the network. If registration is rejected (registration reject 944), then the UE remains in RM deregistered 940. If registration is accepted (registration accept 945), then the UE transitions to RM registered 950. While the UE is RM registered 950, the network may store, keep, and/or maintain a UE context for the UE. The UE context may be referred to as wireless device context. The UE context corresponding to network registration (maintained by the core network) may be different from the RRC context corresponding to RRC state (maintained by an access network, e.g., a base station). The UE context may comprise a UE identifier and a record of various information relating to the UE, for example, UE capability information, policy information for access and mobility management of the UE, lists of allowed or established slices or PDU sessions, and/or a registration area of the UE (i.e., a list of tracking areas covering the geographical area where the wireless device is likely to be found).

While the UE is RM registered 950, the network may store the UE context of the UE, and if necessary use the UE context to reach the UE. Moreover, some services may not be provided by the network unless the UE is registered. The UE may update its UE context while remaining in RM registered 950 (registration update accept 955). For example, if the UE leaves one tracking area and enters another tracking area, the UE may provide a tracking area identifier to the network. The network may deregister the UE, or the UE may deregister itself (deregistration 954). For example, the network may automatically deregister the wireless device if the wireless device is inactive for a certain amount of time. Upon deregistration, the UE may transition to RM deregistered 940.

Figure 9C:
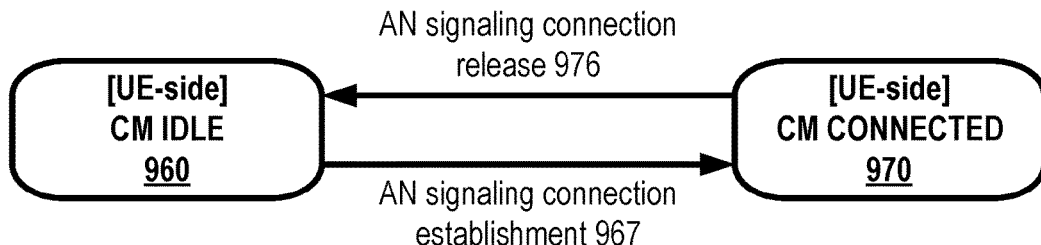

FIG. 9C is an example diagram showing connection management (CM) state transitions of a wireless device (e.g., a UE), shown from a perspective of the wireless device. The UE may be in CM idle 960 (e.g., CM-IDLE) or CM connected 970 (e.g., CM-CONNECTED).

In CM idle 960, the UE does not have a non access stratum (NAS) signaling connection with the network. As a result, the UE can not communicate with core network functions. The UE may transition to CM connected 970 by establishing an AN signaling connection (AN signaling connection establishment 967). This transition may be initiated by sending an initial NAS message. The initial NAS message may be a registration request (e.g., if the UE is RM deregistered 940) or a service request (e.g., if the UE is RM registered 950). If the UE is RM registered 950, then the UE may initiate the AN signaling connection establishment by sending a service request, or the network may send a page, thereby triggering the UE to send the service request.

In CM connected 970, the UE can communicate with core network functions using NAS signaling. As an example, the UE may exchange NAS signaling with an AMF for registration management purposes, service request procedures, and/or authentication procedures. As another example, the UE may exchange NAS signaling, with an SMF, to establish and/or modify a PDU session. The network may disconnect the UE, or the UE may disconnect itself (AN signaling connection release 976). For example, if the UE transitions to RM deregistered 940, then the UE may also transition to CM idle 960. When the UE transitions to CM idle 960, the network may deactivate a user plane connection of a PDU session of the UE.

Figure 9D:
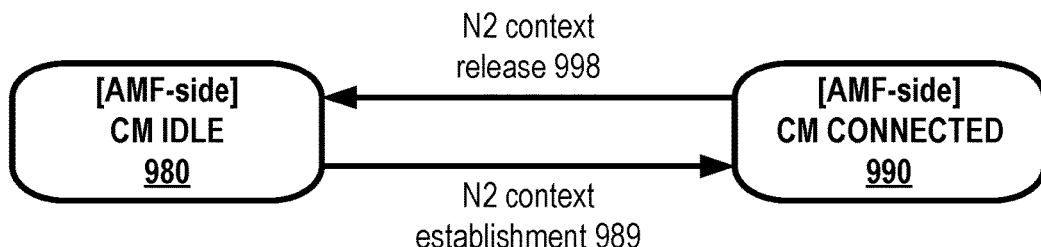

FIG. 9D is an example diagram showing CM state transitions of the wireless device (e.g., a UE), shown from a network perspective (e.g., an AMF). The CM state of the UE, as tracked by the AMF, may be in CM idle 980 (e.g., CM-IDLE) or CM connected 990 (e.g., CM-CONNECTED). When the UE transitions from CM idle 980 to CM connected 990, the AMF many establish an N2 context of the UE (N2 context establishment 989). When the UE transitions from CM connected 990 to CM idle 980, the AMF many release the N2 context of the UE (N2 context release 998).

Figure 10:
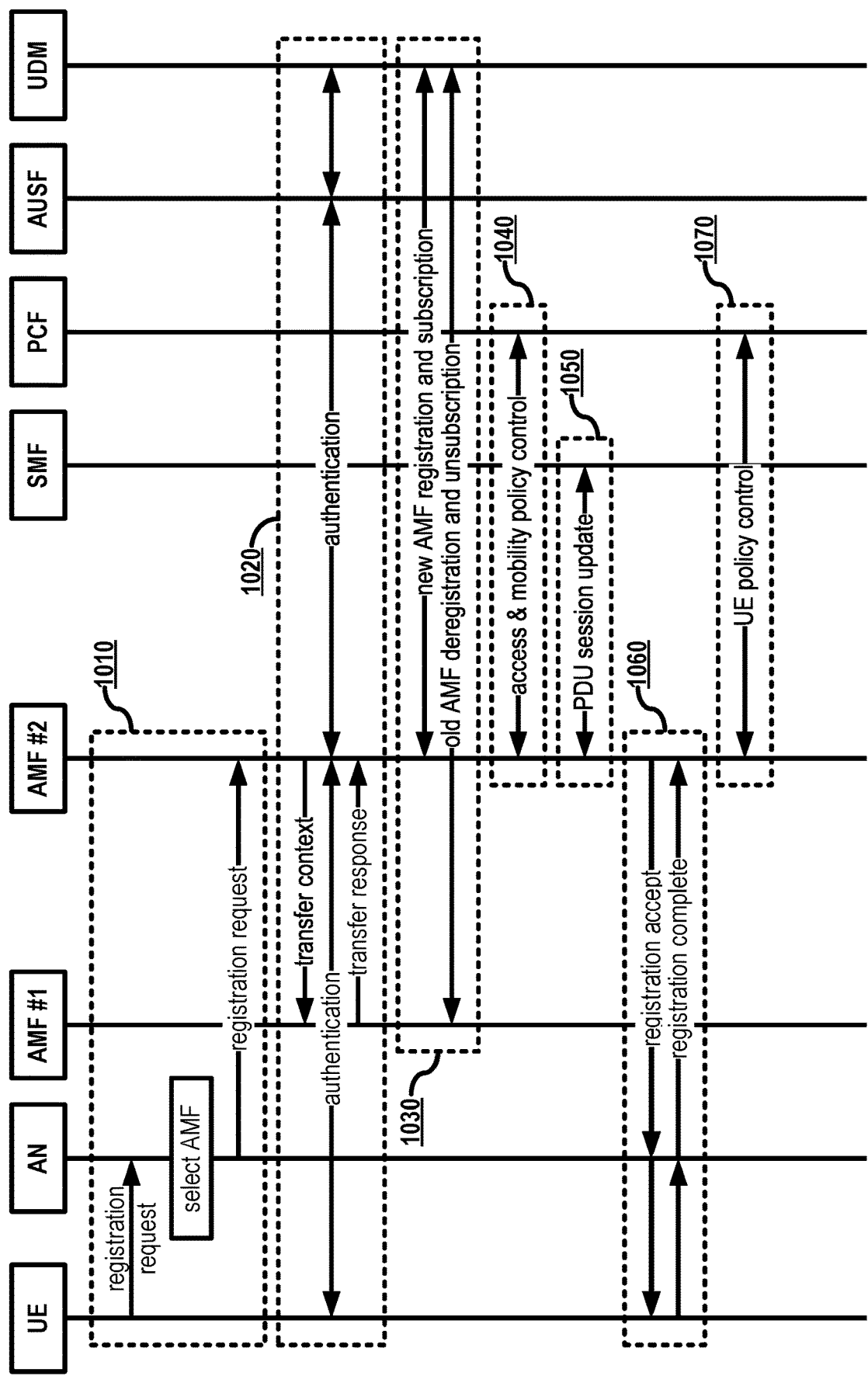
FIG. 10 illustrates an example of a registration procedure for a wireless device.
Figure 11:
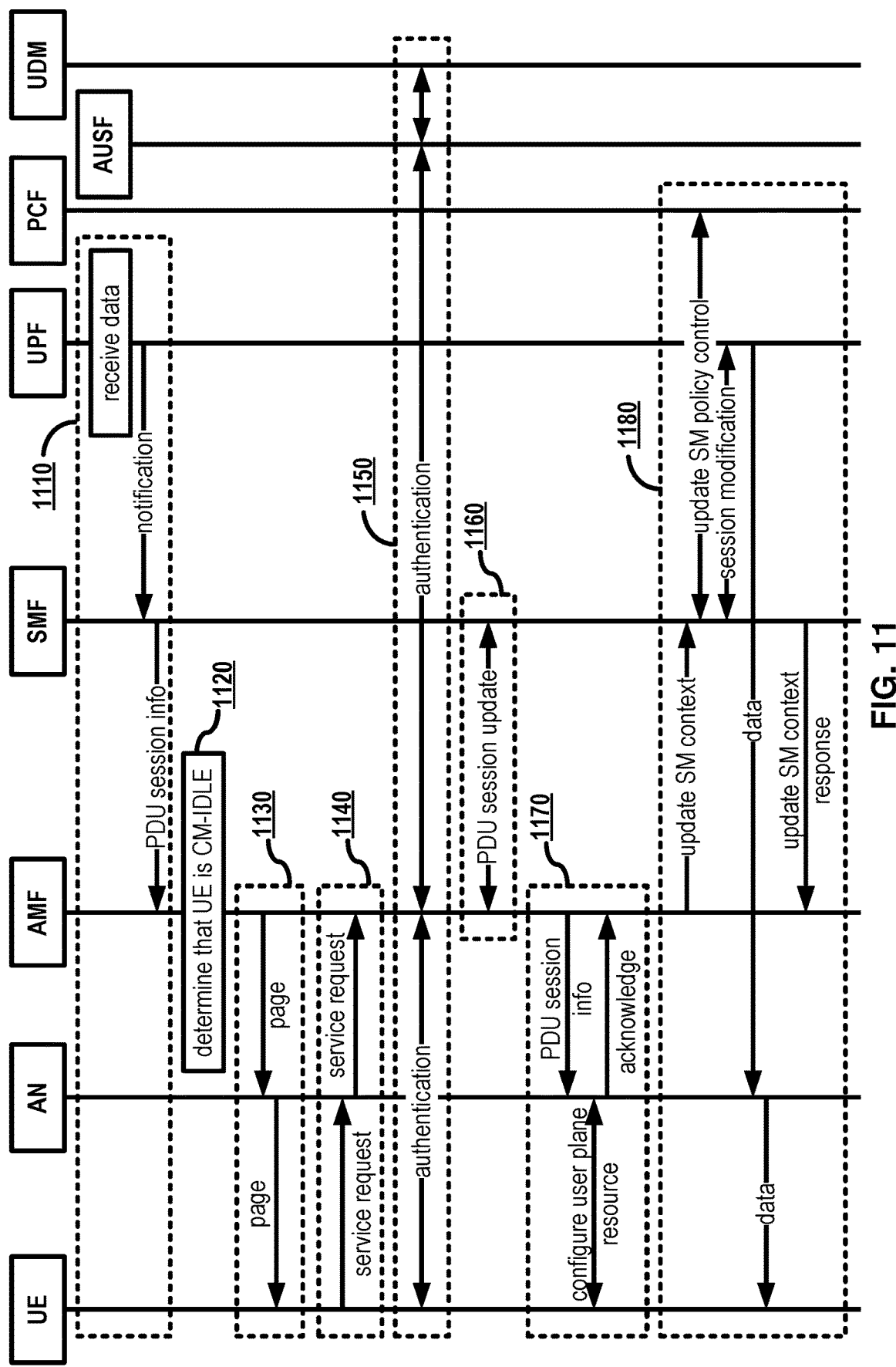
FIG. 11 illustrates an example of a service request procedure for a wireless device.
Figure 12:
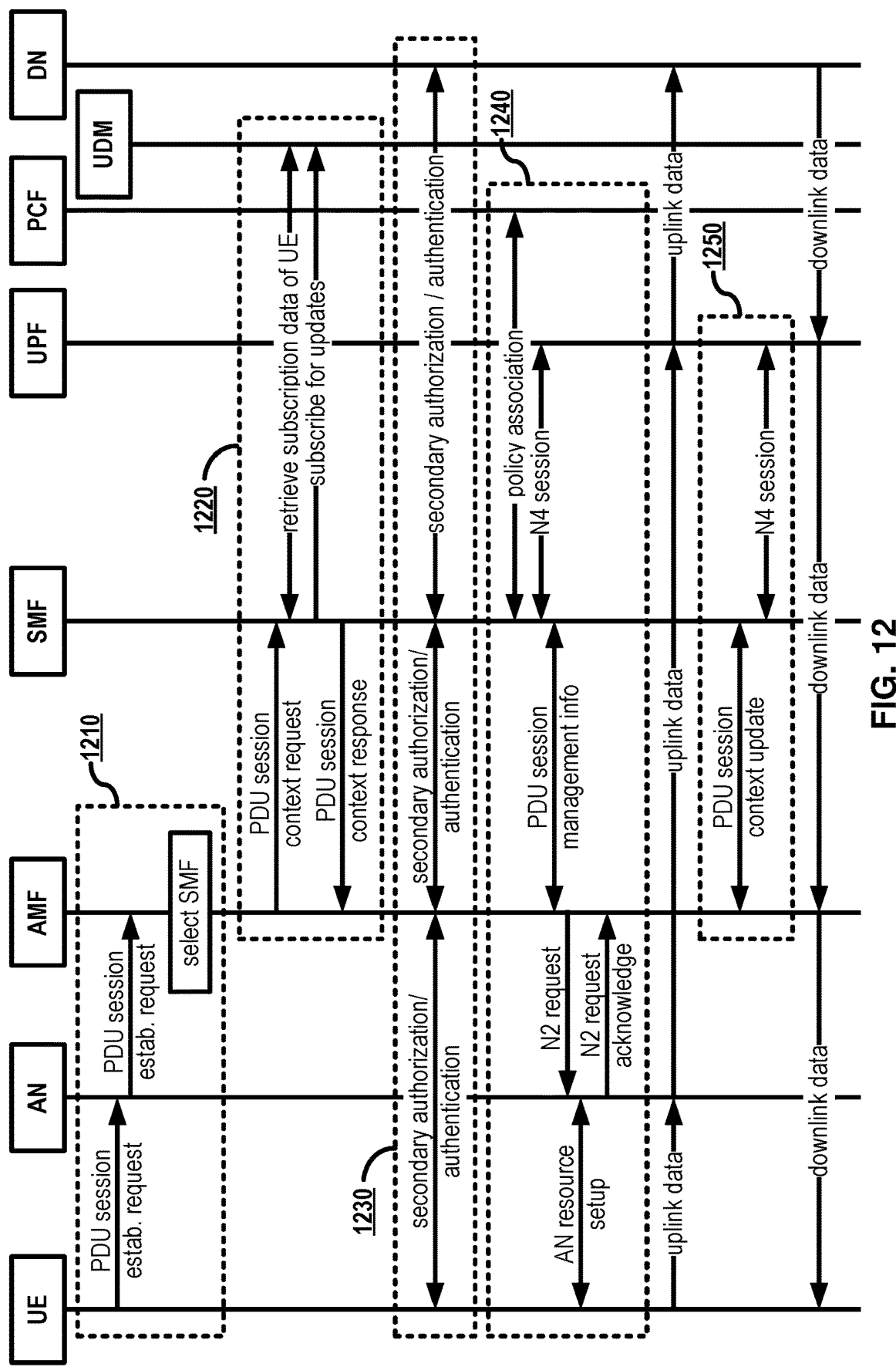
FIG. 12 illustrates an example of a protocol data unit session establishment procedure for a wireless device.

FIGS. 10-12 illustrate example procedures for registering, service request, and PDU session establishment of a UE.

FIG. 10 illustrates an example of a registration procedure for a wireless device (e.g., a UE). Based on the registration procedure, the UE may transition from, for example, RM deregistered 940 to RM registered 950.

Registration may be initiated by a UE for the purposes of obtaining authorization to receive services, enabling mobility tracking, enabling reachability, or other purposes. The UE may perform an initial registration as a first step toward connection to the network (for example, if the UE is powered on, airplane mode is turned off, etc.). Registration may also be performed periodically to keep the network informed of the UE's presence (for example, while in CM-IDLE state), or in response to a change in UE capability or registration area. Deregistration (not shown in FIG. 10) may be performed to stop network access.

At 1010, the UE transmits a registration request to an AN. As an example, the UE may have moved from a coverage area of a previous AMF (illustrated as AMF #1) into a coverage area of a new AMF (illustrated as AMF #2). The registration request may be a NAS message. The registration request may include a UE identifier. The AN may select an AMF for registration of the UE. For example, the AN may select a default AMF. For example, the AN may select an AMF that is already mapped to the UE (e.g., a previous AMF). The NAS registration request may include a network slice identifier and the AN may select an AMF based on the requested slice. After the AMF is selected, the AN may send the registration request to the selected AMF.

At 1020, the AMF that receives the registration request (AMF #2) performs a context transfer. The context may be a UE context, for example, an RRC context for the UE. As an example, AMF #2 may send AMF #1 a message requesting a context of the UE. The message may include the UE identifier. The message may be a Namf_Communication_UEContextTransfer message. AMF #1 may send to AMF #2 a message that includes the requested UE context. This message may be a Namf_Communication_UEContextTransfer message. After the UE context is received, the AMF #2 may coordinate authentication of the UE. After authentication is complete, AMF #2 may send to AMF #1 a message indicating that the UE context transfer is complete. This message may be a Namf_Communication_UEContextTransfer Response message.

Authentication may require participation of the UE, an AUSF, a UDM and/or a UDR (not shown). For example, the AMF may request that the AUSF authenticate the UE. For example, the AUSF may execute authentication of the UE. For example, the AUSF may get authentication data from UDM. For example, the AUSF may send a subscription permanent identifier (SUPI) to the AMF based on the authentication being successful. For example, the AUSF may provide an intermediate key to the AMF. The intermediate key may be used to derive an access-specific security key for the UE, enabling the AMF to perform security context management (SCM). The AUSF may obtain subscription data from the UDM. The subscription data may be based on information obtained from the UDM (and/or the UDR). The subscription data may include subscription identifiers, security credentials, access and mobility related subscription data and/or session related data.

At 1030, the new AMF, AMF #2, registers and/or subscribes with the UDM. AMF #2 may perform registration using a UE context management service of the UDM (Nudm_UECM). AMF #2 may obtain subscription information of the UE using a subscriber data management service of the UDM (Nudm_SDM). AMF #2 may further request that the UDM notify AMF #2 if the subscription information of the UE changes. As the new AMF registers and subscribes, the old AMF, AMF #1, may deregister and unsubscribe. After deregistration, AMF #1 is free of responsibility for mobility management of the UE.

At 1040, AMF #2 retrieves access and mobility (AM) policies from the PCF. As an example, the AMF #2 may provide subscription data of the UE to the PCF. The PCF may determine access and mobility policies for the UE based on the subscription data, network operator data, current network conditions, and/or other suitable information. For example, the owner of a first UE may purchase a higher level of service than the owner of a second UE. The PCF may provide the rules associated with the different levels of service. Based on the subscription data of the respective UEs, the network may apply different policies which facilitate different levels of service.

For example, access and mobility policies may relate to service area restrictions, RAT/frequency selection priority (RFSP, where RAT stands for radio access technology), authorization and prioritization of access type (e.g., LTE versus NR), and/or selection of non-3GPP access (e.g., Access Network Discovery and Selection Policy (ANDSP)). The service area restrictions may comprise a list of tracking areas where the UE is allowed to be served (or forbidden from being served). The access and mobility policies may include a UE route selection policy (URSP)) that influences routing to an established PDU session or a new PDU session. As noted above, different policies may be obtained and/or enforced based on subscription data of the UE, location of the UE (i.e., location of the AN and/or AMF), or other suitable factors.

At 1050, AMF #2 may update a context of a PDU session. For example, if the UE has an existing PDU session, the AMF #2 may coordinate with an SMF to activate a user plane connection associated with the existing PDU session. The SMF may update and/or release a session management context of the PDU session (Nsmf_PDUSession_UpdateSMContext, Nsmf_PDUSession_ReleaseSMContext).

At 1060, AMF #2 sends a registration accept message to the AN, which forwards the registration accept message to the UE. The registration accept message may include a new UE identifier and/or a new configured slice identifier. The UE may transmit a registration complete message to the AN, which forwards the registration complete message to the AMF #2. The registration complete message may acknowledge receipt of the new UE identifier and/or new configured slice identifier.

At 1070, AMF #2 may obtain UE policy control information from the PCF. The PCF may provide an access network discovery and selection policy (ANDSP) to facilitate non-3GPP access. The PCF may provide a UE route selection policy (URSP) to facilitate mapping of particular data traffic to particular PDU session connectivity parameters. As an example, the URSP may indicate that data traffic associated with a particular application should be mapped to a particular SSC mode, network slice, PDU session type, or preferred access type (3GPP or non-3GPP).

FIG. 11 illustrates an example of a service request procedure for a wireless device (e.g., a UE). The service request procedure depicted in FIG. 11 is a network-triggered service request procedure for a UE in a CM-IDLE state. However, other service request procedures (e.g., a UE-triggered service request procedure) may also be understood by reference to FIG. 11, as will be discussed in greater detail below.

At 1110, a UPF receives data. The data may be downlink data for transmission to a UE. The data may be associated with an existing PDU session between the UE and a DN. The data may be received, for example, from a DN and/or another UPF. The UPF may buffer the received data. In response to the receiving of the data, the UPF may notify an SMF of the received data. The identity of the SMF to be notified may be determined based on the received data. The notification may be, for example, an N4 session report. The notification may indicate that the UPF has received data associated with the UE and/or a particular PDU session associated with the UE. In response to receiving the notification, the SMF may send PDU session information to an AMF. The PDU session information may be sent in an N1N2 message transfer for forwarding to an AN. The PDU session information may include, for example, UPF tunnel endpoint information and/or QoS information.

At 1120, the AMF determines that the UE is in a CM-IDLE state. The determining at 1120 may be in response to the receiving of the PDU session information. Based on the determination that the UE is CM-IDLE, the service request procedure may proceed to 1130 and 1140, as depicted in FIG. 11. However, if the UE is not CM-IDLE (e.g., the UE is CM-CONNECTED), then 1130 and 1140 may be skipped, and the service request procedure may proceed directly to 1150.

At 1130, the AMF pages the UE. The paging at 1130 may be performed based on the UE being CM-IDLE. To perform the paging, the AMF may send a page to the AN. The page may be referred to as a paging or a paging message. The page may be an N2 request message. The AN may be one of a plurality of ANs in a RAN notification area of the UE. The AN may send a page to the UE. The UE may be in a coverage area of the AN and may receive the page.

At 1140, the UE may request service. The UE may transmit a service request to the AMF via the AN. As depicted in FIG. 11, the UE may request service at 1140 in response to receiving the paging at 1130. However, as noted above, this is for the specific case of a network-triggered service request procedure. In some scenarios (for example, if uplink data becomes available at the UE), then the UE may commence a UE-triggered service request procedure. The UE-triggered service request procedure may commence starting at 1140.

At 1150, the network may authenticate the UE. Authentication may require participation of the UE, an AUSF, and/or a UDM, for example, similar to authentication described elsewhere in the present disclosure. In some cases (for example, if the UE has recently been authenticated), the authentication at 1150 may be skipped.

At 1160, the AMF and SMF may perform a PDU session update. As part of the PDU session update, the SMF may provide the AMF with one or more UPF tunnel endpoint identifiers. In some cases (not shown in FIG. 11), it may be necessary for the SMF to coordinate with one or more other SMFs and/or one or more other UPFs to set up a user plane.

At 1170, the AMF may send PDU session information to the AN. The PDU session information may be included in an N2 request message. Based on the PDU session information, the AN may configure a user plane resource for the UE. To configure the user plane resource, the AN may, for example, perform an RRC reconfiguration of the UE. The AN may acknowledge to the AMF that the PDU session information has been received. The AN may notify the AMF that the user plane resource has been configured, and/or provide information relating to the user plane resource configuration.

In the case of a UE-triggered service request procedure, the UE may receive, at 1170, a NAS service accept message from the AMF via the AN. After the user plane resource is configured, the UE may transmit uplink data (for example, the uplink data that caused the UE to trigger the service request procedure).

At 1180, the AMF may update a session management (SM) context of the PDU session. For example, the AMF may notify the SMF (and/or one or more other associated SMFs) that the user plane resource has been configured, and/or provide information relating to the user plane resource configuration. The AMF may provide the SMF (and/or one or more other associated SMFs) with one or more AN tunnel endpoint identifiers of the AN. After the SM context update is complete, the SMF may send an update SM context response message to the AMF.

Based on the update of the session management context, the SMF may update a PCF for purposes of policy control. For example, if a location of the UE has changed, the SMF may notify the PCF of the UE's a new location.

Based on the update of the session management context, the SMF and UPF may perform a session modification. The session modification may be performed using N4 session modification messages. After the session modification is complete, the UPF may transmit downlink data (for example, the downlink data that caused the UPF to trigger the network-triggered service request procedure) to the UE. The transmitting of the downlink data may be based on the one or more AN tunnel endpoint identifiers of the AN.

FIG. 12 illustrates an example of a protocol data unit (PDU) session establishment procedure for a wireless device (e.g., a UE). The UE may determine to transmit the PDU session establishment request to create a new PDU session, to hand over an existing PDU session to a 3GPP network, or for any other suitable reason.

At 1210, the UE initiates PDU session establishment. The UE may transmit a PDU session establishment request to an AMF via an AN. The PDU session establishment request may be a NAS message. The PDU session establishment request may indicate: a PDU session ID; a requested PDU session type (new or existing); a requested DN (DNN); a requested network slice (S-NSSAI); a requested SSC mode; and/or any other suitable information. The PDU session ID may be generated by the UE. The PDU session type may be, for example, an Internet Protocol (IP)-based type (e.g., IPv4, IPv6, or dual stack IPv4/IPv6), an Ethernet type, or an unstructured type.

The AMF may select an SMF based on the PDU session establishment request. In some scenarios, the requested PDU session may already be associated with a particular SMF. For example, the AMF may store a UE context of the UE, and the UE context may indicate that the PDU session ID of the requested PDU session is already associated with the particular SMF. In some scenarios, the AMF may select the SMF based on a determination that the SMF is prepared to handle the requested PDU session. For example, the requested PDU session may be associated with a particular DNN and/or S-NSSAI, and the SMF may be selected based on a determination that the SMF can manage a PDU session associated with the particular DNN and/or S-NSSAI.

At 1220, the network manages a context of the PDU session. After selecting the SMF at 1210, the AMF sends a PDU session context request to the SMF. The PDU session context request may include the PDU session establishment request received from the UE at 1210. The PDU session context request may be a Nsmf_PDUSession_CreateSM-Context Request and/or a Nsmf_PDUSession_UpdateSM-Context Request. The PDU session context request may indicate identifiers of the UE; the requested DN; and/or the requested network slice. Based on the PDU session context request, the SMF may retrieve subscription data from a UDM. The subscription data may be session management subscription data of the UE. The SMF may subscribe for updates to the subscription data, so that the PCF will send new information if the subscription data of the UE changes. After the subscription data of the UE is obtained, the SMF may transmit a PDU session context response to the AMG. The PDU session context response may be a Nsmf_P-DUSession_CreateSMContext Response and/or a Nsmf_P-DUSession_UpdateSMContext Response. The PDU session context response may include a session management context ID.

At 1230, secondary authorization/authentication may be performed, if necessary. The secondary authorization/authentication may involve the UE, the AMF, the SMF, and the DN. The SMF may access the DN via a Data Network Authentication, Authorization and Accounting (DN AAA) server.

At 1240, the network sets up a data path for uplink data associated with the PDU session. The SMF may select a PCF and establish a session management policy association. Based on the association, the PCF may provide an initial set of policy control and charging rules (PCC rules) for the PDU session. When targeting a particular PDU session, the PCF may indicate, to the SMF, a method for allocating an IP address to the PDU Session, a default charging method for the PDU session, an address of the corresponding charging entity, triggers for requesting new policies, etc. The PCF may also target a service data flow (SDF) comprising one or more PDU sessions. When targeting an SDF, the PCF may indicate, to the SMF, policies for applying QoS requirements, monitoring traffic (e.g., for charging purposes), and/or steering traffic (e.g., by using one or more particular N6 interfaces).

The SMF may determine and/or allocate an IP address for the PDU session. The SMF may select one or more UPFs (a single UPF in the example of FIG. 12) to handle the PDU session. The SMF may send an N4 session message to the selected UPF. The N4 session message may be an N4 Session Establishment Request and/or an N4 Session Modification Request. The N4 session message may include packet detection, enforcement, and reporting rules associated with the PDU session. In response, the UPF may acknowledge by sending an N4 session establishment response and/or an N4 session modification response.

The SMF may send PDU session management information to the AMF. The PDU session management information may be a Namf_Communication_N1N2MessageTransfer message. The PDU session management information may include the PDU session ID. The PDU session management information may be a NAS message. The PDU session management information may include N1 session management information and/or N2 session management information. The N1 session management information may include a PDU session establishment accept message. The PDU session establishment accept message may include tunneling endpoint information of the UPF and quality of service (QoS) information associated with the PDU session.

The AMF may send an N2 request to the AN. The N2 request may include the PDU session establishment accept message. Based on the N2 request, the AN may determine AN resources for the UE. The AN resources may be used by the UE to establish the PDU session, via the AN, with the DN. The AN may determine resources to be used for the PDU session and indicate the determined resources to the UE. The AN may send the PDU session establishment accept message to the UE. For example, the AN may perform an RRC reconfiguration of the UE. After the AN resources are set up, the AN may send an N2 request acknowledge to the AMF. The N2 request acknowledge may include N2 session management information, for example, the PDU session ID and tunneling endpoint information of the AN.

After the data path for uplink data is set up at 1240, the UE may optionally send uplink data associated with the PDU session. As shown in FIG. 12, the uplink data may be sent to a DN associated with the PDU session via the AN and the UPF.

At 1250, the network may update the PDU session context. The AMF may transmit a PDU session context update request to the SMF. The PDU session context update request may be a Nsmf_PDUSession_UpdateSMContext Request. The PDU session context update request may include the N2 session management information received from the AN. The SMF may acknowledge the PDU session context update. The acknowledgement may be a Nsmf_P-DUSession_UpdateSMContext Response. The acknowledgement may include a subscription requesting that the SMF be notified of any UE mobility event. Based on the PDU session context update request, the SMF may send an N4 session message to the UPF. The N4 session message may be an N4 Session Modification Request. The N4 session message may include tunneling endpoint information of the AN. The N4 session message may include forwarding rules associated with the PDU session. In response, the UPF may acknowledge by sending an N4 session modification response.

After the UPF receives the tunneling endpoint information of the AN, the UPF may relay downlink data associated with the PDU session. As shown in FIG. 12, the downlink data may be received from a DN associated with the PDU session via the AN and the UPF.

Figure 13:
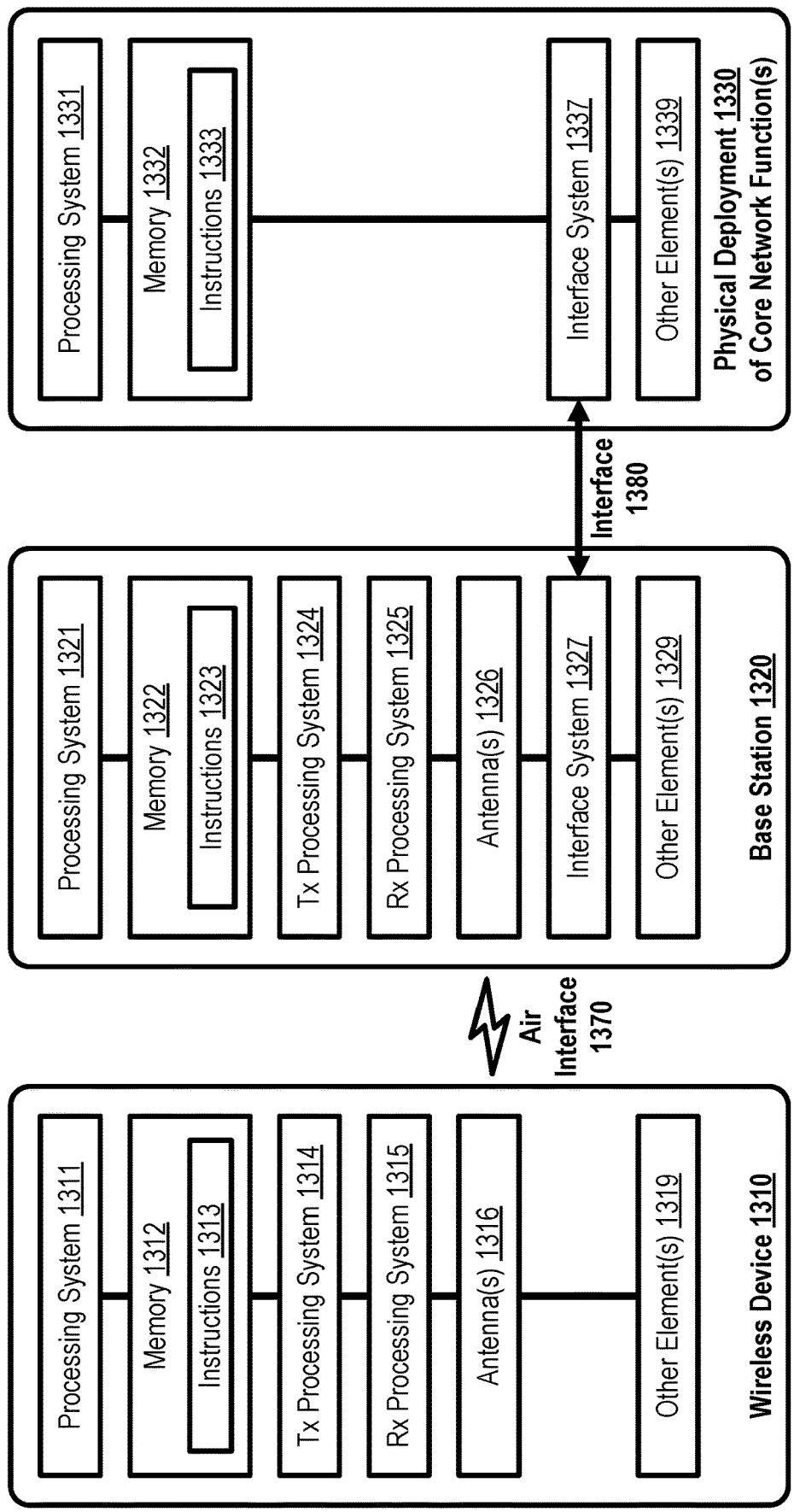
FIG. 13 illustrates examples of components of the elements in a communications network.

FIG. 13 illustrates examples of components of the elements in a communications network. FIG. 13 includes a wireless device 1310, a base station 1320, and a physical deployment of one or more network functions 1330 (henceforth "deployment 1330"). Any wireless device described in the present disclosure may have similar components and may be implemented in a similar manner as the wireless device 1310. Any other base station described in the present disclosure (or any portion thereof, depending on the architecture of the base station) may have similar components and may be implemented in a similar manner as the base station 1320. Any physical core network deployment in the present disclosure (or any portion thereof, depending on the architecture of the base station) may have similar components and may be implemented in a similar manner as the deployment 1330.

The wireless device 1310 may communicate with base station 1320 over an air interface 1370. The communication direction from wireless device 1310 to base station 1320 over air interface 1370 is known as uplink, and the communication direction from base station 1320 to wireless device 1310 over air interface 1370 is known as downlink. Downlink transmissions may be separated from uplink transmissions using FDD, TDD, and/or some combination of duplexing techniques. FIG. 13 shows a single wireless device 1310 and a single base station 1320, but it will be understood that wireless device 1310 may communicate with any number of base stations or other access network components over air interface 1370, and that base station 1320 may communicate with any number of wireless devices over air interface 1370.

The wireless device 1310 may comprise a processing system 1311 and a memory 1312. The memory 1312 may comprise one or more computer-readable media, for example, one or more non-transitory computer readable media. The memory 1312 may include instructions 1313. The processing system 1311 may process and/or execute instructions 1313. Processing and/or execution of instructions 1313 may cause wireless device 1310 and/or processing system 1311 to perform one or more functions or activities. The memory 1312 may include data (not shown). One of the functions or activities performed by processing system 1311 may be to store data in memory 1312 and/or retrieve previously-stored data from memory 1312. In an example, downlink data received from base station 1320 may be stored in memory 1312, and uplink data for transmission to base station 1320 may be retrieved from memory 1312. As illustrated in FIG. 13, the wireless device 1310 may communicate with base station 1320 using a transmission processing system 1314 and/or a reception processing system 1315. Alternatively, transmission processing system 1314 and reception processing system 1315 may be implemented as a single processing system, or both may be omitted and all processing in the wireless device 1310 may be performed by the processing system 1311. Although not shown in FIG. 13, transmission processing system 1314 and/or reception processing system 1315 may be coupled to a dedicated memory that is analogous to but separate from memory 1312, and comprises instructions that may be processed and/or executed to carry out one or more of their respective functionalities. The wireless device 1310 may comprise one or more antennas 1316 to access air interface 1370.

The wireless device 1310 may comprise one or more other elements 1319. The one or more other elements 1319 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1310 may receive user input data from and/or provide user output data to the one or more one or more other elements 1319. The one or more other elements 1319 may comprise a power source. The wireless device 1310 may receive power from the power source and may be configured to distribute the power to the other components in wireless device 1310. The power source may comprise one or more sources of power, for example, a battery, a solar cell, a fuel cell, or any combination thereof.

The wireless device 1310 may transmit uplink data to and/or receive downlink data from base station 1320 via air interface 1370. To perform the transmission and/or reception, one or more of the processing system 1311, transmission processing system 1314, and/or reception system 1315 may implement open systems interconnection (OSI) functionality. As an example, transmission processing system 1314 and/or reception system 1315 may perform layer 1 OSI functionality, and processing system 1311 may perform higher layer functionality. The wireless device 1310 may transmit and/or receive data over air interface 1370 using one or more antennas 1316. For scenarios where the one or more antennas 1316 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise a processing system 1321 and a memory 1322. The memory 1322 may comprise one or more computer-readable media, for example, one or more non-transitory computer readable media. The memory 1322 may include instructions 1323. The processing system 1321 may process and/or execute instructions 1323. Processing and/or execution of instructions 1323 may cause base station 1320 and/or processing system 1321 to perform one or more functions or activities. The memory 1322 may include data (not shown). One of the functions or activities performed by processing system 1321 may be to store data in memory 1322 and/or retrieve previously-stored data from memory 1322. The base station 1320 may communicate with wireless device 1310 using a transmission processing system 1324 and a reception processing system 1325. Although not shown in FIG. 13, transmission processing system 1324 and/or reception processing system 1325 may be coupled to a dedicated memory that is analogous to but separate from memory 1322, and comprises instructions that may be processed and/or executed to carry out one or more of their respective functionalities. The wireless device 1320 may comprise one or more antennas 1326 to access air interface 1370.

The base station 1320 may transmit downlink data to and/or receive uplink data from wireless device 1310 via air interface 1370. To perform the transmission and/or reception, one or more of the processing system 1321, transmission processing system 1324, and/or reception system 1325 may implement OSI functionality. As an example, transmission processing system 1324 and/or reception system 1325 may perform layer 1 OSI functionality, and processing system 1321 may perform higher layer functionality. The base station 1320 may transmit and/or receive data over air interface 1370 using one or more antennas 1326. For scenarios where the one or more antennas 1326 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise an interface system 1327. The interface system 1327 may communicate with one or more base stations and/or one or more elements of the core network via an interface 1380. The interface 1380 may be wired and/or wireless and interface system 1327 may include one or more components suitable for communicating via interface 1380. In FIG. 13, interface 1380 connects base station 1320 to a single deployment 1330, but it will be understood that wireless device 1310 may communicate with any number of base stations and/or CN deployments over interface 1380, and that deployment 1330 may communicate with any number of base stations and/or other CN deployments over interface 1380. The base station 1320 may comprise one or more other elements 1329 analogous to one or more of the one or more other elements 1319.

The deployment 1330 may comprise any number of portions of any number of instances of one or more network functions (NFs). The deployment 1330 may comprise a processing system 1331 and a memory 1332. The memory 1332 may comprise one or more computer-readable media, for example, one or more non-transitory computer readable media. The memory 1332 may include instructions 1333. The processing system 1331 may process and/or execute instructions 1333. Processing and/or execution of instructions 1333 may cause the deployment 1330 and/or processing system 1331 to perform one or more functions or activities. The memory 1332 may include data (not shown). One of the functions or activities performed by processing system 1331 may be to store data in memory 1332 and/or retrieve previously-stored data from memory 1332. The deployment 1330 may access the interface 1380 using an interface system 1337. The deployment 1330 may comprise one or more other elements 1339 analogous to one or more of the one or more other elements 1319.

One or more of the systems 1311, 1314, 1315, 1321, 1324, 1325, and/or 1331 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an onboard unit, or any combination thereof. One or more of the systems 1311, 1314, 1315, 1321, 1324, 1325, and/or 1331 may perform signal coding/processing, data processing, power control, input/output processing, and/or any other functionality that may enable wireless device 1310, base station 1320, and/or deployment 1330 to operate in a mobile communications system.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise computers, microcontrollers, microprocessors, DSPs, ASICs, FPGAs, and complex programmable logic devices (CPLDs). Computers, microcontrollers and microprocessors may be programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

The wireless device 1310, base station 1320, and/or deployment 1330 may implement timers and/or counters. A timer/counter may start at an initial value. As used herein, starting may comprise restarting. Once started, the timer/counter may run. Running of the timer/counter may be associated with an occurrence. When the occurrence occurs, the value of the timer/counter may change (for example, increment or decrement). The occurrence may be, for example, an exogenous event (for example, a reception of a signal, a measurement of a condition, etc.), an endogenous event (for example, a transmission of a signal, a calculation, a comparison, a performance of an action or a decision to so perform, etc.), or any combination thereof. In the case of a timer, the occurrence may be the passage of a particular amount of time. However, it will be understood that a timer may be described and/or implemented as a counter that counts the passage of a particular unit of time. A timer/counter may run in a direction of a final value until it reaches the final value. The reaching of the final value may be referred to as expiration of the timer/counter. The final value may be referred to as a threshold. A timer/counter may be paused, wherein the present value of the timer/counter is held, maintained, and/or carried over, even upon the occurrence of one or more occurrences that would otherwise cause the value of the timer/counter to change. The timer/counter may be un-paused or continued, wherein the value that was held, maintained, and/or carried over begins changing again when the one or more occurrence occur. A timer/counter may be set and/or reset. As used herein, setting may comprise resetting. When the timer/counter sets and/or resets, the value of the timer/counter may be set to the initial value. A timer/counter may be started and/or restarted. As used herein, starting may comprise restarting. In some embodiments, when the timer/counter restarts, the value of the timer/counter may be set to the initial value and the timer/counter may begin to run.

FIGS. 14A, 14B, 14C, and 14D illustrate various example arrangements of physical core network deployments, each having one or more network functions or portions thereof. The core network deployments comprise a deployment 1410, a deployment 1420, a deployment 1430, a deployment

1440, and/or a deployment 1450. Each deployment may be analogous to, for example, the deployment 1330 depicted in FIG. 13. In particular, each deployment may comprise a processing system for performing one or more functions or activities, memory for storing data and/or instructions, and an interface system for communicating with other network elements (for example, other core network deployments). Each deployment may comprise one or more network functions (NFs). The term NF may refer to a particular set of functionalities and/or one or more physical elements configured to perform those functionalities (e.g., a processing system and memory comprising instructions that, when executed by the processing system, cause the processing system to perform the functionalities). For example, in the present disclosure, when a network function is described as performing X, Y, and Z, it will be understood that this refers to the one or more physical elements configured to perform X, Y, and Z, no matter how or where the one or more physical elements are deployed. The term NF may refer to a network node, network element, and/or network device.

As will be discussed in greater detail below, there are many different types of NF and each type of NF may be associated with a different set of functionalities. A plurality of different NFs may be flexibly deployed at different locations (for example, in different physical core network deployments) or in a same location (for example, co-located in a same deployment). A single NF may be flexibly deployed at different locations (implemented using different physical core network deployments) or in a same location. Moreover, physical core network deployments may also implement one or more base stations, application functions (AFs), data networks (DNs), or any portions thereof. NFs may be implemented in many ways, including as network elements on dedicated or shared hardware, as software instances running on dedicated or shared hardware, or as virtualized functions instantiated on a platform (e.g., a cloud-based platform).

FIG. 14A illustrates an example arrangement of core network deployments in which each deployment comprises one network function. A deployment 1410 comprises an NF 1411, a deployment 1420 comprises an NF 1421, and a deployment 1430 comprises an NF 1431. The deployments 1410, 1420, 1430 communicate via an interface 1490. The deployments 1410, 1420, 1430 may have different physical locations with different signal propagation delays relative to other network elements. The diversity of physical locations of deployments 1410, 1420, 1430 may enable provision of services to a wide area with improved speed, coverage, security, and/or efficiency.

FIG. 14B illustrates an example arrangement wherein a single deployment comprises more than one NF. Unlike FIG. 14A, where each NF is deployed in a separate deployment, FIG. 14B illustrates multiple NFs in deployments 1410, 1420. In an example, deployments 1410, 1420 may implement a software-defined network (SDN) and/or a network function virtualization (NFV).

For example, deployment 1410 comprises an additional network function, NF 1411A. The NFs 1411, 1411A may consist of multiple instances of the same NF type, co-located at a same physical location within the same deployment 1410. The NFs 1411, 1411A may be implemented independently from one another (e.g., isolated and/or independently controlled). For example, the NFs 1411, 1411A may be associated with different network slices. A processing system and memory associated with the deployment 1410 may perform all of the functionalities associated with the NF 1411 in addition to all of the functionalities associated with the NF 1411A. In an example, NFs 1411, 1411A may be associated with different PLMNs, but deployment 1410, which implements NFs 1411, 1411A, may be owned and/or operated by a single entity.

Elsewhere in FIG. 14B, deployment 1420 comprises NF 1421 and an additional network function, NF 1422. The NFs 1421, 1422 may be different NF types. Similar to NFs 1411, 1411A, the NFs 1421, 1422 may be co-located within the same deployment 1420, but separately implemented. As an example, a first PLMN may own and/or operate deployment 1420 having NFs 1421, 1422. As another example, the first PLMN may implement NF 1421 and a second PLMN may obtain from the first PLMN (e.g., rent, lease, procure, etc.) at least a portion of the capabilities of deployment 1420 (e.g., processing power, data storage, etc.) in order to implement NF 1422. As yet another example, the deployment may be owned and/or operated by one or more third parties, and the first PLMN and/or second PLMN may procure respective portions of the capabilities of the deployment 1420. When multiple NFs are provided at a single deployment, networks may operate with greater speed, coverage, security, and/or efficiency.

FIG. 14C illustrates an example arrangement of core network deployments in which a single instance of an NF is implemented using a plurality of different deployments. In particular, a single instance of NF 1422 is implemented at deployments 1420, 1440. As an example, the functionality provided by NF 1422 may be implemented as a bundle or sequence of subservices. Each subservice may be implemented independently, for example, at a different deployment. Each subservices may be implemented in a different physical location. By distributing implementation of subservices of a single NF across different physical locations, the mobile communications network may operate with greater speed, coverage, security, and/or efficiency.

FIG. 14D illustrates an example arrangement of core network deployments in which one or more network functions are implemented using a data processing service. In FIG. 14D, NFs 1411, 1411A, 1421, 1422 are included in a deployment 1450 that is implemented as a data processing service. The deployment 1450 may comprise, for example, a cloud network and/or data center. The deployment 1450 may be owned and/or operated by a PLMN or by a non-PLMN third party. The NFs 1411, 1411A, 1421, 1422 that are implemented using the deployment 1450 may belong to the same PLMN or to different PLMNs. The PLMN(s) may obtain (e.g., rent, lease, procure, etc.) at least a portion of the capabilities of the deployment 1450 (e.g., processing power, data storage, etc.). By providing one or more NFs using a data processing service, the mobile communications network may operate with greater speed, coverage, security, and/or efficiency.

As shown in the figures, different network elements (e.g., NFs) may be located in different physical deployments, or co-located in a single physical deployment. It will be understood that in the present disclosure, the sending and receiving of messages among different network elements is not limited to inter-deployment transmission or intra-deployment transmission, unless explicitly indicated.

In an example, a deployment may be a 'black box' that is preconfigured with one or more NFs and preconfigured to communicate, in a prescribed manner, with other 'black box' deployments (e.g., via the interface 1490). Additionally or alternatively, a deployment may be configured to operate in accordance with open-source instructions (e.g., software) designed to implement NFs and communicate with other deployments in a transparent manner. The deployment may operate in accordance with open RAN (O-RAN) standards.

Each CN deployment may comprise one or more network functions. Depending on the context in which the term is used, a network function (NF) may refer to a particular set of functionalities and/or one or more physical elements configured to perform those functionalities (e.g., a processing system and memory comprising instructions that, when executed by the processing system, cause the processing system to perform the functionalities). There are many different types of NF and each type of NF may be associated with a different set of functionalities. Different NFs may be flexibly deployed at different locations (for example, in different physical core network deployments) or in a same location (for example, co-located in the same physical core network deployment). Moreover, physical CN deployment are not limited to implementation of NFs. For example, a particular physical CN deployment may further include a base station or portions therefor and/or a data network or portions thereof. Accordingly, one or more NFs implemented on a particular physical core network deployment may be co-located with one or more non-core elements, including elements of an access network or data network.

Figure 15:
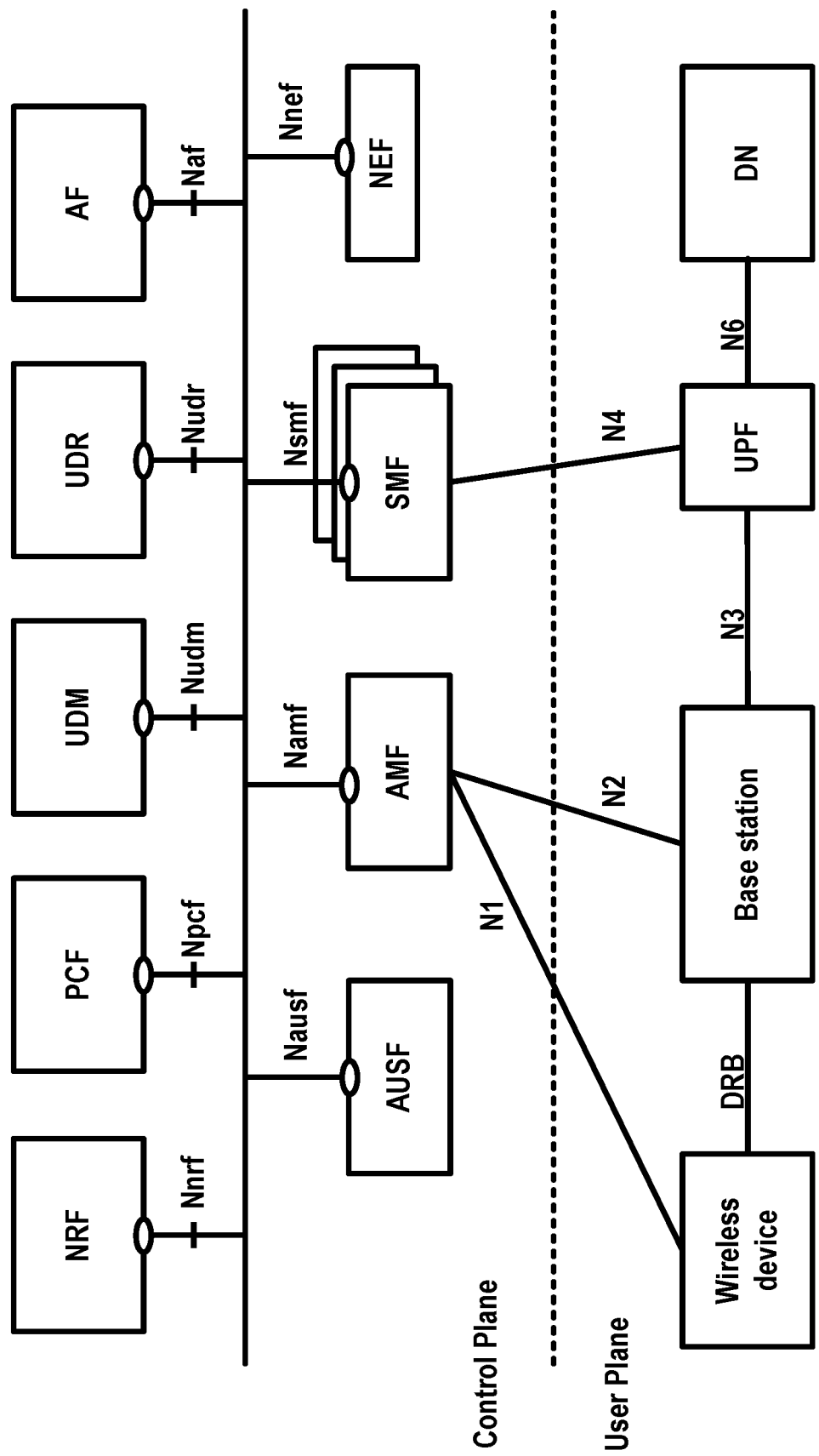
FIG. 15 illustrates a service-based architecture for a 5G network regarding interaction between a control plane (CP) and a user plane (UP).

FIG. 15 illustrates a service-based architecture for a 5G network regarding a control plane (CP) and a user plane (UP) interaction. This illustration may depict logical connections between nodes and functions, and its illustrated connections may not be interpreted as direct physical connections. A wireless device may form a radio access network connection with a bases station, which is connected to a User Plane (UP) Function (UPF) over a network interface providing a defined interface such as an N3 interface. The UPF may provide a logical connection to a data network (DN) over a network interface such as an N6 interface. The radio access network connection between the wireless device and the base station may be referred to as a data radio bearer (DRB).

The DN may be a data network used to provide an operator service, third party service such as the Internet, IP multimedia subsystem (IMS), augmented reality (AR), virtual reality (VR). In some embodiments DN may represent an edge computing network or resource, such as a mobile edge computing (MEC) network.

The wireless device also connects to the AMF through a logical N1 connection. The AMF may be responsible for authentication and/or authorization of access requests, as well as mobility management functions. The AMF may perform other roles and functions. In a service-based view, AMF may communicate with other core network control plane functions through a service-based interface denoted as Namf.

The SMF is a network function that may be responsible for the allocation and management of IP addresses that are assigned to a wireless device as well as the selection of a UPF for traffic associated with a particular session of the wireless device. There will be typically multiple SMFs in the network, each of which may be associated with a respective group of wireless devices, base stations or UPFs. The SMF may communicate with other core network functions, in a service based view, through a service based interface denoted as Nsmf. The SMF may also connect to a UPF through a logical interface such as network interface N4.

The authentication server function (AUSF) may provide authentication services to other network functions over a service based Nausf interface. A network exposure function (NEF) can be deployed in the network to allow servers, functions and other entities such as those outside a trusted domain (operator network) to have exposure to services and capabilities within the network. In one such example, the NEF may act like a proxy between an external application server (AS) outside the illustrated network and network functions such as the PCF, the SMF, the UDM and the AMF. The external AS may provide information that may be of use in the setup of the parameters associated with a data session. The NEF may communicate with other network functions through a service based Nnef network interface. The NEF may have an interface to non-3GPP functions.

The Network Repository Function (NRF) may provide network service discovery functionality. The NRF may be specific to the Public Land Mobility Network (PLMN) or network operator, with which it is associated. The service discovery functionality can allow network functions and wireless devices connected to the network to determine where and how to access existing network functions.

The PCF may communicate with other network functions over a service based Npcf interface, and may be used to provide policy and rules to other network functions, including those within the control plane. Enforcement and application of the policies and rules may not be responsibility of the PCF. The responsibility of the functions to which the PCF transmits the policy may be responsibility of the AMF or the SMF. In one such example, the PCF may transmit policy associated with session management to the SMF. This may be used to allow for a unified policy framework with which network behavior can be governed.

The UDM may present a service based Nudm interface to communicate with other network functions. The UDM may provide data storage facilities to other network functions. Unified data storage may allow for a consolidated view of network information that may be used to ensure that the most relevant information can be made available to different network functions from a single resource. This may allow implementation of other network functions easier, as they may not need to determine where a particular type of data is stored in the network. The UDM may employ an interface, such as Nudr to connect to the UDR. The PCF may be associated with the UDM.

The PCF may have a direct interface to the UDR or may use Nudr interface to connection with UDR. The UDM may receive requests to retrieve content stored in the UDR, or requests to store content in the UDR. The UDM may be responsible for functionality such as the processing of credentials, location management and subscription management. The UDR may also support authentication credential processing, user identification handling, access authorization, registration/mobility management, subscription management, and short message service (SMS) management. The UDR may be responsible for storing data provided by the UDM. The stored data is associated with policy profile information (which may be provided by PCF) that governs the access rights to the stored data. In some embodiments, the UDR may store policy data, as well as user subscription data which may include any or all of subscription identifiers, security credentials, access and mobility related subscription data and session related data.

The Application Function (AF) may represent the non-data plane (also referred to as the non-user plane) functionality of an application deployed within a network operator domain and within a 3GPP compliant network. The AF may in internal application server (AS). The AF may interact with other core network functions through a service based Naf interface, and may access network capability exposure information, as well as provide application information for use in decisions such as traffic routing. The AF can also interact with functions such as the PCF to provide application specific input into policy and policy enforcement decisions. In many situations, the AF may not provide network services to other network functions. The AF may be often viewed as a consumer or user of services provided by other network functions. An application (application server) outside of the trusted domain (operator network), may perform many of the same functions as AF through the use of NEF.

The wireless device may communicate with network functions that are in the core network control plane (CN-UP), and the core network user plane (CN-CP). The UPF and the data network (DN) is a part of the CN-UP. The DN may be out of core network domain (cellular network domain). In the illustration (FIG. 15), base station locates in CP-UP side. The base station may provide connectivity both for the CN-CP & CN-UP. AMF, SMF, AUSF, NEF, NRF, PCF, and UDM may be functions that reside within the CN-CP, and are often referred to as control plane functions. If the AF resides in the trusted domain, the AF may communicate with other functions within CN-CP directly via the service based Naf interface. If the AF resides outside of the trusted domain, the AM may communicate with other functions within CN-CP indirectly via the NEF.

Figure 16:
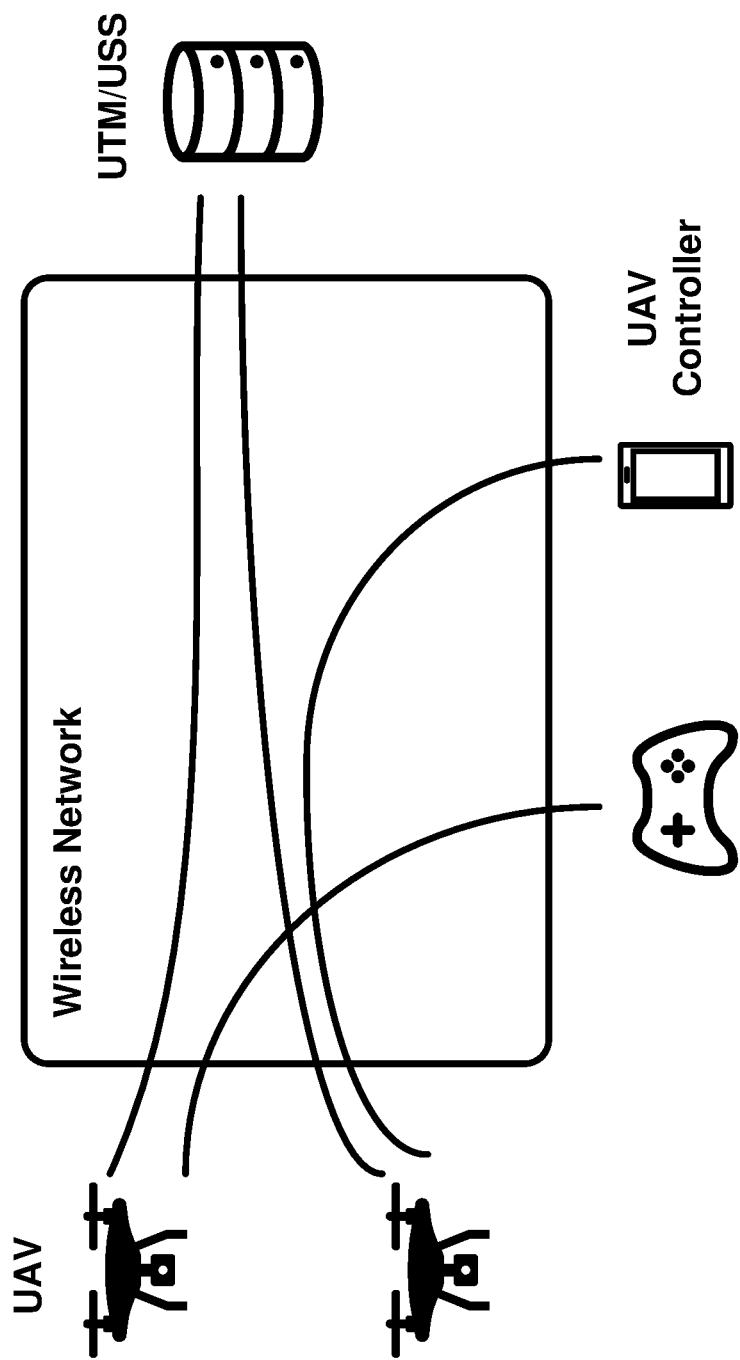
FIG. 16 illustrates an example architecture of an unmanned and/or uncrewed aerial system (UAS) in accordance with embodiments of the present disclosure.

An unmanned and/or uncrewed aerial vehicle (UAV) may be an aircraft without a human pilot on board. An unmanned and/or uncrewed aerial system (UAS) may be an entire system needed to operate the UAV. As illustrated in FIG. 16, the UAS may comprise the UAV, a ground control system (e.g., UAV controller), a camera, a positioning system, one or more software, and skills needed to operate the UAS. Wireless network (e.g., cellular network, 4G cellular network, 5G cellular network), which may enable the ground control system (e.g., UAV controller, UTM) to communicate with the UAV may be one of the components of the UAS.

Figure 17:
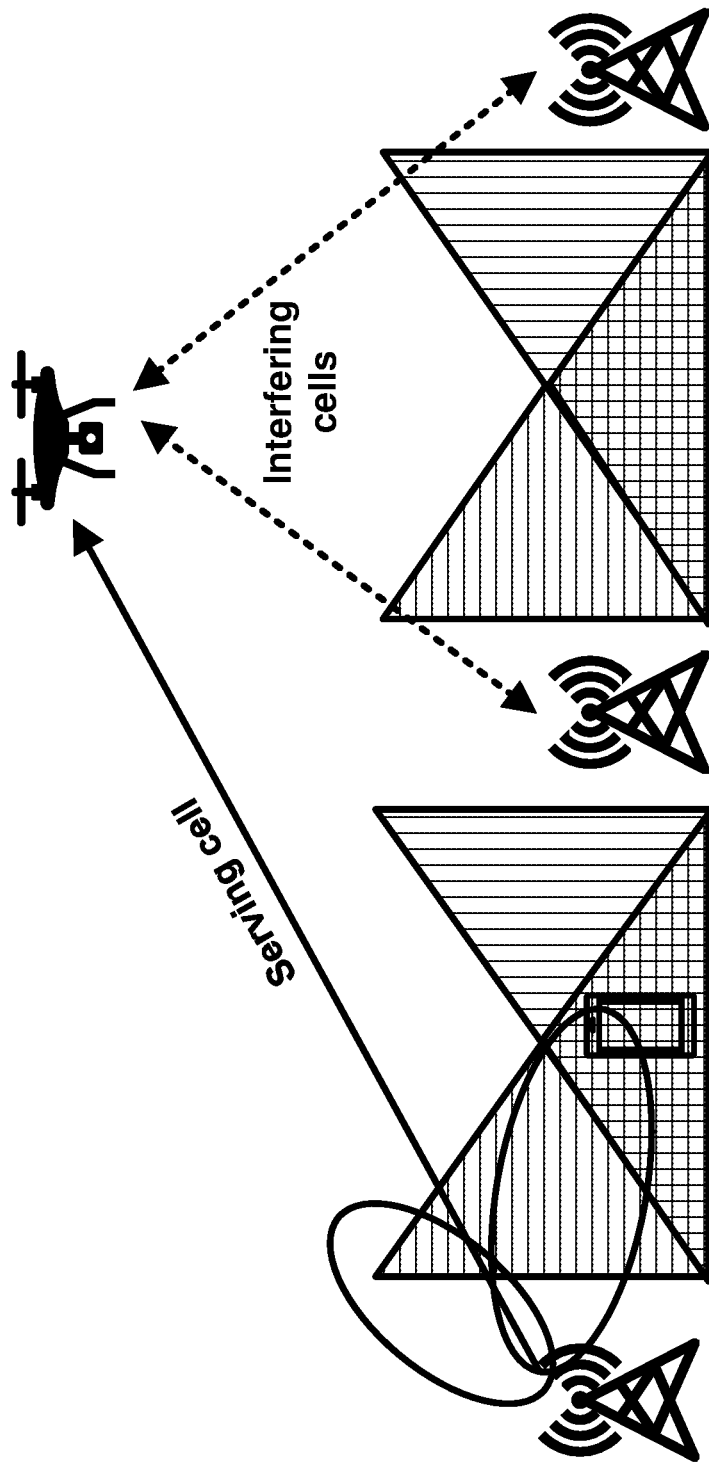
FIG. 17 illustrates an example scenario how an unmanned and/or uncrewed aerial vehicle interacts with base stations regarding interference in accordance with embodiments of the present disclosure.

In an example, a wireless device may be the UAV. The wireless device may be an aerial wireless device. The wireless device may fly above the ground. As illustrated in FIG. 17, the wireless device may experience high line-of-sight (LOS) propagation probability. The wireless device may receive downlink (e.g., from a base station to the wireless device) interference from a larger number of cells than a typical terrestrial wireless device does. In the downlink direction, there may be higher probability that the number of neighboring cells causing high level of downlink interference at the wireless device than in the case of terrestrial wireless device. In an example, 16 cells causing high level of downlink direction interference may be observed by the wireless device at heights of 50 m or above. In an example, antennas of a base station (e.g., eNB, gNB) may be down tilted to serve terrestrial wireless devices. The wireless device may locate above a height of the antennas of the base station. The wireless devices may be served by side lobes of the antennas of the base station. The wireless device may see a stronger signal from a faraway base stations than the one that is geographically closest. The wireless devices may be served by a faraway base station instead of the closest one. Downlink direction pathloss and uplink direction pathloss for the aerial wireless device may differ in some scenarios where reciprocity does not hold (e.g., due to different side lobe orientations in uplink and downlink, or different channel characteristic in a frequency domain division deployment (FDD).

Base stations of the wireless network and wireless devices may employ radio access network (RAN) functions for an aerial communication service (e.g., UAS, UAV, unmanned and/or uncrewed aerial service). Base stations and wireless devices may support radio access network (RAN) functions for an aerial communication service (e.g., UAS, UAV). The RAN functions for the aerial communication service may be an aerial user equipment (UE) communication. In an example, the aerial communication service may be an aerial user equipment (UE) communication. The aerial communication service may support the UAS. The RAN functions for the aerial communication service may comprise a height-based measurement reporting, an interference detection for the aerial UE communication, an interference mitigation for the aerial UE communication, a flight path information reporting, a location reporting for the aerial UE communication, and/or the like.

In an example, the base station may send an RRC message (e.g., RRC configuration message, RRC reconfiguration message) to a wireless device. The RRC message may comprise one or more measurement events regarding the height-based measurement reporting. The one or more measurement event may indicate to the wireless device, a height threshold for the height-based measurement reporting. The wireless device may receive the measurement event comprising the height threshold. The wireless device may send a height report if an altitude of the wireless device is above or below the height threshold. The height report may comprise height of the wireless device, a location of the wireless device, and/or the like.

If received signaling power (e.g., RSRP) of multiple neighboring cells are above certain levels for a wireless device, the wireless device may experience or introduce interference. For interference detection, the base station may configure radio resource management (RRM) event that triggers measurement report when individual (per cell) RSRP values for a configured number of cells (e.g., 8, 16) fulfill the configured event. The configured event may be for the interference detection. The RRM event may be A3, A4 or A5. The wireless device may send a measurement report in response to determine that the RRM event occurs.

In an example, for the interference mitigation, the base station may configure with a wireless device specific alpha parameter for physical uplink shared channel (PUSCH) power control. The base station may send a radio resource control (RRC) message comprising the alpha parameter for the PUSCH power control. If a wireless device receives the dedicated alpha parameter (e.g., alpha-UE) from the base station, the wireless may apply the dedicated alpha parameter instead of a common alpha parameter.

In an example, a base station may request to a wireless device to report flight path information by sending a user equipment information request message. The flight path information may comprise a number of waypoints defined as 3D locations. The user equipment information message may indicate a maximum number of waypoints and/or whether timestamps are required for the waypoints. The wireless device may receive the user equipment information message. If the wireless device is available to report the flight path, the wireless device may send a user equipment information response message to the base station. The user equipment response message may comprise one or more waypoints and one or more timestamps associated with the one or more waypoints. The base station may use the flight path information for congestion prediction or resource handling to mitigate interference.

In an example, for the location reporting for the aerial UE communication, the base station may request to a wireless device to include a horizontal and vertical speed of the wireless device for location information reporting. The wireless device may send location information reporting to the base station. The location information reporting may comprise the horizontal speed, the vertical speed, and/or the like. The location information may further comprise height of the wireless device.

Remote identification (RID) may be a technology to avoid collision between different UAVs or between manned aircrafts and UAVs. To prevents collision accidents, a federal aviation authority (FAA) may integrate the UAVs into a national airspace system (NAS) by introducing the RID. The RID may be an ability of a UAS in flight to provide identification and tracking information that may be received by other parties and may play a role in identifying and grounding unauthorized UAS in restricted areas. In an example, UAVs above 0.55 lbs. may be mandated to support RID. There may be two types of RID: standard RID and limited RID. For standard RID, a UAV may support a network publishing identification (ID) and a direct broadcast ID. For limited RID, the UAV may support the network publishing ID. For limited RID, the UAV may not support the direct broadcast ID. The network publishing ID may be based on communication via an internet from a RID server provider that interfaces with the UAV. The direct broadcast ID may be based on direct transmission of the RID by a UAV using its onboard direct transmission technology (e.g., Bluetooth, Wi-Fi module). A UAV that supports the limited RID (e.g., does not support the direct broadcast ID) may be not allowed to fly above 400 feet. A UAV that supports the limited RID, network connectivity may be required during the flight. A UAS that supports the standard RID may be allowed to fly above 400 feet and there is no restriction for the network connectivity.

In an example, command and control communication may be a user plane link to deliver message with information of command and control for UAV operation from a UAV controller or a UTM to the UAV. The command and control communication may be C2 communication. The C2 communication comprises three types of communication 1) direct C2 communication, 2) network assisted C2 communication, 3) UTM navigated C2 communication. The direct C2 communication may use the direct communication link between a UAV and a UAV controller. The network assisted C2 communication may use cellular network (e.g., public land mobile network) for a communication between the UAV and the UAV controller. For the UTM navigated C2 communication may use, the UTM may provide a pre-scheduled flight plan to the UAV and the UTM may keep track and verify up to date restrictions or flight plan to the UAV.

Figure 18:
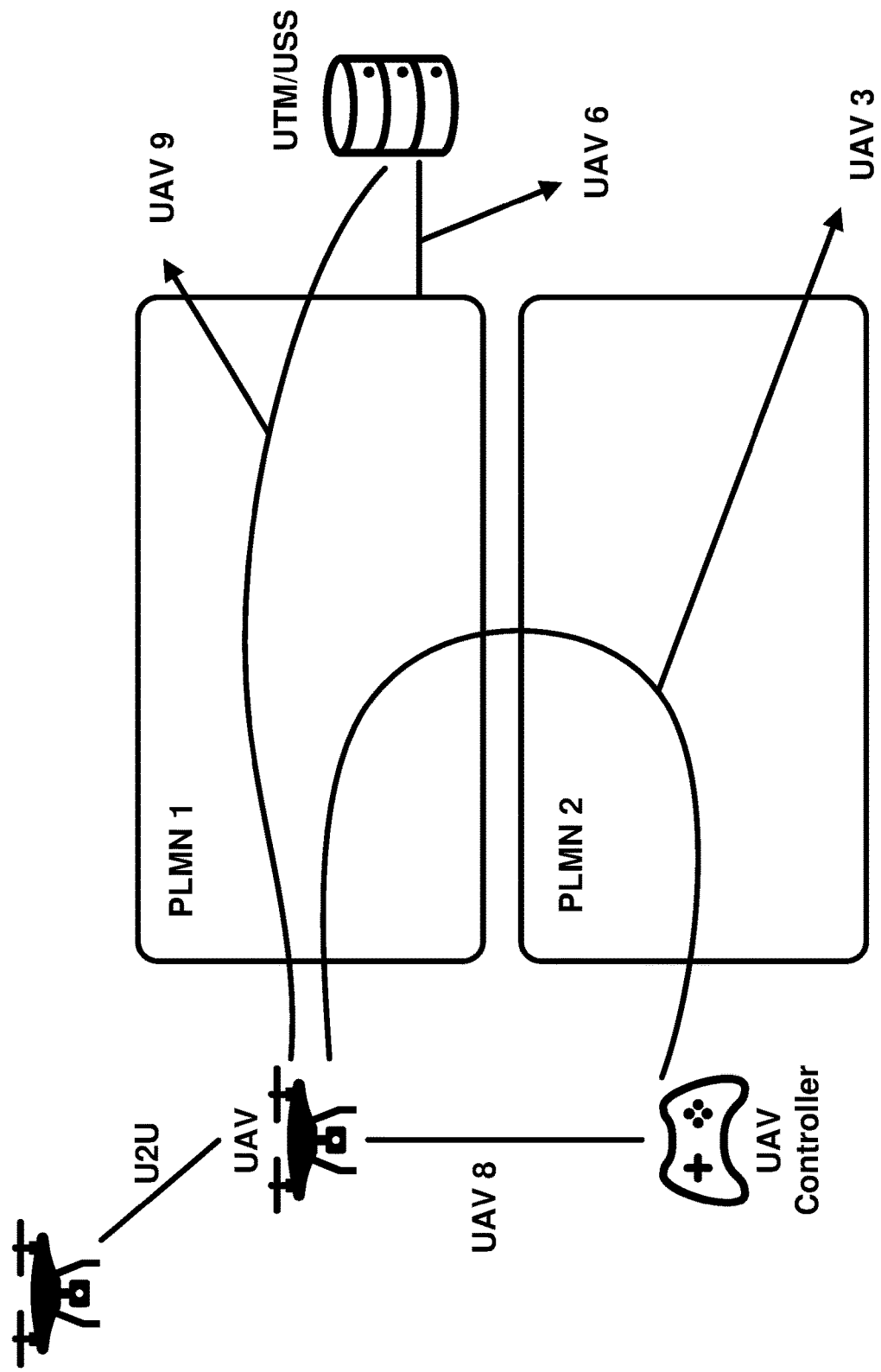
FIG. 18 illustrates an example architecture for an unmanned and/or uncrewed aerial system regarding interfaces in accordance with embodiments of the present disclosure.

FIG. 18 shows an example interfaces (e.g., U2U, UAV3, UAV6, UAV8, UAV9) for the unmanned and/or uncrewed aerial system with wireless network (e.g., PLMN1, PLMN2). The interface may be a communication connectivity. In an example, U2U interface may be an interface for the direct broadcast ID. UAV8 interface may be an interface for the direct C2 communication between the UAV and the UAV controller. The UAV3 interface may be an interface between the UAV and the UAV controller via wireless network. In an example, the UAV3 may be in intra-PLMN or inter-PLMN. In an example, for the intra-PLMN, the PLMN1 and PLMN2 may be same PLMN. For the inter-PLMN, the PLMN1 and the PLMN2 may be different PLMN. In an example, the UAV9 may be interface between the UAV and a networked UAV controller and the USS/UTM for UAS management (e.g., authentication and/or authorization, transporting C2, RID and tracking information of the UAV). In an example, the UAV6 may be interface between the PLMN (e.g., 3GPP network) and a USS/UTM for functionality exposure, support of identification and tracking, and a UAV authentication/authorization.

Figure 19:
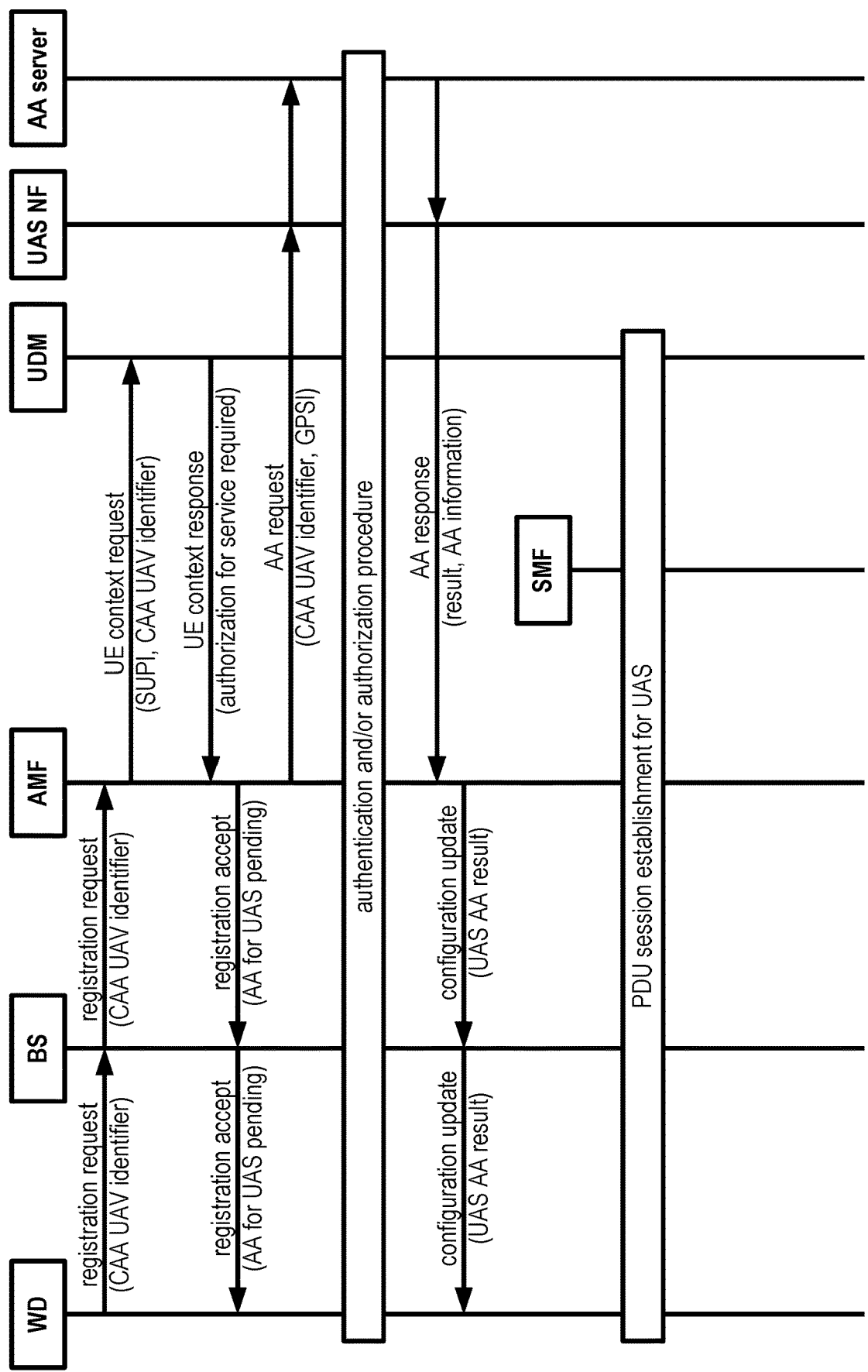
FIG. 19 illustrates an example registration procedure regarding an authentication and/or authorization for an aerial service in accordance with embodiments of the present disclosure.

FIG. 19 illustrates an example registration procedure regarding an authentication and/or authorization (AA) for a UAS service between a wireless device (e.g., UE, UAV), a base station (e.g., NR-RAN, gNB), a mobility management function (e.g., AMF), a session management function (e.g., SMF), a subscription server (e.g., UDM), a UAS network function (NF) and a traffic manager (e.g., UTM, USS). The traffic manager may be a server (e.g., an AA server). The status of the wireless device with respect to the authentication and/or authorization may be referred to as an authentication and/or authorization status (AA status), USS UAV authentication and/or authorization status (UUAA status), etc. In an example, the wireless device may access 5G system via a base station (e.g., gNB). The mobility management function may be an access and mobility management function (AMF). The subscription server may be a unified data management (UDM).

In an example, the wireless device may send a registration request message to the AMF via the base station. The registration request message may comprise an identity of the wireless device, a UAS service capability, slice information, a civil aviation authority (CAA) UAV identifier, and/or the like. In an example, the UAS service capability may be whether the wireless device supports the RAN functions for an aerial communication service (e.g., UAS service). In an example, the capability of the UAS service may be whether the wireless device require the UAS service (e.g., acting as a UAV or UAV controller). An aviation domain or functions of the aviation domain may assign the CAA UAV identifier to the wireless device. The CAA UAV identifier may be a CAA-level UAV identifier. In an example, the aviation domain may be a UAS traffic management (UTM) or a UAS service supplier (USS). The CAA UAV identifier may be a CAA UAV identifier. The CAA UAV identifier may be used for the RID and tracking of the wireless device. The identity of the wireless device may comprise at least one of a SUCI, 5G-GUTI, an international mobile equipment identity (IMEI), an IMEI software version (IMEISV), a shortened version of 5G-GUTI, and/or the like.

In response to receiving the registration request message, the AMF may send a UE context request message to a UDM (e.g., subscription server). The UE context request message may comprise an identifier of the wireless device, the capability of the UAS, slice information, the CAA UAV identifier, and/or the like. In an example, the identity of the wireless device may be a subscriber permanent identifier (e.g., IMSI, SUPI) of the wireless device.

In an example, the UDM may receive the UE context request message from the AMF. In response to receiving the UE context request message, the UDM may send a UE context response message comprising subscription information of the wireless device to the AMF. The UDM may determine the subscription information based on an existence of the capability of the UAS service or the CAA UAV identifier and slice information. In an example, if the capability of the UAS service is present in the UE context request message, the UDM may include unmanned and/or uncrewed aerial service subscription information to the subscription information. In an example, if the CAA UAV identifier is present in the UE context request message, the UDM may include unmanned and/or uncrewed aerial service subscription information to the subscription information. The subscription information may be subscription data. In an example, the subscription information may indicate whether the wireless device is allowed to get the UAS service. In an example, the subscription information may indicate whether the wireless device is allowed to get the UAS service or not. The subscription information may further indicate whether an authentication and/or authorization is required for the UAS service.

The AMF may receive the UE context response message comprising the subscription information. In response to receiving the UE context response message, the AMF may determine whether an authentication and/or authorization for the UAS service is required. The determination may be based on the capability provided by the wireless device, the CAA UAV identifier, subscription information provided by the subscription server, and/or the like. If the capability indicate that the wireless device does not support the UAS service, the AMF may not allow the UAS service and may not perform the authentication and/or authorization for the service.

In an example, the subscription information may indicate that the wireless device is allowed to get the UAS service. If the UAS service is allowed for the wireless device, the AMF may check whether the wireless device is required the authentication and/or authorization. If the authentication and/or authorization is required for the service, the AMF may indicate to the wireless device that the authentication and/or authorization for the UAS service is pending. During the authentication and/or authorization for the UAS service of the wireless device is pending, the AMF may withhold the RAN function activation associated with the service with the base station and the wireless device.

If the authentication and/or authorization for the UAS service is required based on the subscription information, the AMF may perform the authentication and/or authorization procedure for the UAS service by sending an authentication and/or authorization (AA) request message to an authentication and/or authorization (AA) server. The AMF may send the AA request message to the AA server via an UAS network function (NF). The AA server may be the UTM or the USS. The AMF may send the AA request message to the AA server via a NEF or new network device (e.g., UAS network function) for the UAS service. The AA request message may comprise the CAA UAV identity, a GPSI, and/or the like. The AA server may use the CAA UAV identity to identify the wireless device inside the AA server or the aviation domain (e.g., UTM/USS). The 3GPP network (e.g., cellular operator) may assign the GPSI for the UAS service. The AA server may use the GPSI for communication with the 3GPP network.

The AA request message may trigger performing the authentication and/or authorization procedure between the AA server and the wireless device. The detailed procedure for the service specific AA procedure is described in FIG. 20. If the service specific AA procedure is completed, the AA server may send an authentication and/or authorization (AA) response message to the AMF. The AA response message may comprise an authorization result, an authorized type, an authorized level, authorized paths, and/or the like. In an example, the AA completion may mean the use of service in application layer between the wireless device and the AA server is ready.

In an example, the AMF may receive an AA response message from the AA server. In response to receiving the AA response message, the AMF may send a configuration update message indicating the authorization result (e.g., whether the wireless device is authenticated and authorized for the UAS service). If the authorization result indicates that the UAS service is not authenticated/authorized for the wireless device (e.g., the authentication/authorization is failed), the wireless device may not request an establishment of one or more PDU sessions associated with the UAS service. If the authorization result indicates that the UAS service is authenticated/authorized for the wireless device (e.g., the authentication/authorization is succeeded), the wireless device may request an establishment of one or more PDU sessions associated with the UAS service to a SMF. In an example, the AAA-S may be the AA server.

In an example implementation, the AMF may not perform the AA procedure for the UAS. The SMF may perform the AA procedure for the UAS service by sending AA request message to an AA server. If the SMF performs the AA procedure, the AA procedure may be part of the PDU session establishment procedure.

Figure 20:
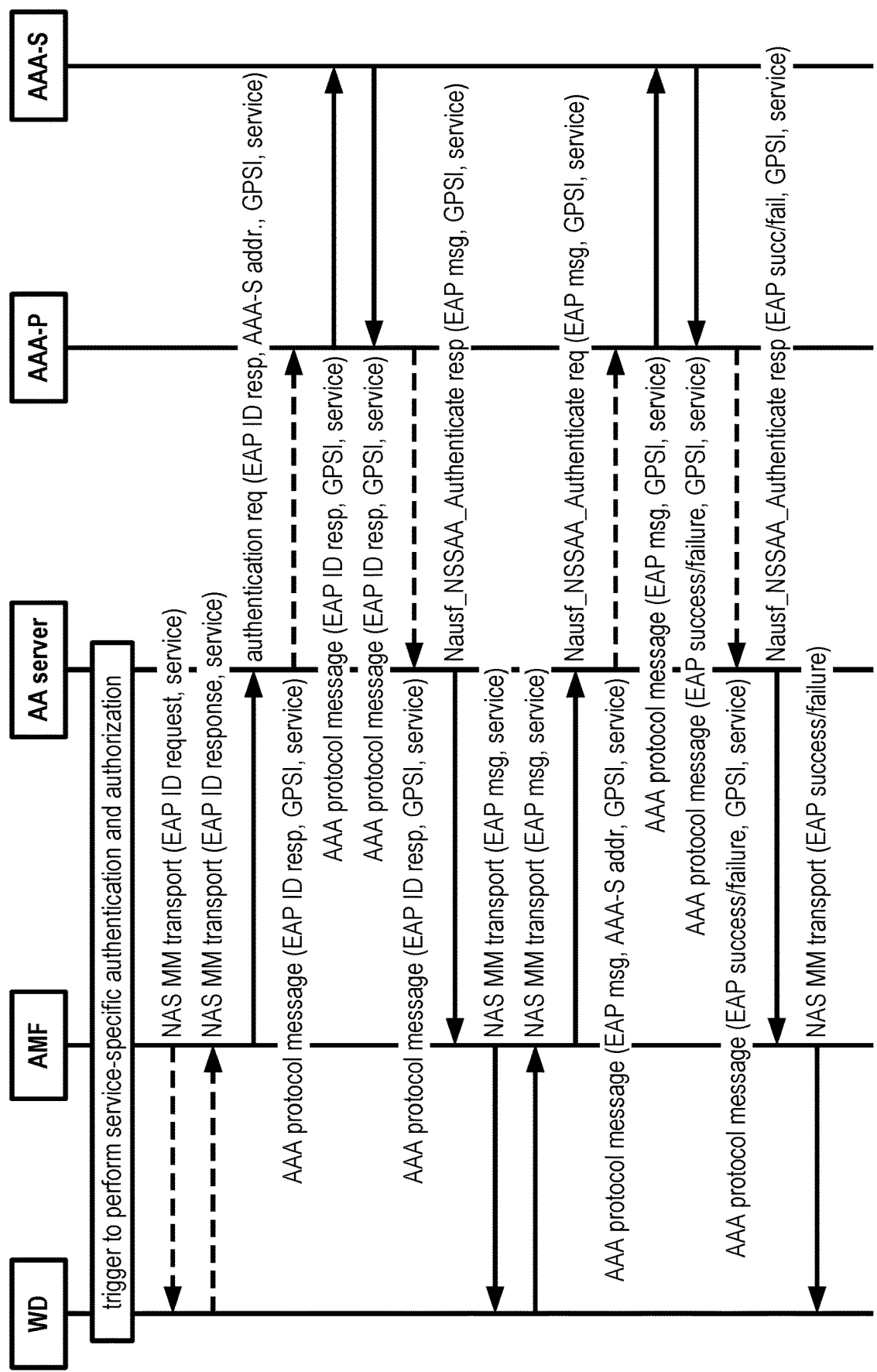
FIG. 20 illustrates example service specific authentication and/or authorization procedure in accordance with embodiments of the present disclosure.

FIG. 20 illustrates an example service specific authentication and/or authorization procedure. An access and mobility management function (AMF) may trigger the start of the service specific authentication and/or authorization procedure for a service. The AMF may be a mobility management entity (MME). The AMF may send an extensible authentication protocol (EAP) Identity Request for the service in a NAS MM Transport message including the service name to a wireless device. The wireless device may provide the EAP Identity Response for the service alongside the service name in an NAS MM Transport message towards the AMF. The AMF may send the EAP Identity Response to an authentication and/or authorization (AA) server in an authentication request (EAP Identity Response, AAA-S address, GPSI, a service name) message. If the AAA-P is present (e.g., because the AAA-S belongs to a third party and the operator deploys a proxy towards third parties), the AA server forwards the EAP ID Response message to the AAA-P. Otherwise, the AA server forwards the message directly to the AAA-S. The AA server may use towards the AAA-P or the AAA-S a AAA protocol message of the same protocol supported by the AAA-S. The AAA-P may forward the EAP Identity message to the AAA-S addressable by the AAA-S address together with the service and GPSI. The AAA-S may store the GPSI to create an association with the EAP Identity in the EAP ID response message, so the AAA-S may later use the GPSI to revoke authorization or to trigger reauthentication. EAP-messages may be exchanged with the wireless device. One or more iterations of these steps may occur. If EAP authentication completes, the AAA-S may store the service for which the authorization has been granted, so the AAA-S may decide to trigger reauthentication and reauthorization based on its local policies. An EAP-Success/Failure message may be delivered to the AAA-P (or if the AAA-P is not present, directly to the AA server) with GPSI and the service name. If the AAA-P is used, the AAA-P may send a AAA Protocol message including (EAP-Success/Failure, the service name, GPSI) to the AA server. The AA server may send the Authenticate Response (EAP-Success/Failure, the service mane, GPSI) to the AMF. The AMF may transmit a NAS MM Transport message (EAP-Success/Failure) to the wireless device. The AMF may store the EAP result for each service for which the service specific authentication and/or authorization procedure executed. In an example, the AAA-S may be the AA server.

Figure 21:
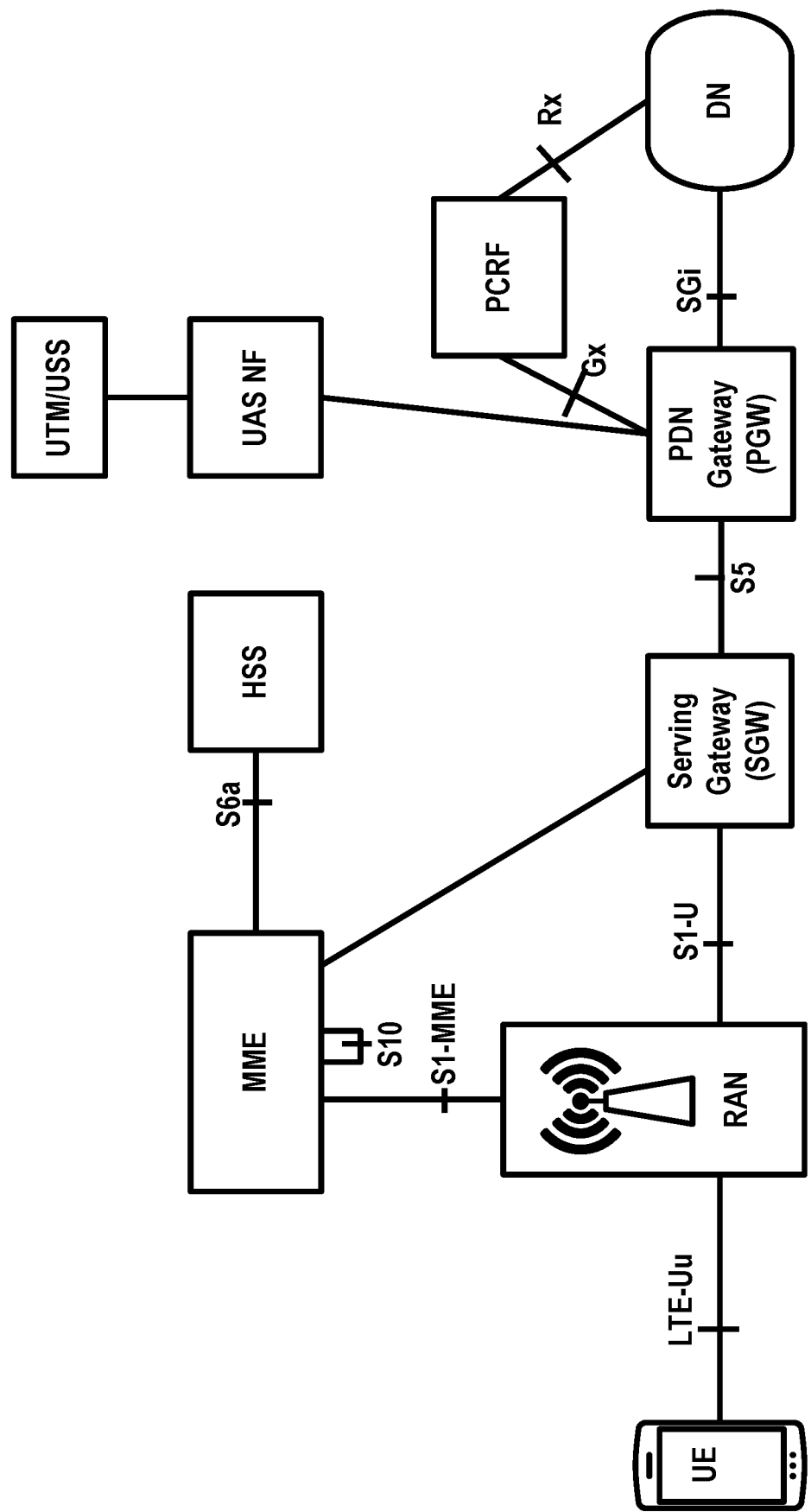
FIG. 21 depicts a 4G network comprising of 4G access network (e.g., E-UTRAN) and 4G core network (e.g., evolved packet system) in accordance with embodiments of the present disclosure.

FIG. 21 depicts a 4G network (e.g., 4G system, evolved packet system (EPS)) comprising of a 4G access network and a 4G core network (e.g., evolved packet core (EPC)). In an example, the 4G access network may comprise a radio access network (RAN) connecting to a 4G core network. The RAN may apply an evolved universal terrestrial radio access (E-UTRA) technology. The RAN may be a E-UTRA network (E-UTRAN). The 4G core network may comprise one or more mobility management entities (MME)s, one or more home subscriber servers (HSS)s, one or more gateways for user plane (e.g., Serving gateway (S-GW, SGW), Packet data network gateway (P-GW, PGW, PDN GW)), one or more policy and charging rules function (PCRF) and/or the like. If the 4G network supports an unmanned and/or uncrewed aerial system (UAS), the 4G core network may further comprise an UAS network function (NF). A traffic manager for the UAS service (e.g., UTM, USS) may be connected to the UAS NF. The MME may be a node or a network function in charge of at least one of: a non-access stratum (NAS) signaling and security, mobility of a wireless device, a reachability of the wireless device, an access control of the wireless device, authentication, and authorization, and/or the like. The MME may be equivalent to an AMF and may comprise partial functionalities of a session management function (SMF) of the 5G system. The S-GW may be a gateway which terminates a user plane interface (e.g., S1-U) towards the 4G access network. The S-GW functionalities may comprise a local mobility anchor point for inter-RAN (e.g., inter eNB, inter base stations) handover, a packet routing and forwarding, idle mode packet buffering and/or the like. The P-GW (e.g., PDN-GW) may be a gateway which terminates SGi interface towards the data network (e.g., packet data network (PDN), DN). The P-GW functionalities may comprise an IP address allocation for the wireless device, transport level packet marking in the uplink and downlink (e.g., setting a DiffServ code point, based on a QCI, priority), service level gating control, service level rate enforcement. As an implementation option, the S-GW and the P-GW may be separated to control plane functions and a user plane functions. The control plane functionalities of the S-GW and the P-GW (e.g., S-GW-C, P-GW-C) may be equivalent to the SMF of the 5G system. The user plane functionalities of the S-GW and the P-GW (e.g., S-GW-U, P-GW-U) may be equivalent to a user plane function (UPF) of the 5G system. The HSS may be a node storing subscription information of the wireless device. The HSS may also support an authentication and/or authorization of the wireless device. The HSS may be a node in charge of the functionality of the UDM of the 5G system. In an example, a wireless device (e.g., UE) may attach to the MME by sending an attach request message to get one or more services from the 4G network. The wireless device may send a PDN connectivity request message to the MME to make one or more sessions between the wireless device and the data network (DN) via the gateways for the user plane. The one or more sessions may be one or more packet data network (PDN) connections between the wireless device and one or more P-GWs.

Figure 22:
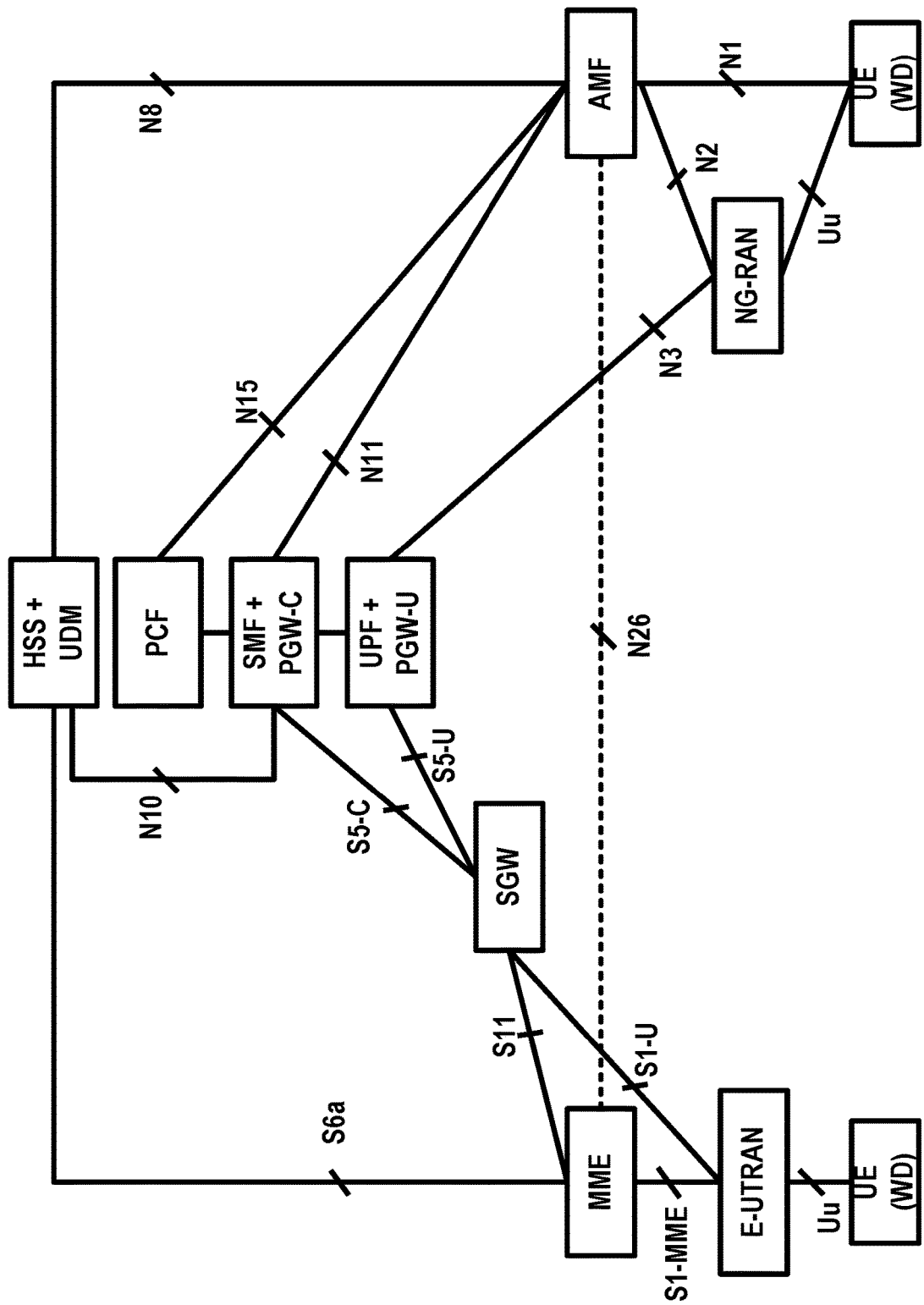
FIG. 22 depicts an architecture for interworking between 4G system and 5G system in accordance with embodiments of the present disclosure.

FIG. 22 depicts an example network architecture for inter-system interworking between a 4G system (e.g., 4G network) and a 5G system (e.g., 5G network) in accordance with embodiments of the present disclosure. Left side of the FIG. 22 may be the 4G system comprising an MME, a E-UTRAN and an SGW. The right side of the FIG. 22 may be the 5G system comprising an AMF, a NG-RAN. A UE (e.g., wireless device) may connect to the E-UTRAN or the NG-RAN via the Uu interface. The UE may be a wireless device. The Uu interface between the E-UTRAN and the wireless device may be an LTE Uu. The Uu interface between the NG-RAN and the wireless device may be a NR Uu. One or more nodes or network functions may be common network nodes or common network functions which are shared between the 4G system and the 5G system. The common network nodes may comprise a subscription information storage function (e.g., HSS+UDM), a policy function (PCRF+PCF), control plane gateway functions (SMF+PGW-C), user plane gateway functions (UPF+PGW-U) and/or the like. In an example, the common network nodes may comprise the 4G system function and the 5G system function to employ an interworking when the wireless device moves between a E-UTRAN coverage area and a NG-RAN coverage area.

In FIG. 22, there is a N26 interface between the MME and the AMF. The N26 interface may be an inter-core network interface between the MME of 4G system and the AMF of the 5G system. The N26 may enable interworking between the 4G system and the 5G system. Networks that support interworking between the 4G system and the 5G system, may support interworking procedures that use the N26 interface or interworking procedures that do not use the N26 interface. A network node (e.g., MME, AMF) may indicate to the wireless device whether the network supports interworking procedure with N26 or without N26. The network node may indicate whether the network supports interworking procedure with N26 or without N26, by sending an interworking parameter to the wireless device. If the network supports N26 interface (e.g., interworking procedure with N26), the interworking parameter may be set as "interworking without N26 interface not supported". If the network does not support N26 interface (e.g., interworking procedure without N26), the interworking parameter may be set as "interworking without N26 interface supported".

In an example, the interworking procedures using the N26 interface, may enable an exchange of mobility management context and session managements states (e.g., contexts) of the wireless device between the 4G system and the 5G system. When the interworking procedures with N26 is used, the wireless device may operate in a single-registration mode. For the single-registration mode, the wireless device may keep one valid registration (e.g., attach) association either with the 4G system in the MME or with the 5G system in the AMF. When interworking procedures without N26 is used, the wireless device may operate in a dual-registration mode. In dual-registration mode, the wireless device may perform independent registration for the 4G system and the 5G system. In dual-registration mode, the wireless device may be allowed to register with the 5G system and to attach (e.g., register) with the 4G system simultaneously.

Figure 23:
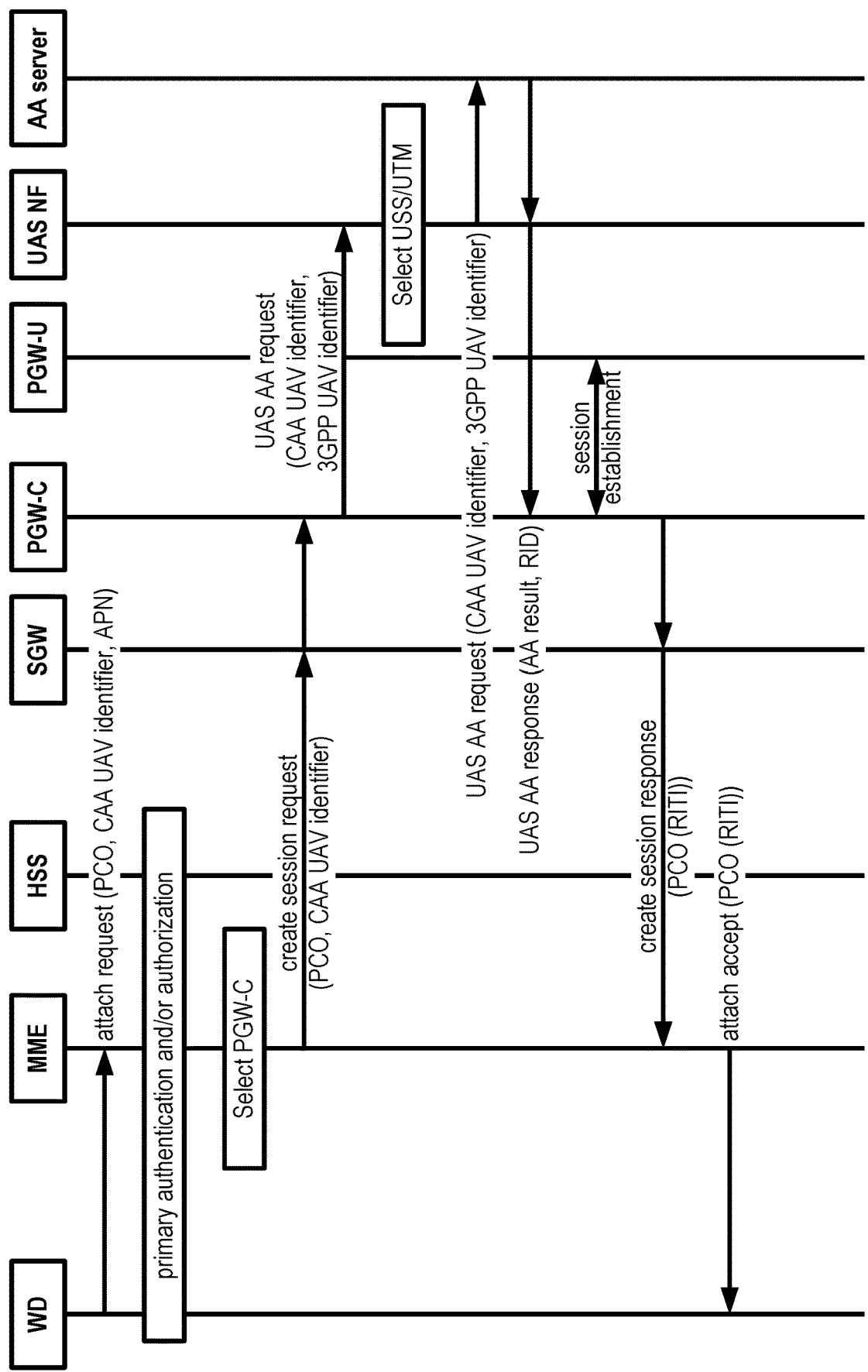
FIG. 23 illustrates an example authentication and/or authorization procedure for 4G network in accordance with embodiments of the present disclosure.

FIG. 23 illustrates an example authentication and/or authorization procedure for a UAS service in a 4G system between a wireless device (e.g., UE), a mobility management function (e.g., MME), a session management function (e.g., PGW-C), one or more user plane gateways (e.g., PGW-U, SGW), a subscription server (e.g., HSS), a UAS NF, and a traffic manager (e.g., UTM, USS). The traffic manager may be an AA server. In an example, the wireless device may access the 4G system via a base station (e.g., gNB). The base station is not shown in figure FIG. 23. The wireless device may access to the MME or to the SGW via the base station (e.g., E-UTRAN, eNB). The mobility management function may be a mobility management entity (MME). The subscription server may be a home subscriber service (HSS). The session management function may be a PGW-C.

In an example, the wireless device may send an attach request message to the MME via the base station. The wireless device may be an unmanned and/or uncrewed aerial vehicle (UAV). The attach request message may comprise an identity of the wireless device, a capability of the UAS service, a civil aviation authority (CAA) UAV identifier, and/or the like. The attach request message may further comprise a request for a packet data network (PDN) connectivity to a data network. If the 4G system does not support "attach without PDN connectivity", the wireless device may include the request for the PDN connectivity in the attach request message. The request for the PDN connectivity may be coded inside an EPS session management (ESM) message container. The PDN connectivity request may comprise an EPS bearer identity, an access point name (APN), the CAA UAV identifier, protocol control options (PCO), and/or the like. The wireless device may send the PDN connectivity request to the MME, to request an establishment of a PDN connection between the wireless device and the PGW (e.g, PGW-U) toward to data network (DN). The PCO may comprise information associated with an application (e.g., UAS service). In an example, the PCO may comprise the CAA UAV identifier. The PCO may comprise flight authorization identity. The PCO is for a communication between a session management controller (e.g., SMC, SMF, PGW-C) and the wireless device. The wireless device may receive the CAA UAV identifier and the flight authorization identity from the traffic manager (e.g, UAS server, UTM, USS).

In an example, the MME may receive the attach request message. In response to receiving the attach request message from the wireless device, the MME may perform a primary authentication and/or authorization (AA) of the wireless device with the HSS. The MME may perform the primary AA of the wireless device based on the identity of the wireless device. The identity of the wireless device may be a an IMSI or a GUTI. If the wireless device is authenticated by the MME, the MME may select a PGW-C for the wireless device based on the request for the PDN connectivity. In an example, the MME may select the PGW-C based on the APN, the CAA UAV identifier and/or like. In an example, the APN may be associated with a UAS service. The MME may select the PGW-C if the PGW-C support connection toward the UAS service. The MME may send a create session request message to the PGW-C. The create session request message may comprise the APN, the PCO, the CAA UAV identity, and/or the like.

In response to receiving the create session request message, the PGW-C may determine whether to perform an AA procedure for the UAS service. The PGW-C may determine whether to perform the AA procedure for the UAS service based on the APN, the PCO, the CAA UAV identity, local policy, and/or the like. In an example, the APN may be associated with the UAS service. In an example, the PCO may comprise the flight authorization identity. In an example, the local policy may indicate an AA for the UAS service is requested if the PDN connectivity is for the UAS service. Based on the determination, the PGW-C may perform the authentication and/or authorization (AA) procedure for the UAS service by sending an authentication and/or authorization (AA) request message to an authentication and/or authorization (AA) server. The PGW-C may send the AA request message for the UAS service to the AA server via an UAS network function (NF). The AA server may be the traffic manager (e.g., the UTM or the USS). The AA request message may comprise the CAA UAV identity, a 3GPP UAV identity, one or more parameters of the PCO, and/or the like. The 3GPP UAV identity may be a GPSI. The AA server may use the CAA UAV identity to identify the wireless device inside the AA server or the aviation domain (e.g., UTM/USS). The 3GPP network (e.g., cellular operator) may assign the GPSI for the UAS service. The AA server may use the GPSI for communication with the 3GPP network (e.g., UAS NF, PGW-C).

The AA request message may trigger performing the authentication and/or authorization procedure between the AA server and the wireless device. The detailed procedure for the service specific AA procedure is described in FIG. 20. In this example embodiment, the AMF of the FIG. 20 may be the PGW-C. If the service specific AA procedure is completed, the AA server may send an authentication and/or authorization (AA) response message to the PGW-C. The AA response message may comprise an AA result, an authorized type, an authorized level, authorized paths, and/or the like. The AA response message may comprise a RID, tracking information, and/or the like. The In an example, the AA completion may mean the use of service in application layer between the wireless device and the AA server is ready.

Referring again the FIG. 23, the P-GW may receive the AA response message for the AA server (via the UAS NF). In response to receiving the AA response message, the PGW-C may accept or reject the request for the PDN connectivity based on the AA result. In an example, if the AA result indicate an AA failure of the wireless device, the PGW-C may reject the PDN connectivity request and indicate the rejection to the MME and the wireless device. If the AA result indicate an AA success for the wireless device, the PGW-C may accept the request for the PDN connectivity and indicate the acceptance to the MME and the wireless device. If the PGW-C accepts the request for the PDN connectivity, the PGW-C may request to a PGW-U a session establishment for the PDN connectivity request. If the PGW-C accepts the PDN connectivity request, the PGW-C may send a create session response message to the MME vis the SGW. The create session response message may comprise PCO. The PCO may comprise the RID, tracking information, and/or the like. In response to receiving the create session response message, the MME may send an attach accept message comprising the PCO to the wireless device. The attach accept message may comprise an activate default EPS bearer context request. The activate default EPS bearer request may comprise the PCO.

In an example implementation, the acceptance or rejection for the PDN connectivity request (e.g., the request for the PDN connectivity) and the AA procedure for the UAS service may be separated. In response to receiving the create session request message from the MME, the PGW-C may accept the establishment of the PDN connectivity request and indicate to the wireless device. The PGW-C may accept the establishment of the PDN connectivity even the AA procedure is not started or not completed yet. This may decrease a delay for the attach procedure. When the PGW-C accepts the establishment of the PDN connectivity, the PGW-C may indicate to the wireless device, that the wireless device should not start any service or data transmission associated with the UAS service. The PGW-C may initiate the AA procedure for the UAS service by sending an AA request message to the AA server. If the PGW-C receives an AA response message indicating the AA success, The PGW-C may indicate to the wireless device, the wireless device is allowed to start service or date transmission associated with the UAS service.

In an example implementation, the 4G system may support "attach without PDN connectivity". The wireless device may not include the request for the PDN connectivity (e.g., requesting an establishment of the PDN connection) in the attach request message. If the wireless device receives an attach accept message in response to sending the attach request message, the wireless device may send the request for the PDN connectivity separately.

In existing technologies, a wireless device (e.g., unmanned and/or uncrewed aerial vehicle) may communicate, via cellular networks (e.g., 4G network, 5G network, etc.), with one or more network devices associated with an aerial service (e.g., unmanned and/or uncrewed aerial service (UAS) service). The network device may be, for example, a UTM, USS or UAV controller. In an example, the wireless device may be an unmanned and/or uncrewed aerial vehicle (UAV). The wireless device may fly above residential areas or fly next to other aerial vehicles. Due to safety issues (e.g., crashes) and privacy issues, the wireless device (e.g., UAV) may require authentication and/or authorization (AA) from a server (e.g., AA server) associated with the UAS service (e.g., UTM, USS) before obtaining aerial service. The authentication and/or authorization status of the wireless device may be referred to as authentication and/or authorization status (AA status), USS UAV authentication and/or authorization status (UUAA status), etc. For example, in addition to a primary AA from the cellular networks, the wireless device require additional AA from the AA server. To increase range, the wireless device may support both the 5G capability and 4G capability. If the wireless device moves between a 5G network area and a 4G network area, the 5G network and the 4G network may support interworking of the wireless device between the two networks (5G network, 4G network) for service continuity.

AA procedures for UAS service may complicate handover from a 4G network to a 5G network. For example, if a wireless device hands over from the 4G network to the 5G network, an access and mobility management function (AMF) of the 5G network may be required to ensure that the wireless device is authorized and/or authenticated for the aerial service. Accordingly, the AMF may trigger an AA procedure. Completion of the AA procedure may be associated with signaling overhead and/or delay. The handover may be incomplete (e.g., not commenced and/or not fully completed) until such time as the AA status of the wireless device is resolved.

In accordance with example embodiments of the present disclosure, the MME may indicate an AA status for an aerial service of a wireless device to an AMF. For example, the MME may be associated with a first network (e.g., a 4G network) and the AMF may be associated with a second network (e.g., a 5G network). The MME may send in the indication to the AMF based on a handover request of the wireless device. For example, the handover request may be received from a first base station of the first network, and may indicate handover to a second base station of the second network. The indication may be sent to the AMF in any suitable manner. For example, the MME may store the AA status of the wireless device in a context of the wireless device; the MME may send the indication of the AA status to the AMF during a context relocation procedure for an inter-system handover; etc. Based on the AA status provided by the MME, the AMF may determine whether or not to perform the AA procedure (e.g., without unnecessary duplication of an AA procedure which has already been performed). For example, if the AA status received from the MME indicates that the aerial service of the wireless device is authenticated and/or authorized, then the AMF can avoid duplication of the AA procedure (for example, commencing/completing handover while avoiding the signaling overhead and/or delay associated with an AA procedure). For example, if the AA status indicates that the aerial service of the wireless device is unknown, invalid, expired, or the like, then the AMF may determine that the AMF should perform the AA procedure (e.g., prior to commencing/completing the handover, during handover, after handover, etc.).

In accordance with example embodiments of the present disclosure, a session management controller (e.g., a PGW-C and/or an SMF) may indicate an AA status for an aerial service of a wireless device to a mobility management entity (MME). The MME may be associated with a first network (e.g., a 4G network). For example, the session management controller (SMC) may indicate the AA status during a session creation and/or establishment procedure for the wireless device. The MME may manage mobility of the wireless device based on the AA status of the wireless device, share the AA status of the wireless device to facilitate mobility management, etc.

In an example, the MME may indicate to the session management controller (SMC), a parameter for a 5G capability of the wireless device. Indicating the AA status for the aerial service by the SMC to the MME may be based on the parameter. The SMC may indicate the AA status for a wireless device if the wireless device is subject to handover to the 5G network. The SMC may aware that the wireless device is subject to handover to the 5G network, based on the parameter.

In accordance with example embodiments of the present disclosure, the 5G network may select an AA procedure for the UAS service based on a potential interworking to 4G network of a wireless device. The wireless device may indicate to an access and mobility management function (AMF), a 4G capability of the wireless device. Based on the indication that the wireless device is 4G-capable, the AMF may determine that a session management controller (SMC) performs the AA procedure (e.g., instead of the AMF). If the wireless device is not 4G-capable (e.g., does not support 4G capability (e.g., S1 mode)), the AMF may determine that the SMC does not perform the AA procedure (e.g., that the AMF performs the AA procedure itself). If the AMF determines that the SMC performs the AA procedure, the AMF may indicate to the SMC to perform an AA for the UAS. Therefore, the AA for the UAS in the 4G network and the 5G network is handled in the SMC (e.g., PGW-C+SMF), the AMF may not perform the duplicated AA procedure for the UAS service.

Figure 24:
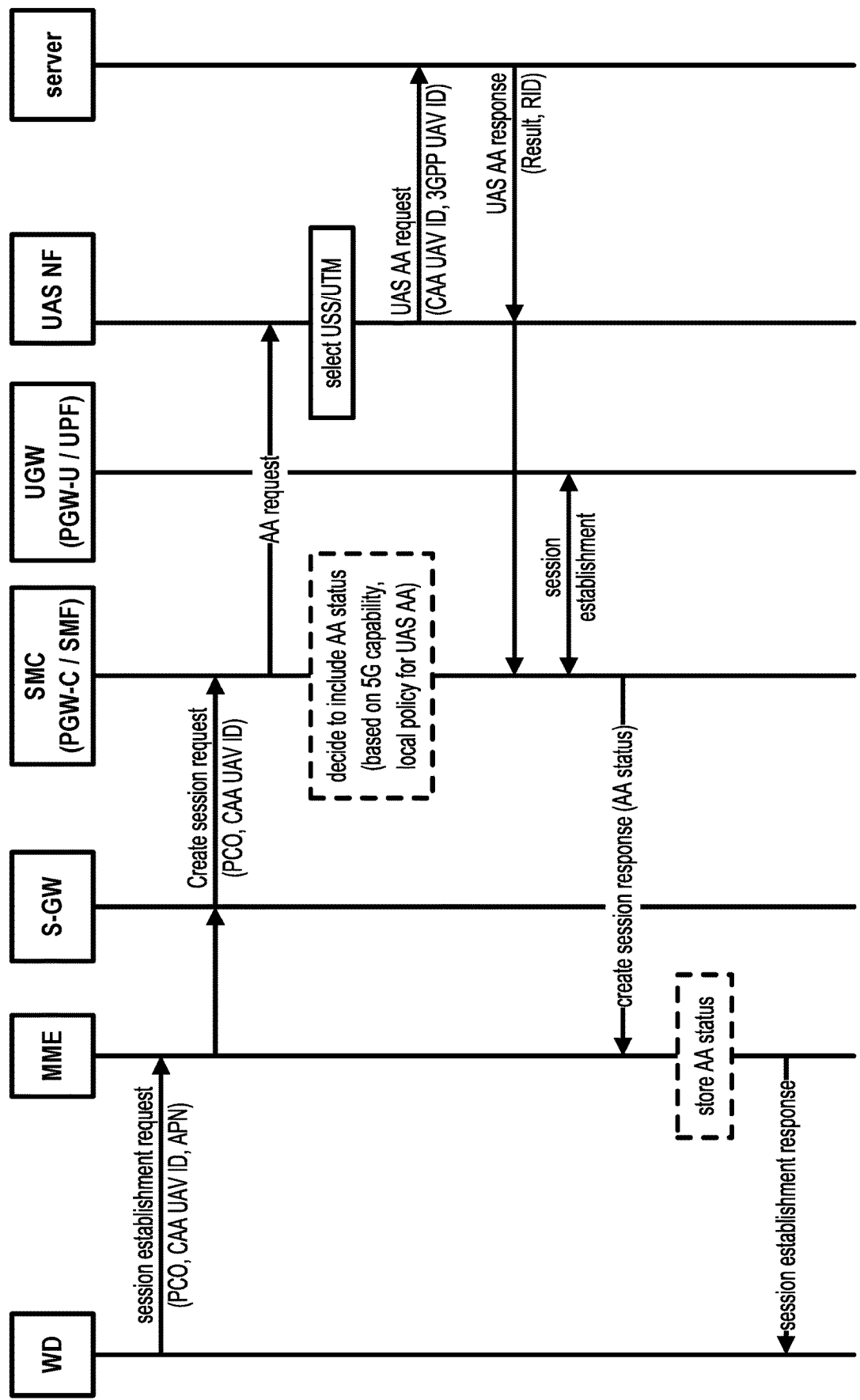
FIG. 24 illustrates an example session establishment procedure for 4G network in accordance with embodiments of the present disclosure.
Figure 25:
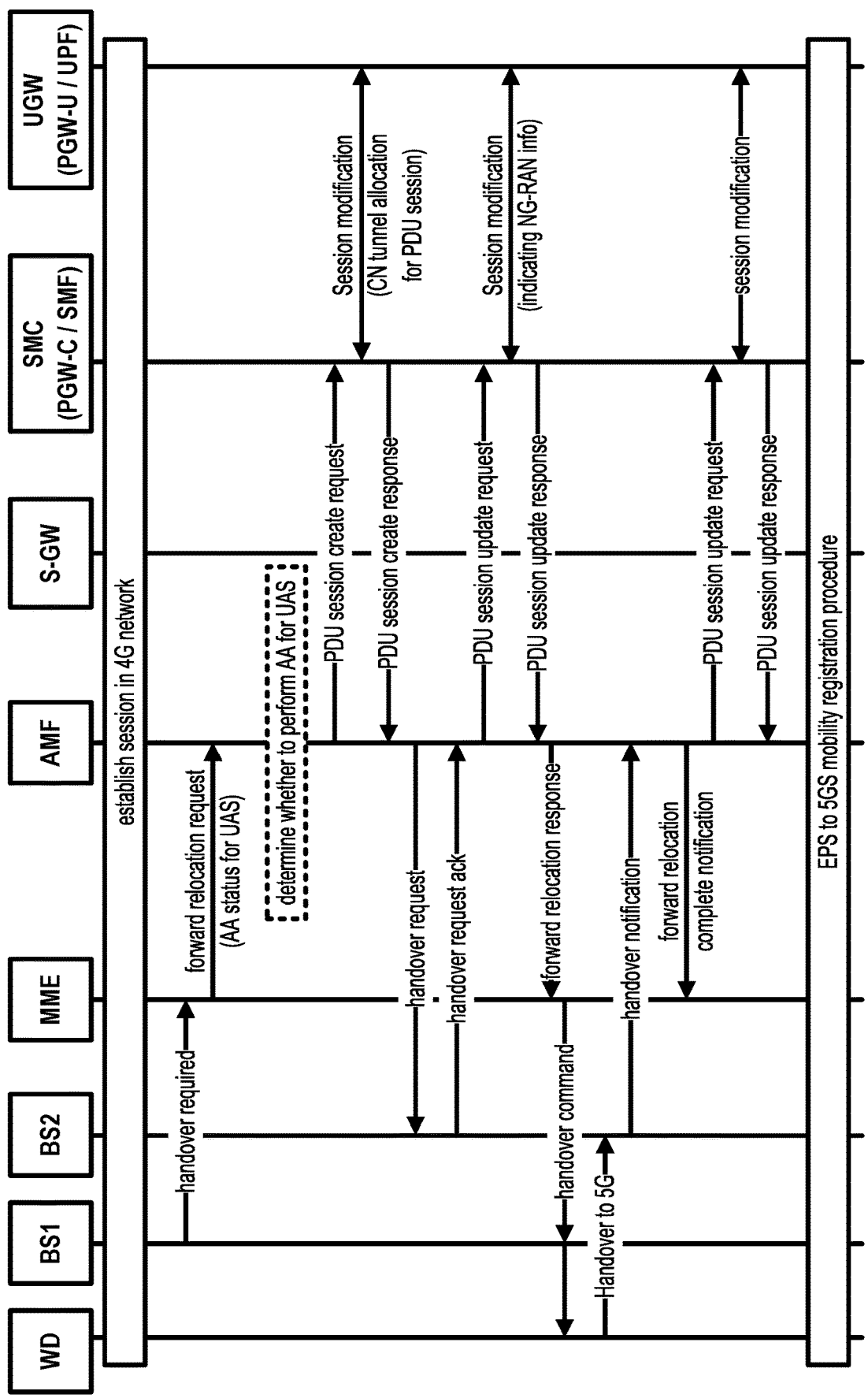
FIG. 25 illustrates an example inter-system handover procedure regarding the UAS service in accordance with embodiments of the present disclosure.

FIG. 24 illustrates an example session establishment procedure in 4G network where a session management controller (SMC) may indicate an AA status for the UAS service to an MME. The MME may store the AA status into contexts of a wireless device (e.g., EPS mobility management (MM) context) in the MME. Later, as illustrated in FIG. 25, the MME may indicate the AA status for the UAS service to an AMF. The MME may send a forward relocation request message comprising the AA status for the UAS service as part of inter-system interworking (e.g., inter-system handover) procedures for the wireless device from the 4G network to a 5G network.

Referring to FIG. 24, the wireless device may send a session establishment request message to the MME. The session establishment request message may be a PDN connectivity request message. The wireless device may send the PDN connectivity request message as part of an attach request procedure as illustrated in FIG. 23. The wireless device may be an unmanned and/or uncrewed aerial vehicle (UAV). The wireless device may need to communicate with a UAS server for the UAV operation. The session establishment request message may comprise a PCO, a CAA UAV identity, an APN and/or the like. The APN may be associated with a UAS service. The wireless device may be capable to communicate to a 5G network. In an example, the wireless device may support N1 mode. The N1 mode may be a mode of a wireless device allowing access to the 5G core network via the 5G access network. If the wireless device is capable to communicate to the 5G network, the wireless device may indicate to the MME a capability parameter of the N1 mode during attach procedure. The attach request message may comprise the capability parameter of the N1 mode.

In an example, the MME may receive the session establishment request message. In response to receiving the session establishment request message, the MME may select a session management controller (SMC) based on the CAA UAV identity, the APN, and/or the like. The MME may select SMC which supports UAS service. The MME may select a SMC further based on the capability parameter. In an example, the MME may select the SMC which supports inter-system interworking between the 4G network and the 5G network based on the capability parameter.

In response to receiving the session establishment request message, the MME may send a first message to the SMC, requesting a creation of a session associated with the UAS service for the wireless device. In an example, the first message may be a create session request message. The first message may comprise the PCO, the CAA UAV identity, the APN, and/or the like. The MME may send the PCO to the SMC transparently (e.g., the MME does not interpret or decode the PCO). The first message may further comprise the capability parameter of the N1 mode. The first message may further indicate that the wireless device is subject to handover 5G network. The SMC may support an interworking between the 4G network and the 5G network. The SMC may comprise functionalities of a PGW-C, functionalities of a SMF, and/or the like. In an example, the PGW-C and the SMF may be implemented in the SMC.

In response to receiving the first message, the SMC may determine to perform an AA procedure for the UAS service. The determination may be based on the APN, subscription information of the wireless device, the CAA UAV identity, PCO and/or the like. The SMC may send a second message to an AA server, requesting an AA for the UAS service of the wireless device. The second message may be an AA request message for the UAS service. In an example, the AA server may be an UAS server (e.g., traffic manager, USS, UTM). The SMC may send the second message to the AA server via the UAS network function (NF). The second message may comprise the CAA UAV identity, a 3GPP UAV identity (e.g., GPSI), the PCO and/or the like. As illustrated in FIG. 23, the AA server may perform the AA procedure for the UAS service. If the AA procedure is completed, the AA server may respond to the SMC by sending an AA response message. The AA response message may comprise an AA result, a RID, tracking information, and/or the like. In an example, the AA result may indicate whether the AA procedure is success or failure.

In response receiving the AA response, the SMC may indicate an AA status to the MME based on the AA result. In an example, the SMC may send a create session response message to the MME for the session establishment request. The create session response message may comprise the AA status. In an example, the AA status may indicate whether the wireless device is authenticated/authorized. In an example, the AA status may indicate that the AA is not performed. In an example, the AA status may indicate that the AA is successfully performed and valid. In an example, the AA status may indicate that the AA is failed. The AA status may indicate that the AA is not valid.

In an example, the 4G network may support interworking with N26 interface between the MME and the AMF. The SMC may indicate the AA status to the MME if the 4G network supports interworking with N26 interface. The MME may indicate to the SMC whether the 4G network supports interworking with N26 interface or without N26 interface.

In an example implementation, the 4G network may support interworking without N26 interface. The SMC may not indicate the AA status to the MME if the 4G network supports interworking without N26 interface.

In an example, the SMC may indicate the AA status to the MME if the wireless device is capable to communicate to the 5G network. The MME may aware whether the wireless device is capable to communicate to the 5G network based on the capability parameter. The capability parameter may be provided by the wireless device or old MME. The SMC may indicate the AA status based on the capability parameter. The SMC may indicate the AA status if the SMC determines that the wireless device is subject to access to the 5G network.

In response to receiving the AA status from the SMC, the MME may store the AA status into contexts of a wireless device in the MME. In response to receiving the create session response message from the SMC, the MME may send a session establishment response message to the wireless device. The session establishment response message may be an activate default EPS bearer context request.

In response receiving the AA response message, the SMC may accept or reject the PDN connectivity request based on the AA result. In an example, if the AA result indicate an AA success for the wireless device, the SMC may accept the PDN connectivity request and indicate the acceptance to the MME. Based on the acceptance, the SMC may select a user gateway (UGW) for the UAS service. The UGW may comprise a PGW-U, UPF, and/or the like. The SMC may establish a session with the UGW for the wireless device. The session may be a PDN connection between the wireless device and the UGW toward a data network associated with the UAS service.

FIG. 25 illustrates an example inter-system handover procedure with N26 interface between the 4G network and the 5G network where the MME indicate to the AMF the AA status for the UAS service. The AMF may determine whether to perform an AA procedure with the wireless device based on the AA status provided by the MME. The AMF may selectively perform the AA procedure based on the AA status provided by the MME.

In an example, the wireless device may establish one or more sessions associated with a UAS service as explained in earlier (FIG. 24) when the wireless device accesses to the 4G network. The wireless device may move to 5G network area. A first base station (e.g., BS1) may determine a handover of the wireless device to a second base station (BS2). The first base station may determine the handover based on measurement reports provided by the wireless device. Based on the determination, the first base station may send a message requesting a handover of the wireless device to a second base station. The first base station may belong to the 4G network. The second base station may belong to the 5G network. The message may be a handover required message. The message may comprise an identifier of the second base station (e.g., IP address of the second base station), a handover type, source to target transparent container information, and/or the like. The identifier of the second base station may comprise a global next generation node b identifier, a global next generation evolved node b identifier, a public land mobile network (PLMN) identifier, a tracking area code of a 5G network, and/or the like. The handover type may comprise an intra long term evolution (LTE), from the LTE to a universal terrestrial radio access network (UTRAN), from the LTE to a global system for mobile communications (GSM) radio access network (GERAN), from the UTRAN to the LTE, from the GERAN to LTE, from the evolved packet system (EPS) to the 5G system (5GS), from the 5GS to the EPS, and/or the like. In an example, the handover type may indicate that from the EPS to the 5GS. The 4G network may be the EPS.

In response to receiving the message (e.g., handover required), the MME may send a second message to an access and mobility management function (AMF). The second message may indicate the AA status of the device. The second message may request a relocation of contexts of the wireless device. The second message may be a forward relocation request message. The second message may comprise the AA status for the UAS service of the wireless device. The second message may comprise an EPS mobile management (MM) context of the wireless device. The EPS MM context (e.g., MME UE context) may comprise an IMSI, a mobile equipment (ME) identity, UE security context, UE network capability, EPS bearer context(s), and/or the like. The EPS MM context may comprise the AA status for the UAS service.

In response to receiving the second message, the AMF may determine whether to perform an AA procedure for the UAS service. In an example, the second message may not comprise the AA status for the UAS service of the wireless device. The MME may not provide the AA status in the second message. If there is no AA status, the AMF may pause the interworking procedure. The AMF may perform the AA procedure by sending an AA request message to an AA server as illustrated in FIG. 19. The AMF may receive an AA response message. The AMF may determine that AA procedure is successful (e.g., the wireless device is authenticated and authorized for the UAS service) based on the AA response message. If the AA is successful, the AMF may continue the interworking procedure by sending a PDU session create request message to a session management controller (SMC) for the UAS service.

In an example, the second message may comprise the AA status for the UAS service of the wireless device. The AA status may indicate that the wireless device is authenticated and authorized for the UAS service (e.g., the wireless device has valid AA for the UAS service). If the AA status indicate that the UAS is authenticated and authorized for the UAS service, the AMF does not perform the AA procedure. If the AA status indicate that the UAS is authenticated and authorized for the UAS service, the AMF may send the PDU session create request message for a UAS service.

In an example, the second message may comprise the AA status for the UAS service of the wireless device. The AA status may indicate that the wireless device is not authenticated and authorized or failed or expired for the UAS service. If the AA status indicate that the wireless device does not have valid AA for the UAS service, the AMF may pause the interworking procedure. If the wireless device does not have valid AA for the UAS service, the AMF may perform the AA procedure by sending an AA request message to an AA server as illustrated in FIG. 19. The AMF may receive an AA response message. The AMF may determine that AA procedure is successful (e.g., the wireless device is authenticated and authorized for the UAS service) based on the AA response message. If the AA is successful, the AMF may continue the interworking procedure by sending a PDU session create request message to a session management controller (SMC) for the UAS service.

If the AMF has a valid AA for the UAS service, the AMF may continue the interworking procedure by sending the PDU session create request message to the SMC. The SMC may perform session modification with a user gateway (UGW) to allocate core network tunnel for the PDU session. In response to receiving the PDU session create response message, the AMF may send a handover request message to the second base station. The handover request message may comprise the source to target transparent container, session management information, tunnel information and/or the like. If the AMF receive a handover request acknowledgement message, the AMF send a PDU session update request message to indicate a change of base station (e.g., from BS1 to BS2) to the SMC. The SMC update the change of base station to the UGW. If the PDU session update is completed, the AMF may send a forward relocation response message to the MME. The MME may send a handover command message to the wireless device via the first base station, indicating to handover to the second base station. In response to receiving the handover command message, the wireless device may access to the second base station. If the wireless device accesses to the second base station, the second base station may send a handover notify message to the AMF indicating the wireless device successfully moves to the second base station. In response to receiving the handover notify message, the AMF may send a forward relocation complete notify message to the MME, indicating a completion of the interworking procedure. The AMF may send a session update request in the SMC to indicate a handover complete.

If the inter-system handover is completed, the wireless device may send a registration request message to the AMF to update registration area of the wireless device.

Example embodiment may decrease signaling overhead and service delay by avoiding a duplicated AA procedure for the UAS service after handover from 4G network to the 5G network. The example embodiment may decrease unnecessary handover (from 4G network to 5G network) of one or more sessions which are associated with the UAS service if the wireless device is not authenticated and authorized.

In an example implementation, in response to receiving the second message, the AMF may not perform the AA procedure. The AA status in the second message may indicate that the wireless device does not have valid AA status (e.g., no AA status, or AA failed/expired). The AMF may not send the AA request message but continue the inter-system interworking procedure without any pause. Later, the AMF may perform the AA procedure based on AA status of the second message, after the inter-system handover completed. The AMF may send an AA request message, after the PDU session handover over from the first base station to the second base station.

Example embodiment may decrease signaling overhead and service delay by avoiding a duplicated AA procedure for the UAS service after handover from 4G network to the 5G network. The example embodiment may further decrease service delay by performing the AA procedure after the completion of the inter-system handover procedure. However, the example embodiment may increase a number of unnecessary handover (from 4G network to 5G network) of sessions which are subject to release due to failed AA procedure.

In an example implementation, in response to receiving the second message, the AMF may perform the inter-system interworking procedure by sending the PDU session create request message to the SMC. If the wireless device does not have valid AA status, the AMF may still send the PDU session create request message for the inter-system interworking procedure. In response to receiving the second message, the AMF may also perform the AA procedure with the AA server by sending the AA request message. Later, the AMF may request a release of PDU session for the UAS service if the AA procedure is failed. The AMF may update AA status based on the AA procedure.

Example embodiment may decrease signaling overhead and service delay by avoiding a duplicated AA procedure for the UAS service after handover from 4G network to the 5G network. The example embodiment may further decrease service delay by performing the AA procedure in parallel with the inter-system handover procedure.

In an example implementation, an AMF may receive a message requesting a relocation of contexts of a wireless device. The message may comprise a session associated with an unmanned and/or uncrewed aerial system (UAS) service. In response to receiving the message, the AMF may determine that the wireless device is authenticated and authorized by an AA server for the UAS service. The AMF may determine that the wireless device is authenticated and authorized for the UAS service if the message comprises the session associated with the UAS service. The AMF may set an AA status for the UAS service of the wireless device is positive (e.g., success, valid) based on the determination. In an example, the AMF may send an AA request message to the AA server if the AA status is negative.

Example embodiment may decrease signaling overhead and service delay by avoiding a duplicated AA procedure for the UAS service after handover from 4G network to the 5G network. However, the example embodiment may increase security vulnerability of the 5G network.

In a 5G network, an access and mobility management function (AMF) may be in charge of an AA procedure for a UAS service for a first wireless device. The first wireless device may be not allowed to request an establishment of a PDU session associated with the UAS service before a completion of the AA for the UAS service. Alternatively, a session management controller (e.g., SMF, PGW-C+SMF) may be in charge of the AA procedure for the UAS service for a second wireless device. The second wireless device may be allowed to request an establishment of a PDU session associated with the UAS service before completion of the AA for the UAS service. The session management controller (SMC) may perform the AA procedure during an establishment of the PDU session for the second wireless device. The SMC may reject the request for the establishment of the PDU session from the second wireless device if the AA for the UAS service of the second wireless device fails. The SMC may release the established PDU session with the second wireless device if the AA for the UAS service of the second wireless device fails. The 5G network may determine whether the AMF performs the AA procedure, or the SMC performs the AA procedure. The 5G network may determine who performs the AA procedure based on local policy. In an example, 5G network A (e.g., PLMN A) may determine that the AMF performs the AA procedure. In an example, 5G network B (PLMN B) may determine that the SMC performs the AA procedure.

Figure 26:
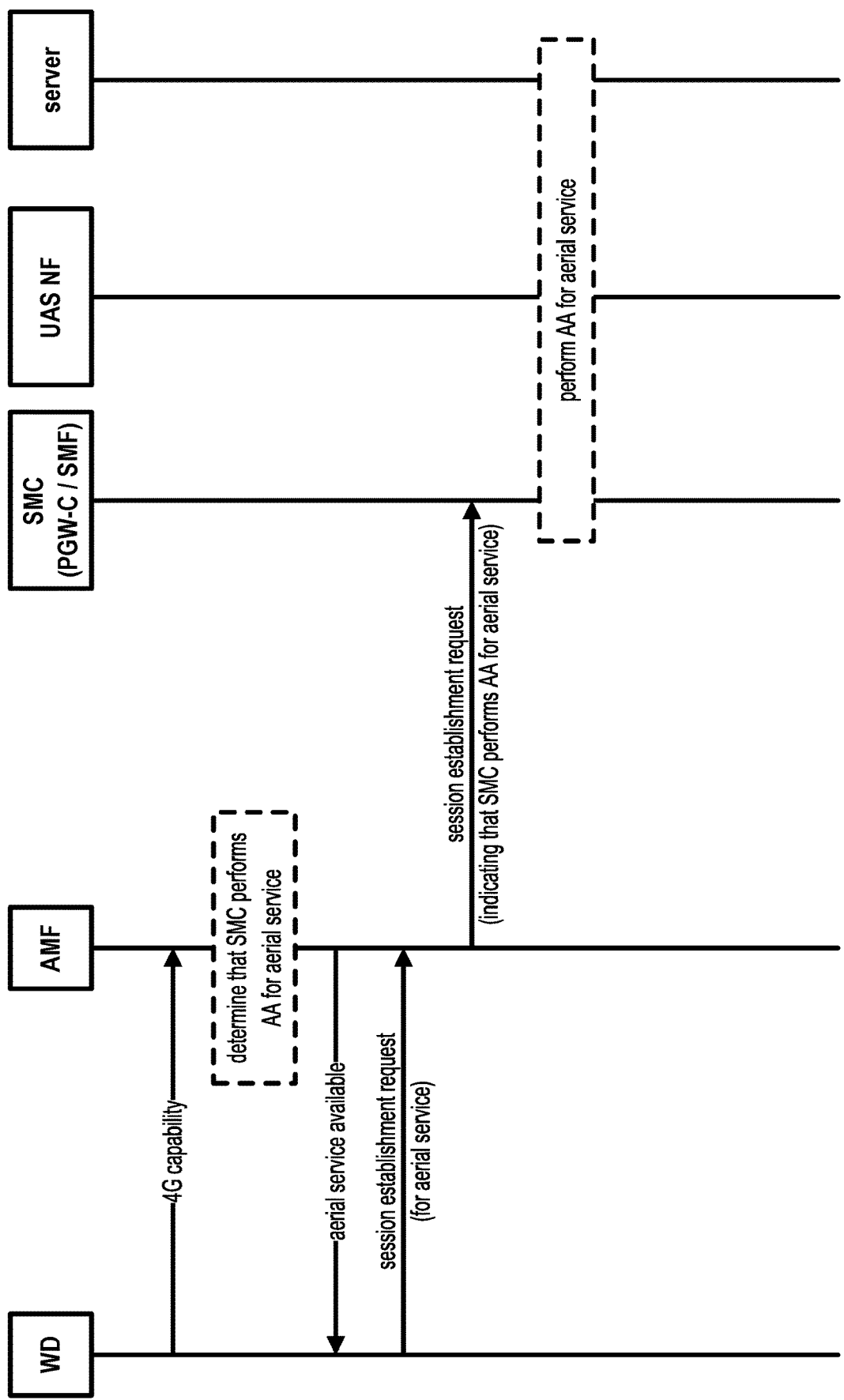
FIG. 26 illustrates an example procedure in 5G network regarding the 5G network determines a network node for an AA procedure for the UAS service in accordance with embodiments of the present disclosure.

FIG. 26 illustrates an example procedure in 5G network regarding the 5G network determines a network node for an AA procedure for the UAS service based on a 4G capability parameter in accordance with embodiments of the present disclosure. The 5G network may determine who performs the AA procedure based on the local policy and the 4G capability parameter. The 4G capability parameter may be capability of the wireless device, indicating that the wireless device is subject to handover to a 4G network area. The 4G capability parameter may indicate that the wireless device may communicate to the 4G network. The 4G capability may be a capability of a S1 mode. The S1 mode may be a mode of a wireless device allowing access to the 4G core network via the 4G access network.

In an example, the wireless device may indicate the 4G capability to the AMF. The wireless device may send a message to the AMF, the message may comprise the 4G capability parameter. The message may be a registration request message. The message may comprise a registration request type setting as an initial request. In an example, the AMF may receive the message comprising the 4G capability parameter.

In response to receiving the message, the AMF may determine who (e.g., which network node) will perform the AA procedure. Based on the parameter, the AMF may determine that a SMC performs the AA procedure for the UAS service of the wireless device. In response to the determination, the AMF may send a second message to the wireless device, indicating that an establishment of one or more PDU sessions associated with the UAS service is available. The second message may be a registration accept message. The AMF may indicate to the wireless device that the AA for the UAS service is not pending. In response to receiving the second message, the wireless device may send a session establishment request message for the UAS service. The session establishment request message may be a PDU session establishment request message. The session establishment request message may comprise a DNN, a CAA UAV identity, PCO, S-NSSAI, and/or the like.

In response to receiving the session establishment request message, the AMF may select a SMC based on the DNN, S-NSSAI, the CAA UAV identifier, and/or the like. The AMF may indicate to the SMC the determination. The AMF may indicate to the SMC that the SMC performs the AA procedure for the UAS service. The AMF may send a second session establishment request message indicating that the SMC perform the AA for the UAS service. In response to receiving the second session establishment request message indicating that the SMC perform the AA for the UAS service, the SMC may send an AA request message to an AA server for the UAS service of the wireless device. The SMC may send the AA request message to the AA service via an UAS network function (NF).

In an example, the AMF may receive a third message indicating that a second wireless device is not capable to communicate to the 4G network. The third message may not comprise the 4G capability parameter. The third message may be a registration request message. If the wireless device is not capable to communicate to the 4G network based on the third message, the AMF may determine that the AMF performs the AA procedure for the UAS service. Based on the determination, the AMF may send an AA request message to the AA server, requesting the AA for the UAS service of the second wireless device. In response to the determination, the AMF may indicate to the second wireless device that an establishment of one or more sessions associated with the UAS service is not allowed for the second wireless device. In response to the determination, the AMF may indicate to the second wireless device that an establishment of one or more sessions associated with the UAS service is pending for the second wireless device.

Example embodiment may decrease signaling overhead and service delay by avoiding a duplicated AA procedure for the UAS service. Example embodiment may allow the 5G network determine that the SMC performs the AA procedure if a wireless device is subject to handover the 4G network. The duplicated AA procedure may be avoided since the same node (e.g., SMC) is in charge of the AA procedure. Example embodiment may decrease impact to the legacy system (e.g., 4G network). Example embodiment may work both for interworking with N26 interface and interworking without N26 interface.

In an example, a mobility management entity (MME) of a fourth generation (4G) network from a first base station may receive a message requesting a handover of a wireless device to a second base station. The second base station may belong to a fifth generation (5G) network. In response to receiving the message, the MME may send to an access and mobility management function (AMF), a second message requesting a relocation of contexts of the wireless device. The second message may comprise an authentication and/or authorization (AA) status of the wireless device for an unmanned and/or uncrewed aerial system (UAS) service.

In an example, the MME may receive from the wireless device, an attach request message. The attach request message may comprise a parameter indicating that the wireless device is capable to communicate to the 5G network, an access point name (APN) associated with the UAS service, and/or the like. The MME may send to a session management controller (SMC), a third message requesting a creation of a session. The third message may comprise the parameter and the APN. The MME may receive from the session management controller, a fourth message indicating a creation of the session. The fourth message may comprise a protocol configuration option (PCO) for the wireless device, the AA status, and/or the like.

In an example, the MME may store the AA status for the UAS service into the contexts of the wireless device in the MME.

In an example, receiving the third message comprising the AA status, may be based on the parameter indicating that the wireless device is capable to communicate to the 5G network.

In an example, the MME may select the session management controller supporting interworking between the 4G network and the 5G network. The selection may be based on the parameter.

The session management controller may comprise one or more of a packet data network gateway control plane function of the 4G network, a session management function (SMF) of the 5G network, and/or the like. The session management controller may select a user plane gateway for the session. The session may be between the wireless device and the user plane gateway.

In an example, the user plane gateway may comprise one or more of: a packet data network (PDN) gateway user plane function: and a user plane function (UPF).

In an example, the wireless device may send data associated with the UAS service via the session to the user plane gateway.

In an example, the attach request message may further comprise an identifier of the wireless device, an unmanned and/or uncrewed aerial vehicle (UAV) identifier, and/or the like.

In an example, the PCO may comprise the AA status.
In an example, the PCO may not comprise the AA status.
The PCO may be between the session management controller and the wireless device. The MME may send the PCO to the wireless device transparently.

In an example, the AA status for the UAS service may indicate whether the wireless device is authenticated or authorized by an AA server associated with the UAS service.

The 4G network may comprise the first base station. The 5G network may comprise the second base station and the AMF.

In an example, the wireless device may be an unmanned and/or uncrewed aerial vehicle (UAV).

In an example, the message comprises one or more of an identifier of the second base station, a handover type, source to target transparent container information, and/or the like. The identifier of the second base station may comprise a global next generation node b identifier, a global next generation evolved node b identifier, a public land mobile network (PLMN) identifier, a tracking area code of a 5G network, and/or the like. The handover type may comprise an intra long term evolution (LTE), from the LTE to a universal terrestrial radio access network (UTRAN), from the LTE to a global system for mobile communications (GSM) radio access network (GERAN), from the UTRAN to the LTE, from the GERAN to LTE, from the evolved packet system (EPS) to the 5G system (5GS), from the 5GS to the EPS, and/or the like. The handover type may be from the EPS to the 5GS.

In an example, the 4G network may be an evolved packet system (EPS).

In an example, a session management controller (SMC) may receive from a mobility management entity (MME), a first message requesting a creation of a session associated with an unmanned and/or uncrewed aerial system (UAS) service for a wireless device. The SMC may send to an authentication and/or authorization (AA) server of the UAS service, a second message requesting an AA for the UAS service of the wireless device. The SMC may receive from the AA server, an AA result for the UAS service. The SMF may send to the MME, an AA status comprising the AA result.

In an example, the first message may further comprise a parameter indicating that the wireless device is capable to communicate to a fifth generation (5G) network. The sending the AA status may be based on the parameter.

In an example, the SMC may support an interworking between a fourth generation (4G) network and a fifth generation (5G) network. The SMC may comprise one or more of a packet data network gateway control plane function of the 4G network, a session management function (SMF) of the 5G network, and/or the like.

In an example, first message may comprise an unmanned and/or uncrewed aerial vehicle (UAV) identifier.

The sending of the second message may be based on the UAV identifier.

In an example, an access and mobility function (AMF) may receive from a mobility management entity (MME), a message requesting a relocation of contexts of a wireless device. The message may comprise an authentication and/or authorization (AA) status for an unmanned and/or uncrewed aerial system (UAS) service of the wireless device The AMF may determine based on the AA status, whether the wireless device is authenticated and authorized for the UAS service.

Based on the determining, the AMF may send to an authentication and/or authorization (AA) server of the UAS service, a second message requesting an AA for the UAS service of the wireless device.

Based on the determining, the AMF may not send to an authentication and/or authorization (AA) server for the UAS service, a second message requesting an AA of the wireless device.

In an example, an access and mobility function (AMF) may receive from a mobility management entity (MME), a message requesting a relocation of contexts of a wireless device. The message may comprise a session associated with an unmanned and/or uncrewed aerial system (UAS) service. Based on the sessions (e.g., existence of the session associated with the UAS service), the AMF may determine the wireless device is authenticated and authorized by an authentication and/or authorization (AA) server for the UAS service. The AMF may set/configure, an AA status for the UAS service of the wireless device being positive, wherein the setting is based on the determining.

In an example, the AMF may send to the AA server, a second message requesting an AA for the UAS service of the wireless device. The sending may be based on the AA status being negative.

In an example, an access and mobility function (AMF) may receive from a wireless device, a message comprising a parameter indicating that the wireless device is capable to communicate to a fourth generation (4G) network. Based on the parameter, the AMF may determine that a session management controller (SMC) performs an authentication and/or authorization (AA) for an unmanned and/or uncrewed aerial system (UAS) service of the wireless device instead of the AMF. The AMF may indicate to the SMC, that the SMC performs the AA for the UAS service.

In an example, the AMF may indicate to the wireless device, that a session establishment for the UAS service is allowed for the wireless device.

The AMF may select the SMC based on at least one of a data network name (DNN), single network slice selection assistance information (S-NSSAI), an CAA unmanned and/or uncrewed aerial vehicle (UAV) identifier, and/or the like.

In an example, the AMF may receive from a second wireless device, a second message. The second message may not comprise the parameter indicating the 4G access capability of the wireless device. Based on the second message, the AMF may determine that the AMF performs the AA for the UAS service. The AMF may send to an AA server, third message requesting the AA for the UAS service of the wireless device.

In an example, the AMF may indicate to the wireless device, that a session establishment associated with the UAS service is not allowed for the wireless device.

In an example, the AMF may indicate to the wireless device, that a session establishment associated with the UAS service is pending for the wireless device.

The SMC may comprise one or more of a packet data network gateway control plane function of the 4G network, a session management function (SMF) of a fifth generation (5G) network.

In an example, the 5G network may comprise the AMF.

In an example, the wireless device may be registered with the 4G network.

In an example, a session management controller (SMC) may receive from an access and mobility function (AMF), a message indicating that a SMC performs an authentication and/or authorization (AA) for an unmanned and/or uncrewed aerial system (UAS) service. The SMF may send to an AA server, a second message requesting the AA for the UAS service of the wireless device. The sending may be based on the message.

In an example, a wireless device may send to an access and mobility function (AMF), a first message indicating that the wireless device is capable to communicate to a fourth generation (4G) network. The wireless device may receive, a second message that the wireless device is allowed to make one or more sessions associated with an unmanned serial service. The second message may be based on the message.

The invention claimed is:

1. A method comprising:
receiving, by a mobility management entity (MME) from a wireless device, an attach request message comprising at least one of:
a parameter indicating that the wireless device is capable of communicating with a fifth generation (5G) network; and
an access point name (APN) associated with an aerial service of the wireless device;
selecting, by the MME, a session management controller based on the session management controller supporting the aerial service and interworking between a fourth generation (4G) network and the 5G network;
sending, by the MME to the session management controller, a request for a creation of a session of the wireless device with the 5G network, wherein the request for the creation of the session comprises at least one of:
the parameter indicating that the wireless device is capable of communicating with the 5G network; and
the APN associated with the aerial service;
receiving, by the MME from the session management controller, an indication of an authentication and/or authorization (AA) status of the aerial service of the wireless device, wherein the indication of the AA status is received in a message indicating the creation of the session of the wireless device with the 5G network;
receiving, by the MME from a first base station, a handover request for a handover of the wireless device to a second base station of the 5G network; and
based on the handover request, sending, by the MME to an access and mobility management function (AMF) of the 5G network, the indication of the AA status of the aerial service of the wireless device.

2. The method of claim 1, wherein the handover is from a first network indicative of the 4G network to a second network indicative of the 5G network.

3. The method of claim 2, wherein the MME is of the first network and the AMF is of the second network.

4. The method of claim 1, wherein the indication of the AA status is sent to the AMF via an N26 interface.

5. The method of claim 1, wherein the indication of the AA status is sent to the AMF in a protocol configuration option (PCO) of the wireless device.

6. The method of claim 5, wherein the PCO of the wireless device is between the wireless device and the session management controller.

7. The method of claim 1, wherein the indication of the AA status is sent to the AMF in a relocation request message.

8. The method of claim 7, wherein the relocation request message is a forward relocation request message.

9. The method of claim 7, wherein the relocation request message is a request for relocation of a wireless device context of the wireless device.

10. The method of claim 1, further comprising maintaining and/or keeping, by the MME, a wireless device context of the wireless device.

11. The method of claim 10, further comprising storing, by the MME, the AA status of the wireless device into the wireless device context of the wireless device.

12. The method of claim 1, wherein the session of the wireless device is associated with the aerial service.

13. The method of claim 1, wherein the session of the wireless device communicates data of the aerial service.

14. The method of claim 1, wherein the message indicating the creation of the session comprises a protocol configuration option (PCO) of the wireless device.

15. The method of claim 1, wherein the message indicating the creation of the session comprises the AA status of the wireless device.

16. The method of claim 1, wherein the attach request message comprises at least one of:
- a wireless device identifier of the wireless device; and
- an uncrewed and/or unmanned and/or uncrewed aerial vehicle (UAV) identifier of the wireless device.

17. The method of claim 1, further comprising selecting, by the MME, the session management controller based on the session management controller supporting interworking between (4G) the 4G network and the 5G network based on the parameter.

18. The method of claim 1, wherein the session management controller comprises at least one of:
- a packet data network gateway control plane function (PGW-C) of the 4G network; and
- a session management function (SMF) of the 5G network.

19. The method of claim 1, wherein the session of the wireless device is between the wireless device and a user plane gateway selected by the session management controller.

20. A method comprising:

receiving, by a mobility management entity (MME) from a first base station of a fourth generation (4G) network, a handover request for a handover of a wireless device to a second base station of a fifth generation (5G) network;

selecting, by the MME, a session management controller based on the session management controller supporting an aerial service and interworking between the 4G network and the 5G network;

receiving, by the MME from the session management controller, an indication of an authentication and/or authorization (AA) status of the aerial service of the wireless device, wherein the indication of the AA status is received in a message indicating a creation of a session of the wireless device with the second base station of the 5G network; and based on the handover request, sending, by the MME to an access and mobility management function (AMF) of the 5G network, the indication of the AA status of the aerial service of the wireless device.

* * * * *